US012666268B2

(12) United States Patent
Beg et al.

(10) Patent No.: US 12,666,268 B2
(45) Date of Patent: Jun. 23, 2026

(54) IDENTIFYING DEVICES WITHIN TRANSMISSIONS WITHIN A SENSING NETWORK

(71) Applicant: COGNITIVE SYSTEMS CORP., Waterloo (CA)

(72) Inventors: Chris Beg, Waterloo (CA); Mohammad Omer, Waterloo (CA)

(73) Assignee: COGNITIVE SYSTEMS CORP., Waterloo (CA)

( * ) Notice: Subject to any disclaimer, the term of this patent is extended or adjusted under 35 U.S.C. 154(b) by 105 days.

(21) Appl. No.: 18/687,940

(22) PCT Filed: Aug. 30, 2022

(86) PCT No.: PCT/IB2022/058127
§ 371 (c)(1),
(2) Date: Feb. 29, 2024

(87) PCT Pub. No.: WO2023/031795
PCT Pub. Date: Mar. 9, 2023

(65) Prior Publication Data
US 2024/0381096 A1      Nov. 14, 2024

Related U.S. Application Data

(60) Provisional application No. 63/271,325, filed on Oct. 25, 2021, provisional application No. 63/243,986,
(Continued)

(51) Int. Cl.
*H04W 12/65* (2021.01)
*G01S 13/48* (2006.01)
(Continued)

(52) U.S. Cl.
CPC .............. *H04W 12/65* (2021.01); *G01S 13/48* (2013.01); *G01S 13/878* (2013.01); *H04W 12/71* (2021.01); *H04W 12/79* (2021.01)

(58) Field of Classification Search
CPC ..... H04W 12/65; H04W 12/71; H04W 12/79; H04W 4/38; H04W 84/12; G01S 13/48; G01S 13/878; G01S 13/765
See application file for complete search history.

(56) References Cited

U.S. PATENT DOCUMENTS

| | | | | |
|---|---|---|---|---|
| 10,798,529 B1 * | 10/2020 | Beg | ...................... | H04W 24/10 |
| 12,205,417 B2 * | 1/2025 | Das | ...................... | G05D 1/247 |

(Continued)

FOREIGN PATENT DOCUMENTS

| | | | | |
|---|---|---|---|---|
| EP | 3695783 A1 | 8/2020 | | |
| EP | 3739356 A1 * | 11/2020 | .............. | B60L 50/20 |

(Continued)

OTHER PUBLICATIONS

European Patent Office (EPO): Extended European Search Report (EESR) for Application No. 22863747.6, dated Jun. 2, 2025, 10 pages.
(Continued)

*Primary Examiner* — Lizbeth Torres-Diaz
(74) *Attorney, Agent, or Firm* — Moffat & Co

(57) ABSTRACT

Systems and methods for Wi-Fi sensing are provided. A method for Wi-Fi sensing carried out by a sensing algorithm manager including at least one processor configured to execute instructions. A sensing measurement based on a sensing transmission transmitted by a sensing transmitter and received by a sensing receiver is obtained. Then, a device context of a sensing pair associated with the sensing transmission is determined. The sensing pair includes the sensing transmitter and the sensing receiver. The sensing
(Continued)

measurement is associated with the device context. A sensing algorithm is executed according to the sensing measurement and the device context to generate a sensing result.

16 Claims, 22 Drawing Sheets

Related U.S. Application Data filed on Sep. 14, 2021, provisional application No. 63/240,619, filed on Sep. 3, 2021.

(51) Int. Cl.

| | | |
|---|---|---|
| *G01S 13/87* | (2006.01) | |
| *H04W 12/71* | (2021.01) | |
| *H04W 12/79* | (2021.01) | |

(56) References Cited

U.S. PATENT DOCUMENTS

| | | | | |
|---|---|---|---|---|
| 2005/0207381 | A1* | 9/2005 | Aljadeff ................ | H04W 64/00 |
| | | | | 370/338 |
| 2015/0128265 | A1* | 5/2015 | Jover ................. | H04L 63/1416 |
| | | | | 726/23 |
| 2016/0069978 | A1* | 3/2016 | Rangarajan ........... | G01S 5/0226 |
| | | | | 455/456.1 |
| 2017/0161564 | A1* | 6/2017 | Jobling .................. | G07C 11/00 |
| 2018/0019871 | A1* | 1/2018 | Gage ................... | G06F 21/6209 |
| 2018/0227755 | A1* | 8/2018 | Abernathy .............. | H04W 4/38 |
| 2019/0146076 | A1* | 5/2019 | Kravets ................... | G01S 7/403 |
| | | | | 455/67.11 |
| 2019/0281370 | A1* | 9/2019 | Struhsaker ............. | H04W 4/80 |
| 2020/0359248 | A1 | 11/2020 | Sadeghi et al. | |
| 2021/0021962 | A1* | 1/2021 | Diaz Fuente ....... | H04W 64/006 |
| 2021/0273735 | A1 | 9/2021 | Da Silva et al. | |
| 2022/0070710 | A1 | 3/2022 | Lim et al. | |
| 2022/0304051 | A1* | 9/2022 | Aboul-Magd ....... | H04B 7/0626 |
| 2022/0304081 | A1 | 9/2022 | Wu et al. | |

FOREIGN PATENT DOCUMENTS

| | | | | | |
|---|---|---|---|---|---|
| EP | | 4583550 A1 * | 7/2025 | ............. | G01S 13/04 |
| WO | WO-2014014776 A1 * | | 1/2014 | ............ | H04W 84/12 |

OTHER PUBLICATIONS

Tan et al., "Efficient Association of Wi-Fi Probe Requests under MAC Address Randomization", IEEE INFOCOM 2021—IEEE Conference on Computer Communications, date: May 10, 2021, XP033947383, 10 pages.

International Search Report, International Application No. PCT/IB2022/058127, Mailing Date: Dec. 23, 2022.

\* cited by examiner

702 — Obtain Media Access Control (MAC) address of a device

704 — Associate the MAC address of the device to Internet Protocol (IP) address of the device 706 — Perform hostname discovery 708 — Perform Domain Name System (DNS) information extraction 710 — Generate Higher Layer Identification (HLI) fingerprint for the device

700

900

1000

1100

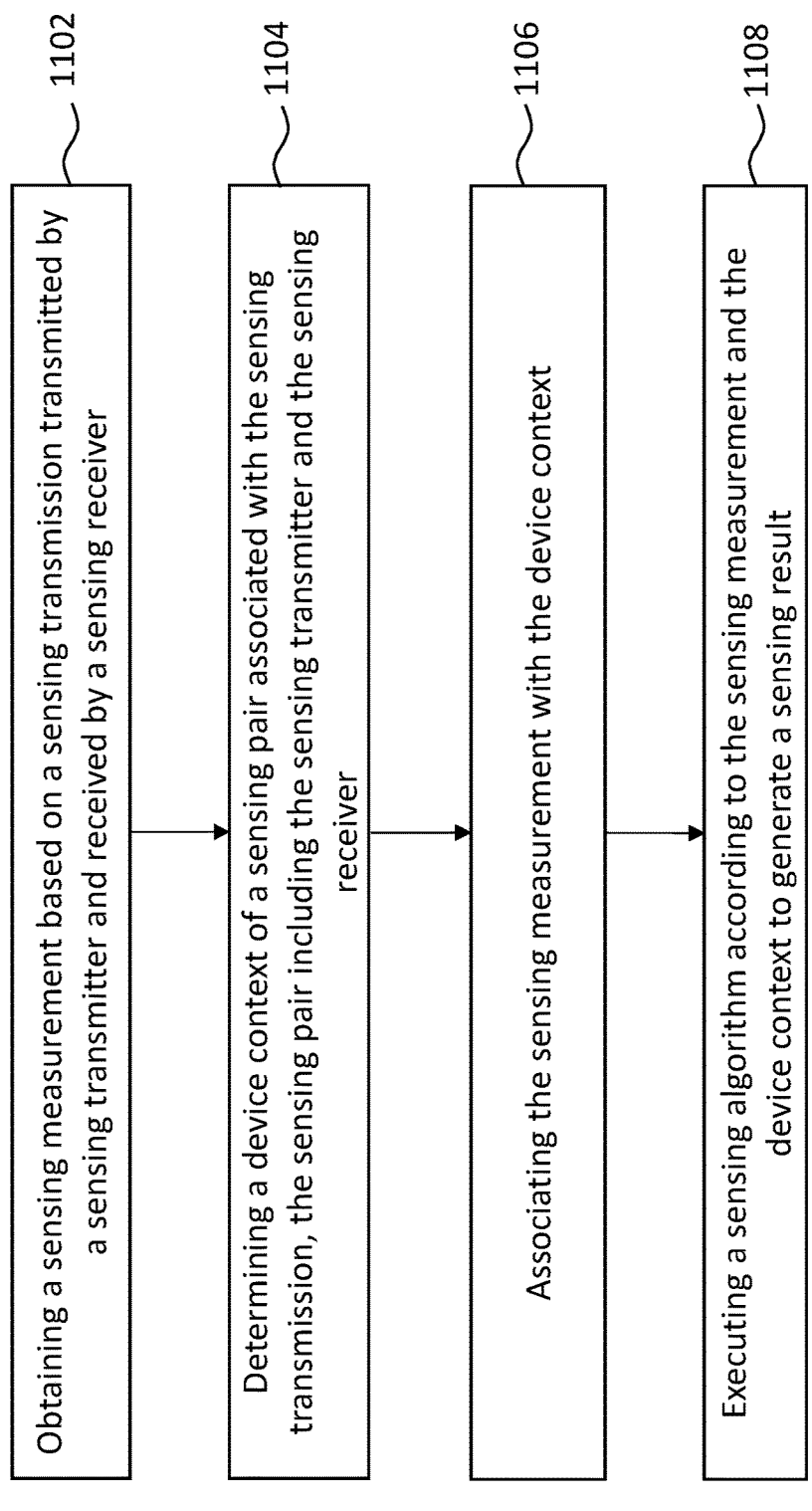

1102

Obtaining a sensing measurement based on a sensing transmission transmitted by a sensing transmitter and received by a sensing receiver

1104

Determining a device context of a sensing pair associated with the sensing transmission, the sensing pair including the sensing transmitter and the sensing receiver

1106

Associating the sensing measurement with the device context

1108

Executing a sensing algorithm according to the sensing measurement and the device context to generate a sensing result

FIG. 11

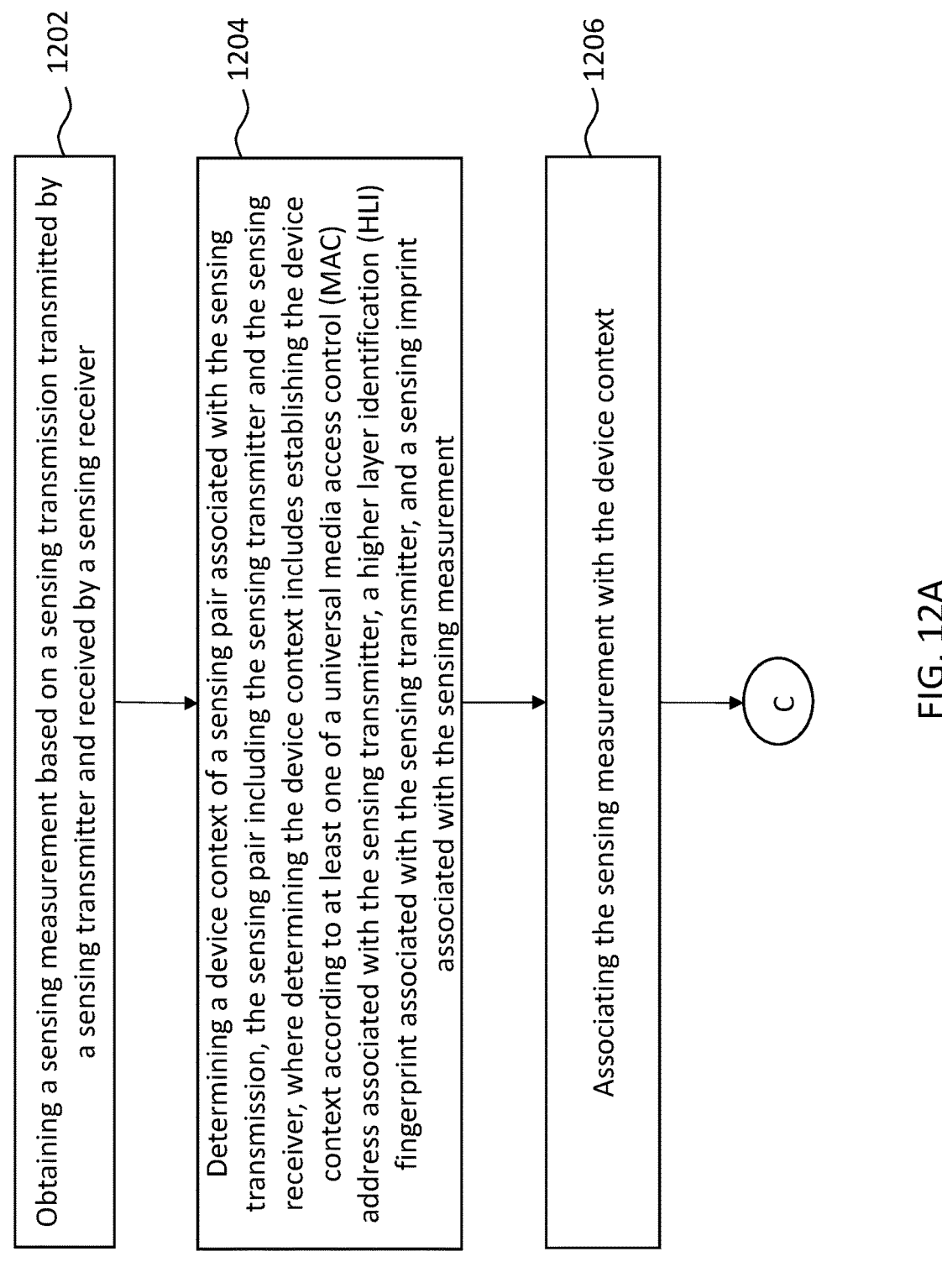

1200

1202

Obtaining a sensing measurement based on a sensing transmission transmitted by a sensing transmitter and received by a sensing receiver

1204

Determining a device context of a sensing pair associated with the sensing transmission, the sensing pair including the sensing transmitter and the sensing receiver, where determining the device context includes establishing the device context according to at least one of a universal media access control (MAC) address associated with the sensing transmitter, a higher layer identification (HLI) fingerprint associated with the sensing transmitter, and a sensing imprint associated with the sensing measurement

1206

Associating the sensing measurement with the device context

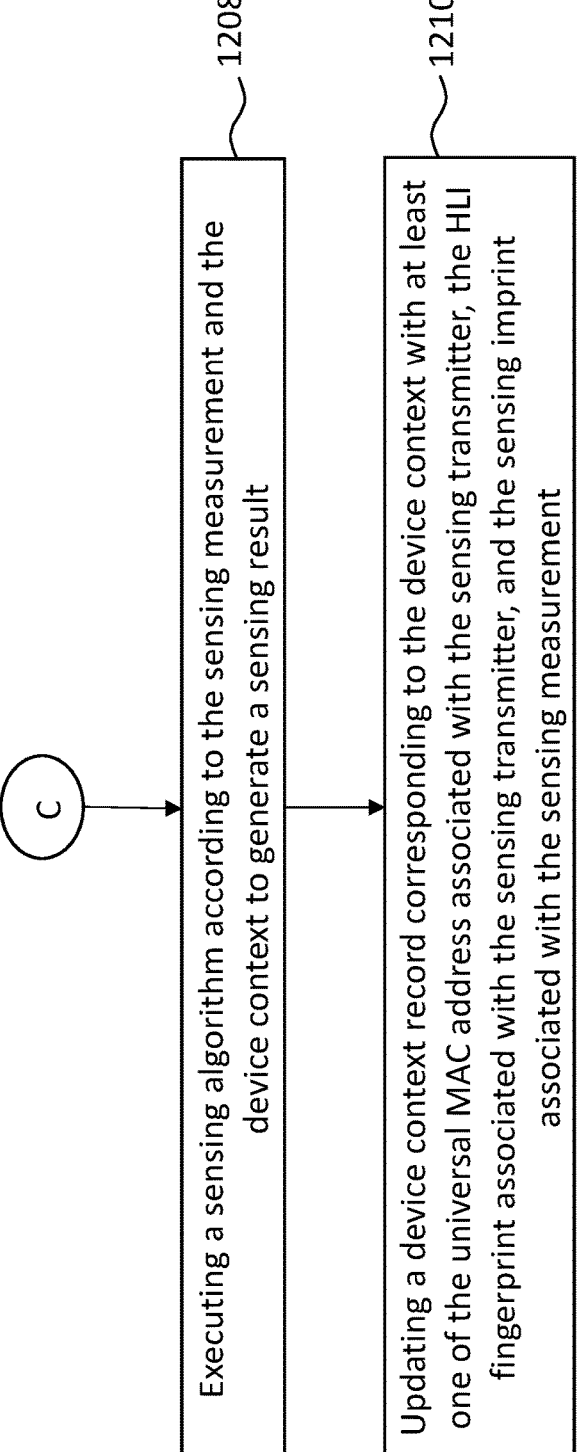

1200

C

Executing a sensing algorithm according to the sensing measurement and the device context to generate a sensing result
1208

Updating a device context record corresponding to the device context with at least one of the universal MAC address associated with the sensing transmitter, the HLI fingerprint associated with the sensing transmitter, and the sensing imprint associated with the sensing measurement
1210

FIG. 12B

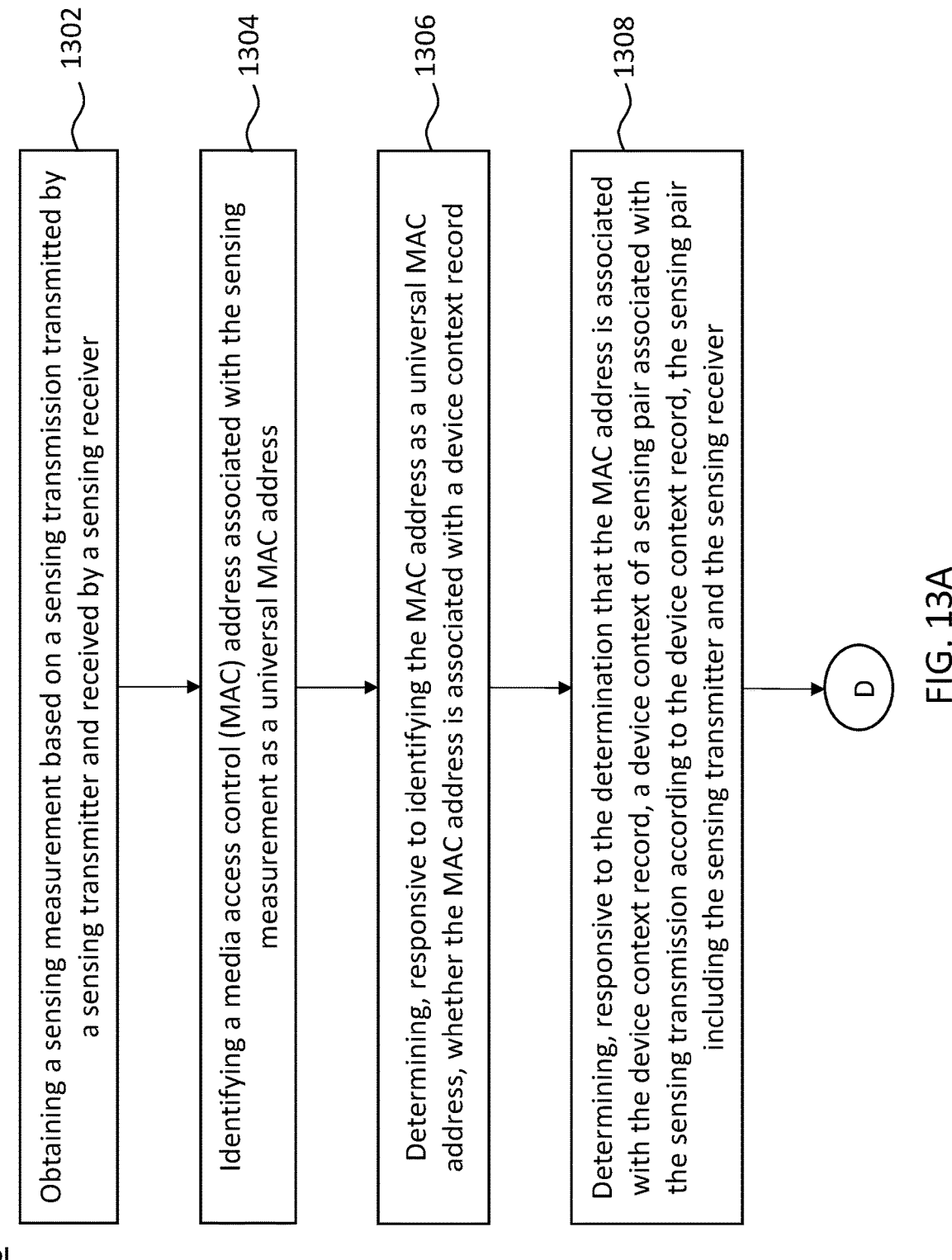

1300

Obtaining a sensing measurement based on a sensing transmission transmitted by a sensing transmitter and received by a sensing receiver
1302

Identifying a media access control (MAC) address associated with the sensing measurement as a universal MAC address
1304

Determining, responsive to identifying the MAC address as a universal MAC address, whether the MAC address is associated with a device context record
1306

Determining, responsive to the determination that the MAC address is associated with the device context record, a device context of a sensing pair associated with the sensing transmission according to the device context record, the sensing pair including the sensing transmitter and the sensing receiver
1308

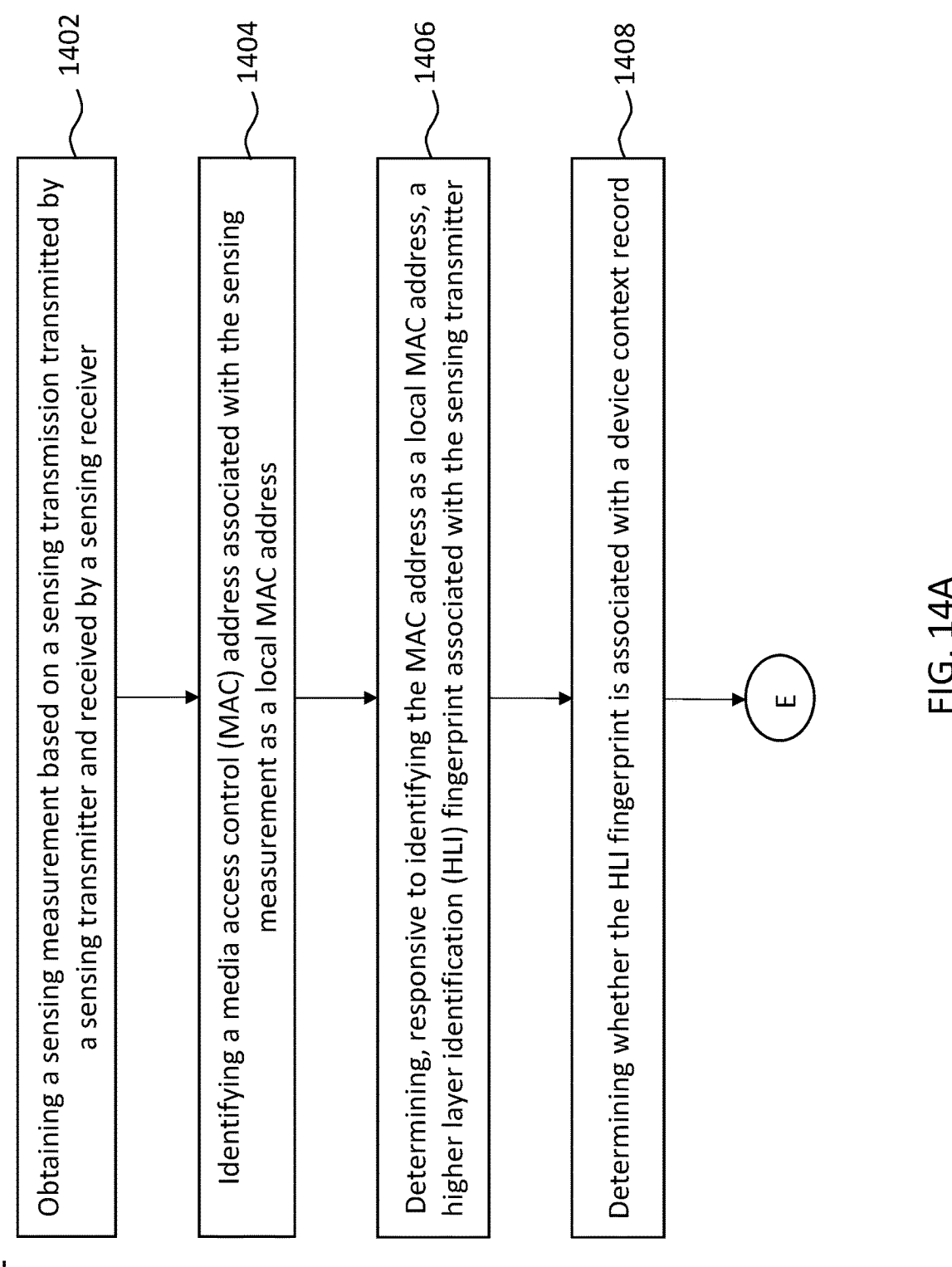

1400

Obtaining a sensing measurement based on a sensing transmission transmitted by a sensing transmitter and received by a sensing receiver — 1402

Identifying a media access control (MAC) address associated with the sensing measurement as a local MAC address — 1404

Determining, responsive to identifying the MAC address as a local MAC address, a higher layer identification (HLI) fingerprint associated with the sensing transmitter — 1406

Determining whether the HLI fingerprint is associated with a device context record — 1408

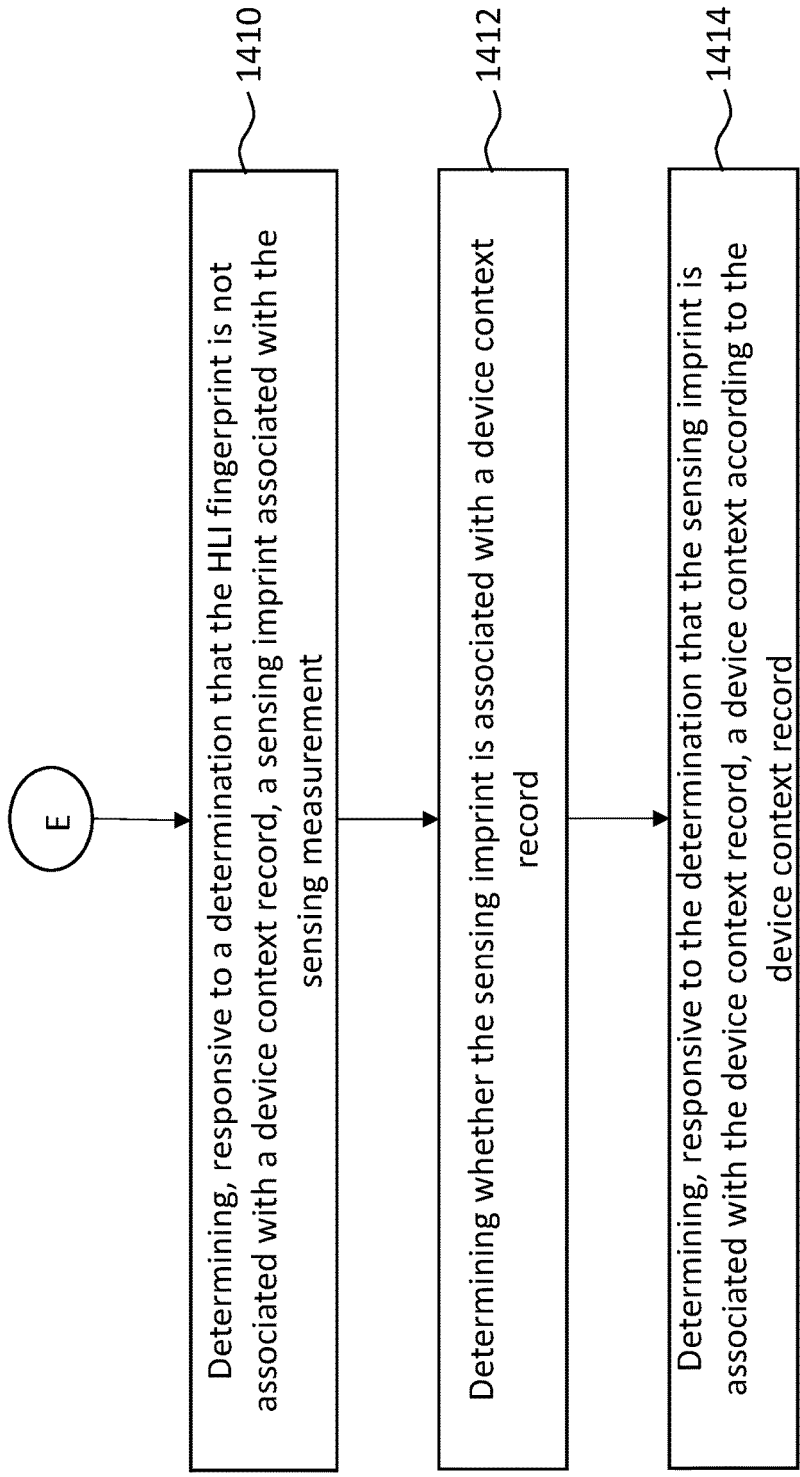

E

1410 — Determining, responsive to a determination that the HLI fingerprint is not associated with a device context record, a sensing imprint associated with the sensing measurement 1412 — Determining whether the sensing imprint is associated with a device context record 1414 — Determining, responsive to the determination that the sensing imprint is associated with the device context record, a device context according to the device context record

FIG. 14B

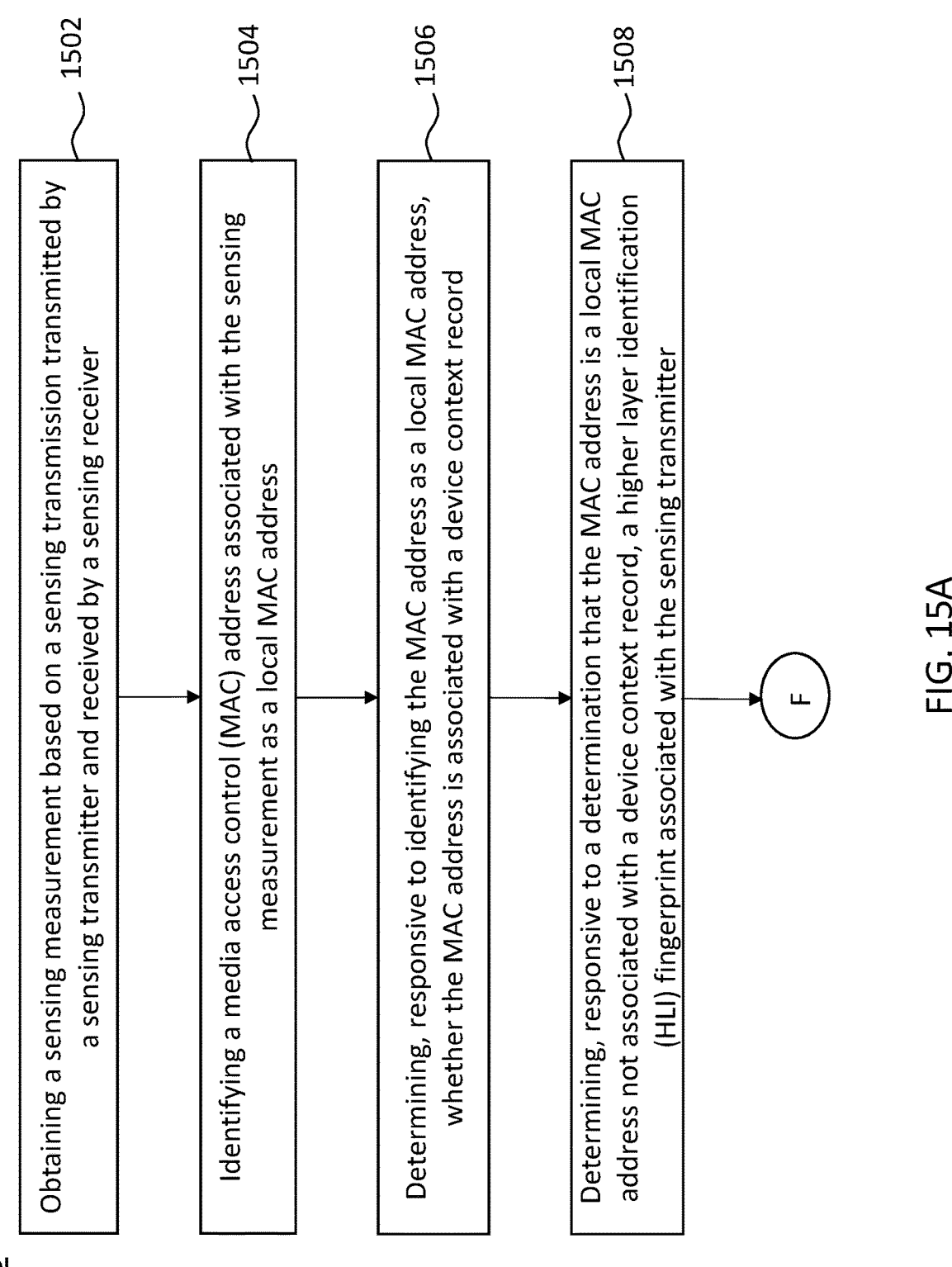

1500

1502 — Obtaining a sensing measurement based on a sensing transmission transmitted by a sensing transmitter and received by a sensing receiver 1504 — Identifying a media access control (MAC) address associated with the sensing measurement as a local MAC address 1506 — Determining, responsive to identifying the MAC address as a local MAC address, whether the MAC address is associated with a device context record 1508 — Determining, responsive to a determination that the MAC address is a local MAC address not associated with a device context record, a higher layer identification (HLI) fingerprint associated with the sensing transmitter

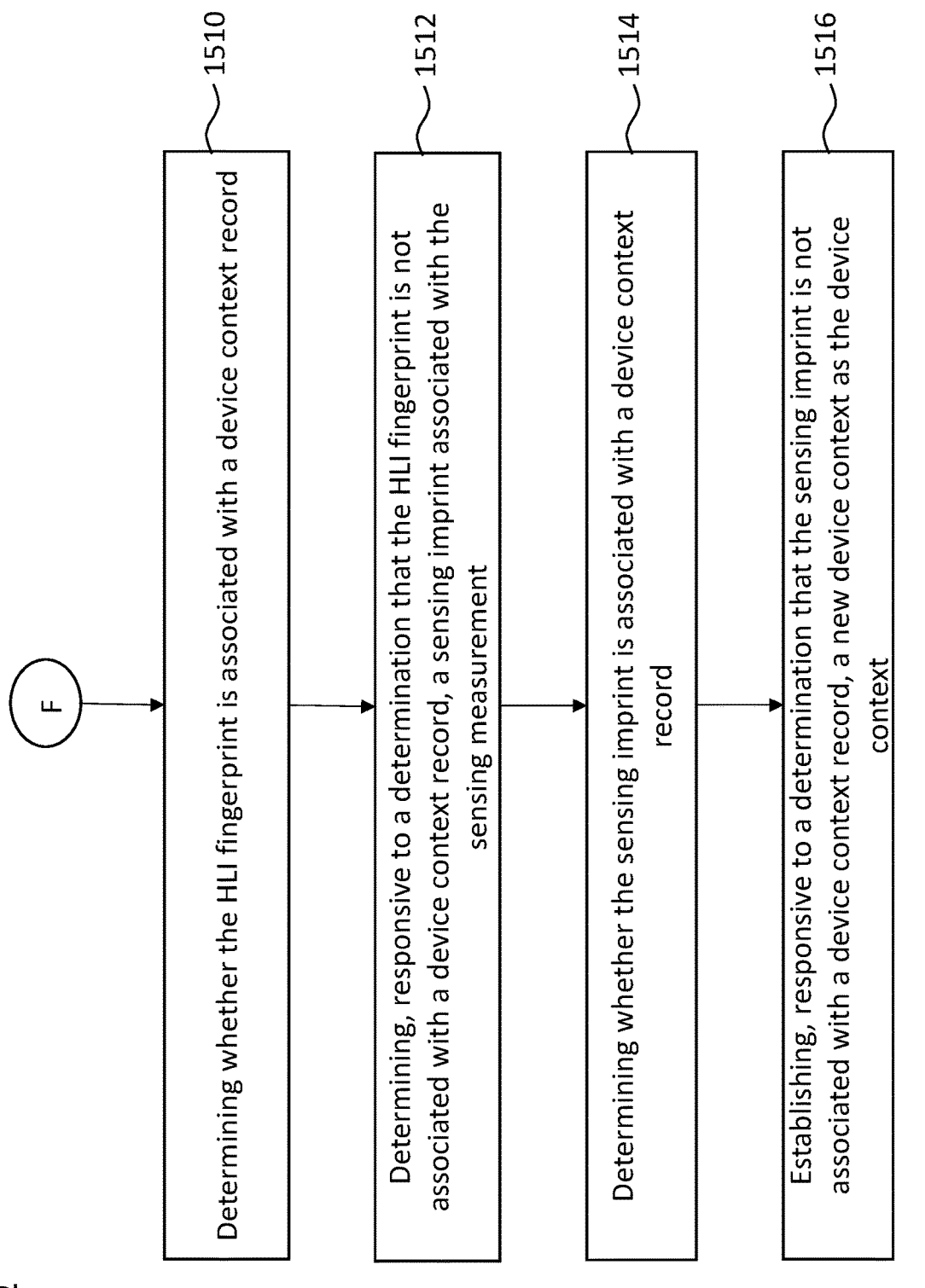

1500

1510 — Determining whether the HLI fingerprint is associated with a device context record 1512 — Determining, responsive to a determination that the HLI fingerprint is not associated with a device context record, a sensing imprint associated with the sensing measurement 1514 — Determining whether the sensing imprint is associated with a device context record 1516 — Establishing, responsive to a determination that the sensing imprint is not associated with a device context record, a new device context as the device context

FIG. 15B

IDENTIFYING DEVICES WITHIN TRANSMISSIONS WITHIN A SENSING NETWORK

RELATED APPLICATIONS

This application is a U.S. National Stage Entry of International Application No. PCT/IB2022/058127, filed on Aug. 30, 2022, which claims priority to U.S. Provisional Application No. 63/271,325, filed on Oct. 25, 2021, and titled "Identifying Devices within Transmissions within a Sensing Network," to U.S. Provisional Application No. 63/243,986, filed on Sep. 14, 2021, and titled "Identifying Devices within Transmissions within a Sensing Network," and to U.S. Provisional Application No. 63/240,619, filed on Sep. 3, 2021, and titled "Identifying Devices within Transmissions within a Sensing Network," each of which is incorporated herein by reference in its entirety.

TECHNICAL FIELD

The present disclosure generally relates to systems and methods for Wi-Fi sensing. In particular, the present disclosure relates to systems and methods for identifying devices within transmissions within a sensing network.

BACKGROUND OF THE DISCLOSURE

Motion detection systems have been used to detect movement, for example, of objects in a room or an outdoor area. In some example motion detection systems, infrared or optical sensors are used to detect the movement of objects in the sensor's field of view. Motion detection systems have been used in security systems, automated control systems, and other types of systems. A Wi-Fi sensing system is one recent addition to motion detection systems. The Wi-Fi sensing system may be a network of Wi-Fi-enabled devices that may be a part of an IEEE 802.11 network. In an example, the Wi-Fi sensing system may be configured to detect features of interest in a sensing space. The sensing space may refer to any physical space in which the Wi-Fi sensing system may operate, such as a place of residence, a place of work, a shopping mall, a sports hall or sports stadium, a garden, or any other physical space. The features of interest may include motion of objects and motion tracking, presence detection, intrusion detection, gesture recognition, fall detection, breathing rate detection, and other applications.

In the Wi-Fi sensing system, motion or movement cannot be detected based on channel perturbations unless there is absolute certainty of the channel being measured. When a media access control (MAC) address of a device is not universally unique to the device and may be randomly generated or updated, then the MAC address of the device cannot be used to identify the device on a Wi-Fi sensing network. Similarly, association ID (AID) is not universally unique to a device and may change at any time. Additionally, since a device may not be a part of a basic service set (BSS) of an access point, there may not be any relevant AID attached to the device and the access point. In an example, the device may not be associated with any network or may be associated with another network and AID of the device may be duplicated by another device in the BSS of the access point. Accordingly, the AID of the device may not be constant and thus cannot be used to identify the device on the Wi-Fi sensing network.

BRIEF SUMMARY OF THE DISCLOSURE

The present disclosure generally relates to systems and methods for Wi-Fi sensing. In particular, the present disclosure relates to systems and methods for identifying devices within transmissions within a sensing network.

Systems and methods are provided for Wi-Fi sensing. In an example embodiment, a method for Wi-Fi sensing is described. The method is carried out by a sensing algorithm manager including a processor configured to execute instructions. The method includes obtaining, by the processor, a sensing measurement based on a sensing transmission transmitted by a sensing transmitter and received by a sensing receiver, determining, by the sensing algorithm manager, a device context of a sensing pair associated with the sensing transmission, the sensing pair including the sensing transmitter and the sensing receiver, associating the sensing measurement with the device context, and executing, by the processor, a sensing algorithm according to the sensing measurement and the device context to generate a sensing result.

In some embodiments, the sensing algorithm manager further includes the sensing receiver.

In some embodiments, the sensing algorithm manager includes a receiving antenna configured to receive the sensing measurement from the sensing receiver.

In some embodiments, determining the device context includes identifying a universal MAC address associated with the sensing transmitter, and determining the device context from a device context record corresponding to the universal MAC address.

In some embodiments, determining the device context includes identifying a higher layer identification fingerprint associated with the sensing transmitter, and determining the device context from a device context record corresponding to the higher layer identification fingerprint.

In some embodiments, identifying the higher layer identification fingerprint includes identifying a hostname and an IP address associated with the sensing transmitter.

In some embodiments, the method further includes associating the higher layer identification fingerprint with a MAC address associated with the sensing transmitter.

In some embodiments, determining the device context includes determining a sensing imprint associated with the sensing measurement, and determining the device context from a device context record corresponding to the sensing imprint.

In some embodiments, determining the device context includes establishing the device context according to at least one of a universal MAC address associated with the sensing transmitter, a higher layer identification fingerprint associated with the sensing transmitter, and a sensing imprint associated with the sensing measurement, and storing the device context as a new device context record.

In some embodiments, the method further includes updating a device context record corresponding to the device context with at least one of a universal MAC address associated with the sensing transmitter, a higher layer identification fingerprint associated with the sensing transmitter, and a sensing imprint associated with the sensing measurement.

In some embodiments, the device context includes information identifying the sensing transmitter and the sensing receiver of the sensing pair.

In some embodiments, determining the device context includes identifying a MAC address associated with the sensing measurement as a universal MAC address or a local MAC address.

In some embodiments, determining the device context further includes determining, responsive to identifying the MAC address as a universal MAC address, whether the MAC address is associated with a device context record.

In some embodiments, determining the device context further includes determining, responsive to the determination that the MAC address is associated with the device context record, the device context according to the device context record.

In some embodiments, determining the device context further includes determining, responsive to a determination that the MAC address is a local MAC address or a determination that the MAC address is a universal MAC address and is not associated with a device context record, a higher layer identification fingerprint associated with the sensing transmitter, determining whether the higher layer identification fingerprint is associated with a device context record, and determining, responsive to a determination that the higher layer identification fingerprint is associated with the device context record, the device context according to the device context record.

In some embodiments, determining the device context further includes determining, responsive to a determination that the MAC address is a local MAC address or a determination that the MAC address is a universal MAC address and is not associated with a device context record, a higher layer identification fingerprint associated with the sensing transmitter, determining whether the higher layer identification fingerprint is associated with a device context record, and establishing, responsive to a determination that the higher layer identification fingerprint is not associated with a device context record, a new device context as the device context.

In some embodiments, determining the device context further includes determining, responsive to a determination that the MAC address is a local MAC address or a determination that the MAC address is a universal MAC address and is not associated with a device context record, a sensing imprint associated with the sensing measurement, determining whether the sensing imprint is associated with a device context record, and determining, responsive to a determination that the sensing imprint is associated with a device context record, the device context according to the device context record.

In some embodiments, determining the device context further includes determining, responsive to a determination that the MAC address is a local MAC address or a determination that the MAC address is a universal MAC address and is not associated with a device context record, a sensing imprint associated with the sensing measurement, determining whether the sensing imprint is associated with a device context record, and establishing, responsive to a determination that the sensing imprint is not associated with a device context record, a new device context as the device context.

In some embodiments, determining the device context further includes determining, responsive to a determination that the MAC address is a local MAC address or a determination that the MAC address is a universal MAC address and is not associated with a device context record, a higher layer identification fingerprint associated with the sensing transmitter, determining whether the higher layer identification fingerprint is associated with a device context record, determining, responsive to a determination that the higher layer identification fingerprint is not associated with a device context record, a sensing imprint associated with the sensing measurement, and determining whether the sensing imprint is associated with a device context record.

In some embodiments, determining the device context further includes determining, responsive to a determination that the sensing imprint is associated with a device context record, the device context according to the device context record.

In some embodiments, determining the device context further includes establishing, responsive to a determination that the sensing imprint is not associated with a device context record, a new device context as the device context.

Other aspects and advantages of the disclosure will become apparent from the following detailed description, taken in conjunction with the accompanying drawings, which illustrate by way of example, the principles of the disclosure.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIG. 11 depicts a flowchart for executing a sensing algorithm according to a sensing measurement and a device context to generate a sensing result, according to some embodiments;

FIG. 12A and FIG. 12B depict a flowchart for updating a device context record corresponding to a device context, according to some embodiments;

FIG. 13A and FIG. 13B depict another flowchart for executing a sensing algorithm according to a sensing measurement and a device context to generate a sensing result, according to some embodiments;

FIG. 14A and FIG. 14B depict a flowchart for determining a device context of a sensing pair associated with a sensing transmission according to a device context record, according to some embodiments; and FIG. 15A and FIG. 15B depict a flowchart for establishing a new device context as a device context, according to some embodiments.

DETAILED DESCRIPTION

Figure 1:
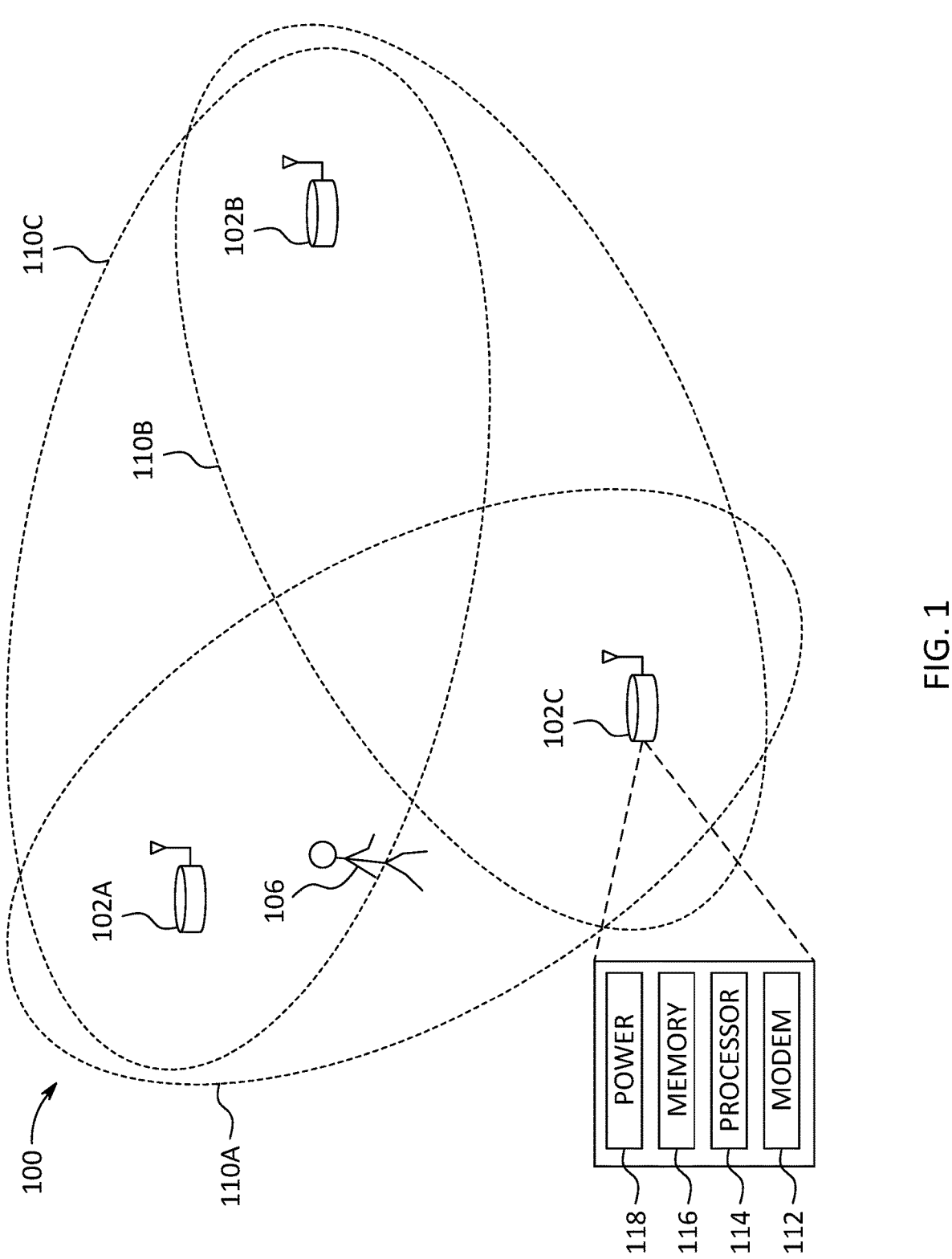
FIG. 1 is a diagram showing an example wireless communication system.

In some aspects of what is described here, a wireless sensing system can be used for a variety of wireless sensing applications by processing wireless signals (e.g., radio frequency signals) transmitted through a space between wireless communication devices. Example wireless sensing applications include motion detection, which can include the following: detecting motion of objects in the space, motion tracking, breathing detection, breathing monitoring, presence detection, gesture detection, gesture recognition, human detection (moving and stationary human detection), human tracking, fall detection, speed estimation, intrusion detection, walking detection, step counting, respiration rate detection, apnea estimation, posture change detection, activity recognition, gait rate classification, gesture decoding, sign language recognition, hand tracking, heart rate estimation, breathing rate estimation, room occupancy detection, human dynamics monitoring, and other types of motion detection applications. Other examples of wireless sensing applications include object recognition, speaking recognition, keystroke detection and recognition, tamper detection, touch detection, attack detection, user authentication, driver fatigue detection, traffic monitoring, smoking detection, school violence detection, human counting, metal detection, human recognition, bike localization, human queue estimation, Wi-Fi imaging, and other types of wireless sensing applications. For instance, the wireless sensing system may operate as a motion detection system to detect the existence and location of motion based on Wi-Fi signals or other types of wireless signals. As described in more detail below, a wireless sensing system may be configured to control measurement rates, wireless connections, and device participation, for example, to improve system operation or to achieve other technical advantages. The system improvements and technical advantages achieved when the wireless sensing system is used for motion detection are also achieved in examples where the wireless sensing system is used for another type of wireless sensing application.

In some example wireless sensing systems, a wireless signal includes a component (e.g., a synchronization preamble in a Wi-Fi PHY frame, or another type of component) that wireless devices can use to estimate a channel response or other channel information, and the wireless sensing system can detect motion (or another characteristic depending on the wireless sensing application) by analyzing changes in the channel information collected over time. In some examples, a wireless sensing system can operate similar to a bistatic radar system, where a Wi-Fi access point (AP) assumes the receiver role, and each Wi-Fi device (station or node or peer) connected to the AP assumes the transmitter role. The wireless sensing system may trigger a connected device to generate a transmission and produce a channel response measurement at a receiver device. This triggering process can be repeated periodically to obtain a sequence of time variant measurements. A wireless sensing algorithm may then receive the generated time-series of channel response measurements (e.g., computed by Wi-Fi receivers) as input, and through a correlation or filtering process, may then make a determination (e.g., determine if there is motion or no motion within the environment represented by the channel response, for example, based on changes or patterns in the channel estimations). In examples where the wireless sensing system detects motion, it may also be possible to identify a location of the motion within the environment based on motion detection results among a number of wireless devices.

Accordingly, wireless signals received at each of the wireless communication devices in a wireless communication network may be analyzed to determine channel information for the various communication links (between respective pairs of wireless communication devices) in the network. The channel information may be representative of a physical medium that applies a transfer function to wireless signals that traverse a space. In some instances, the channel information includes a channel response. Channel responses can characterize a physical communication path, representing the combined effect of, for example, scattering, fading, and power decay within the space between the transmitter and receiver. In some instances, the channel information includes beamforming state information (e.g., a feedback matrix, a steering matrix, channel state information (CSI), etc.) provided by a beamforming system. Beamforming is a signal processing technique often used in multi antenna (multiple-input/multiple-output (MIMO)) radio systems for directional signal transmission or reception. Beamforming can be achieved by operating elements in an antenna array in such a way that signals at particular angles experience constructive interference while others experience destructive interference.

The channel information for each of the communication links may be analyzed (e.g., by a hub device or other device in a wireless communication network, or a sensing transmitter communicably coupled to the network) to, for example, detect whether motion has occurred in the space, to determine a relative location of the detected motion, or both. In some aspects, the channel information for each of the communication links may be analyzed to detect whether an object is present or absent, e.g., when no motion is detected in the space.

In some cases, a wireless sensing system can control a node measurement rate. For instance, a Wi-Fi motion system may configure variable measurement rates (e.g., channel estimation/environment measurement/sampling rates) based on criteria given by a current wireless sensing application (e.g., motion detection). In some implementations, when no motion is present or detected for a period of time, for example, the wireless sensing system can reduce the rate that the environment is measured, such that the connected device will be triggered less frequently. In some implementations, when motion is present, for example, the wireless sensing system can increase the triggering rate to produce a time-series of measurements with finer time resolution. Controlling the variable measurement rate can allow energy conservation (through the device triggering), reduce processing (less data to correlate or filter), and improve resolution during specified times.

In some cases, a wireless sensing system can perform band steering or client steering of nodes throughout a wireless network, for example, in a Wi-Fi multi-AP or Extended Service Set (ESS) topology, multiple coordinating wireless APs each provide a Basic Service Set (BSS) which may occupy different frequency bands and allow devices to transparently move between from one participating AP to another (e.g., mesh). For instance, within a home mesh network, Wi-Fi devices can connect to any of the APs, but typically select one with a good signal strength. The coverage footprint of the mesh APs typically overlap, often putting each device within communication range or more than one AP. If the AP supports multi-bands (e.g., 2.4 GHz and 5 GHZ), the wireless sensing system may keep a device connected to the same physical AP but instruct it to use a different frequency band to obtain more diverse information to help improve the accuracy or results of the wireless sensing algorithm (e.g., motion detection algorithm). In some implementations, the wireless sensing system can change a device from being connected to one mesh AP to being connected to another mesh AP. Such device steering can be performed, for example, during wireless sensing (e.g., motion detection), based on criteria detected in a specific area to improve detection coverage, or to better localize motion within an area.

In some cases, beamforming may be performed between wireless communication devices based on some knowledge of the communication channel (e.g., through feedback properties generated by a receiver), which can be used to generate one or more steering properties (e.g., a steering matrix) that are applied by a transmitter device to shape the transmitted beam/signal in a particular direction or directions. Thus, changes to the steering or feedback properties used in the beamforming process indicate changes, which may be caused by moving objects, in the space accessed by the wireless communication system. For example, motion may be detected by substantial changes in the communication channel, e.g., as indicated by a channel response, or steering or feedback properties, or any combination thereof, over a period of time.

In some implementations, for example, a steering matrix may be generated at a transmitter device (beamformer) based on a feedback matrix provided by a receiver device (beamformee) based on channel sounding. Because the steering and feedback matrices are related to propagation characteristics of the channel, these matrices change as objects move within the channel. Changes in the channel characteristics are accordingly reflected in these matrices, and by analyzing the matrices, motion can be detected, and different characteristics of the detected motion can be determined. In some implementations, a spatial map may be generated based on one or more beamforming matrices. The spatial map may indicate a general direction of an object in a space relative to a wireless communication device. In some cases, many beamforming matrices (e.g., feedback matrices or steering matrices) may be generated to represent a multitude of directions that an object may be located relative to a wireless communication device. These many beamforming matrices may be used to generate the spatial map. The spatial map may be used to detect the presence of motion in the space or to detect a location of the detected motion.

In some instances, a motion detection system can control a variable device measurement rate in a motion detection process. For example, a feedback control system for a multi-node wireless motion detection system may adaptively change the sample rate based on the environment conditions. In some cases, such controls can improve operation of the motion detection system or provide other technical advantages. For example, the measurement rate may be controlled in a manner that optimizes or otherwise improves air-time usage versus detection ability suitable for a wide range of different environments and different motion detection applications. The measurement rate may be controlled in a manner that reduces redundant measurement data to be processed, thereby reducing processor load/power requirements. In some cases, the measurement rate is controlled in a manner that is adaptive, for instance, an adaptive sample can be controlled individually for each participating device. An adaptive sample rate can be used with a tuning control loop for different use cases, or device characteristics.

In some cases, a wireless sensing system can allow devices to dynamically indicate and communicate their wireless sensing capability or wireless sensing willingness to the wireless sensing system. For example, there may be times when a device does not want to be periodically interrupted or triggered to transmit a wireless signal that would allow the AP to produce a channel measurement. For instance, if a device is sleeping, frequently waking the device up to transmit or receive wireless sensing signals could consume resources (e.g., causing a cell-phone battery to discharge faster). These and other events could make a device willing or not willing to participate in wireless sensing system operations. In some cases, a cell phone running on its battery may not want to participate, but when the cell phone is plugged into the charger, it may be willing to participate. Accordingly, if the cell phone is unplugged, it may indicate to the wireless sensing system to exclude the cell phone from participating; whereas if the cell phone is plugged in, it may indicate to the wireless sensing system to include the cell phone in wireless sensing system operations. In some cases, if a device is under load (e.g., a device streaming audio or video) or busy performing a primary function, the device may not want to participate; whereas when the same device's load is reduced and participating will not interfere with a primary function, the device may indicate to the wireless sensing system that it is willing to participate.

Example wireless sensing systems are described below in the context of motion detection (detecting motion of objects in the space, motion tracking, breathing detection, breathing monitoring, presence detection, gesture detection, gesture recognition, human detection (moving and stationary human detection), human tracking, fall detection, speed estimation, intrusion detection, walking detection, step counting, respiration rate detection, apnea estimation, posture change detection, activity recognition, gait rate classification, gesture decoding, sign language recognition, hand tracking, heart rate estimation, breathing rate estimation, room occupancy detection, human dynamics monitoring, and other types of motion detection applications. However, the operation, system improvements, and technical advantages achieved when the wireless sensing system is operating as a motion detection system are also applicable in examples where the wireless sensing system is used for another type of wireless sensing application.

In various embodiments of the disclosure, non-limiting definitions of one or more terms that will be used in the document are provided below.

A term "measurement campaign" may refer to a bi-directional series of one or more sensing transmissions between a sensing receiver and a sensing transmitter that allows a series of one or more sensing measurements to be computed.

A term "channel state information (CSI)" may refer to properties of a communications channel that are known or measured by a technique of channel estimation. CSI may represent how wireless signals propagate from a sensing transmitter to a sensing receiver along multiple paths. CSI is typically a matrix of complex values representing the amplitude attenuation and phase shift of signals, which provides an estimation of a communications channel.

A term "sensing initiator" may refer to a device that initiates a Wi-Fi sensing session. The role of sensing initiator may be taken on by the sensing receiver, the sensing transmitter, or a separate device which includes a sensing algorithm (for example, a sensing algorithm manager).

A term "sensing transmitter" may refer to a device that sends a transmission (for example, PPDUs) used for sensing measurements (for example, channel state information) in a WLAN sensing session. In an example, a station is an example of a sensing transmitter. In some examples, an access point may also be a sensing transmitter for Wi-Fi sensing purposes in the example where a station acts as a sensing receiver.

A term "sensing receiver" may refer to a device that receives a transmission (for example, PPDUs) sent by a sensing transmitter and performs one or more sensing measurements (for example, channel state information) based on the transmission in WLAN sensing session. An access point is an example of a sensing receiver. In some examples, a station may also be a sensing receiver, for example in a mesh network scenario.

A term "transmission opportunity (TXOP)" may refer to a negotiated interval of time during which a particular quality of service (QOS) station (e.g., a sensing initiator or sensing transmitter) may have the right to initiate a frame exchange onto a wireless medium. A QOS access category (AC) of the transmission opportunity may be requested as part of a negotiation.

A term "Quality of Service (QOS) access category (AC)" may refer to an identifier for a frame which classifies a priority of transmission that the frame requires. In an example, four QoS access categories are defined namely AC_VI: Video, AC_VO: Voice, AC_BE: Best-Effort, and AC_BK: Background. Further, each QoS access category may have differing transmission opportunity parameters defined for it.

A term "transmission parameters" may refer to a set of IEEE 802.11 PHY transmitter configuration parameters which are defined as a part of transmission vector (TXVECTOR) corresponding to a specific PHY and which are configurable for each PHY-layer protocol data unit (PPDU) transmission.

A term "sensing trigger message" may refer to a message sent from a sensing transmitter to a sensing receiver to initiate or trigger one or more sensing transmissions that may be carried by an UL-OFDMA sensing trigger or an UL-OFDMA compound sensing trigger. The sensing trigger message may also be known as a sensing initiation message.

A term "sensing response message" may refer to a message which is included within the sensing transmission from the sensing transmitter to the sensing receiver. The sensing transmission that includes the sensing response message is used by the sensing receiver to perform a sensing measurement.

A term "sensing response announcement" may refer to a message that is included within a sensing transmission from a sensing transmitter to a sensing receiver that announces that a sensing response NDP will follow within a short interframe space (SIFS). The sensing response NDP may be transmitted using a requested transmission configuration.

A term "Short interframe space (SIFS)" may refer to a period within which a processing element (for example, a microprocessor, dedicated hardware, or any such element) within a device of a Wi-Fi sensing system is able to process data presented to it in a frame. In an example, the short interframe space may be 10 μs.

A term "sensing response NDP" may refer to a response transmitted by a sensing transmitter and used for a sensing measurement at a sensing receiver. The sensing response NDP may be used when a requested transmission configuration is incompatible with transmission parameters required for successful non-sensing message reception. The sensing response NDP may be announced by a sensing response announcement. In an example, the sensing response NDP may be implemented with a null data PPDU. In some examples, the sensing response NDP may be implemented with a frame that does not contain any data.

A term "requested transmission configuration" may refer to requested transmission parameters of a sensing transmitter to be used when sending a sensing transmission.

A term "delivered transmission configuration" may refer to transmission parameters applied by a sensing transmitter to a sensing transmission.

A term "steering matrix configuration" may refer to a matrix of complex values representing real and complex phase required to pre-condition antenna of a Radio Frequency (RF) transmission signal chain for each transmit signal. Application of the steering matrix configuration (for example, by a spatial mapper) enables beamforming and beam-steering.

A term "spatial mapper" may refer to a signal processing element that adjusts the amplitude and phase of a signal input to an RF transmission chain in a station or a sensing transmitter. The spatial mapper may include elements to process the signal to each RF chain implemented. The operation carried out is called spatial mapping. The output of the spatial mapper is one or more spatial streams.

A term "dynamic host configuration platform (DHCP)" may refer to a network management protocol used to automatically assign Internet Protocol (IP) addresses and communication parameters.

A term "domain name system (DNS)" may refer to domain names to IP addresses such that browsers can load Internet resources.

A term "Internet Protocol (IP) address" may refer to a unique address that is given to devices on the Internet according to the IP. IPv4 and IPV6 are different versions of the IP. The format for IPV4 addresses is four sets of numbers separated by dots, for example: '74.125.224.72'. This is a 32-bit format, which means that it allows for $2^{32}$ unique IP addresses. The need for more IP addresses led to the implementation of IPV6. IPv6 addresses use a more complex format that utilizes sets of numbers and letters separated by single or double colons, for example: '2607:f860: 4005:804::200e'. This 128-bit format can support $2^{128}$ unique addresses.

A term "sensing configuration" may refer to a user provided information representing the desired network connections between a sensing receiver and a sensing transmitter for Wi-Fi sensing purposes (for example, for connecting to a speaker (sensing transmitter). Sensing configuration may include the location, sensing participation preference, or other parameters.

A term "higher layer identification (HLI) fingerprint" may refer to a set of device identifiers that use information from higher networking layers and maps that information to the MAC layer for identification of a device.

A term "sensing imprint" may refer to a steady state or semi-static representation of a propagation channel between a sensing receiver and a sensing transmitter in a sensing space calculated by the sensing receiver in the form of a time domain channel impulse response.

A term "sensing session" may refer to an ecosystem of connected Wi-Fi sensing devices on one network at a point in time.

A term "device context" may represent an existence of a sensing transmitter and sensing receiver, and their connection in a Wi-Fi sensing system. In an example, device context may be a representation of parameters of two devices engaged in a sensing session. A sensing measurement may be associated with a device context.

A term "hostname" may represent an alpha-numeric text based human readable name that introduces the concept of a naming system. In an example, hostnames provide users with the ability to identify systems using a human readable name rather than numeric address.

A term "system administrator" may refer to an individual or a team who oversees a Wi-Fi sensing system and manages sensing elements on devices connected in a network.

A term "Internet Protocol (IP) parameters" may refer to transmission control protocol/internet protocol (TCP/IP) configuration parameters including hostname, DHCP client, domain name, IP address, netmask, broadcast address, DNS server(s), and default router amongst others.

A term "address resolution protocol (ARP) table" may refer to a table that is used to maintain a correlation between each MAC address and its corresponding IP address.

A term "sensing algorithm" may refer to a computational algorithm which receives a sensing goal. The sensing algorithm may be executed on a sensing receiver, a sensing initiator, or any other device in a Wi-Fi sensing system.

A term "access point (AP)" may refer to a device that creates a wireless local area network (WLAN).

A term "station (STA)" is a device that has a capability to use IEEE 802.11 protocol.

A term "association ID (AID)" may refer to an unsigned integer value between 1 and 2007 allocated to a station by an access point. The integer value may be independently and dynamically determined by the access point and is required to be unique only within the basic service set (BSS) that the station is a part of.

A term "sensing configuration message" may refer to a configuration message that may be used to pre-configure sensing transmissions from a sensing transmitter to a sensing receiver, for example, for a measurement campaign.

A term "sensing configuration response message" may refer to a response message to a sensing configuration message that indicates which configuration options are supported by a sensing transmitter, for example, transmission capability of the sensing transmitter. In an example, the sensing configuration response message may be sent from the sensing transmitter to the sensing receiver in response to the sensing configuration message.

A term "steady-state propagation channel" may refer to a channel between a sensing receiver and a sensing transmitter which is defined and affected only by the physical sensing space and does not account for any perturbations due to transient objects or motion.

A term "full time-domain channel representation information (full TD-CRI)" may refer to a series of complex pairs of time domain pulses which are created by performing an Inverse Fast Fourier Transform (IFFT) on CSI values, for example, CSI calculated by a baseband receiver.

A term "wireless local area network (WLAN) sensing session" may refer to a period during which objects in a physical space may be probed, detected and/or characterized. In an example, during a WLAN sensing session, several devices participate in, and thereby contribute to the generation of sensing measurements.

For purposes of reading the description of the various embodiments below, the following descriptions of the sections of the specifications and their respective contents may be helpful:

Section A describes a wireless communications system, wireless transmissions and sensing measurements which may be useful for practicing embodiments described herein.

Section B describes systems and methods that are useful for a Wi-Fi sensing system configurated to send sensing transmissions and make sensing measurements.

Section C describes embodiments of systems and methods for identifying devices within transmissions within a sensing network.

A. Wireless Communications System, Wireless Transmissions, and Sensing Measurements FIG. 1 illustrates wireless communication system 100. Wireless communication system 100 includes three wireless communication devices: first wireless communication device 102A, second wireless communication device 102B, and third wireless communication device 102C. Wireless communication system 100 may include additional wireless communication devices and other components (e.g., additional wireless communication devices, one or more network servers, network routers, network switches, cables, or other communication links, etc.).

Wireless communication devices 102A, 102B, 102C can operate in a wireless network, for example, according to a wireless network standard or another type of wireless communication protocol. For example, the wireless network may be configured to operate as a Wireless Local Area Network (WLAN), a Personal Area Network (PAN), a metropolitan area network (MAN), or another type of wireless network. Examples of WLANs include networks configured to operate according to one or more of the 802.11 family of standards developed by IEEE (e.g., Wi-Fi networks), and others. Examples of PANs include networks that operate according to short-range communication standards (e.g., BLUETOOTH®, Near Field Communication (NFC), Zig-Bee), millimeter wave communications, and others.

In some implementations, wireless communication devices 102A, 102B, 102C may be configured to communicate in a cellular network, for example, according to a cellular network standard. Examples of cellular networks include networks configured according to 2G standards such as Global System for Mobile (GSM) and Enhanced Data rates for GSM Evolution (EDGE) or EGPRS; 3G standards such as Code Division Multiple Access (CDMA), Wideband Code Division Multiple Access (WCDMA), Universal Mobile Telecommunications System (UMTS), and Time Division Synchronous Code Division Multiple Access (TD-SCDMA); 4G standards such as Long-Term Evolution (LTE) and LTE-Advanced (LTE-A); 5G standards, and others.

In the example shown in FIG. 1, wireless communication devices 102A, 102B, 102C can be, or they may include standard wireless network components. For example, wireless communication devices 102A, 102B, 102C may be commercially available Wi-Fi AP or another type of wireless access point (WAP) performing one or more operations as described herein that are embedded as instructions (e.g., software or firmware) on the modem of the WAP. In some cases, wireless communication devices 102A, 102B, 102C may be nodes of a wireless mesh network, such as, for example, a commercially available mesh network system (e.g., Plume Wi-Fi, Google Wi-Fi, Qualcomm Wi-Fi SON, etc.). In some cases, another type of standard or conventional Wi-Fi transmitter device may be used. In some instances, one or more of wireless communication devices 102A, 102B, 102C may be implemented as WAPs in a mesh network, while other wireless communication device(s) 102A, 102B, 102C are implemented as leaf devices (e.g., mobile devices, smart devices, etc.) that access the mesh network through one of the WAPs. In some cases, one or more of wireless communication devices 102A, 102B, 102C is a mobile device (e.g., a smartphone, a smart watch, a tablet, a laptop computer, etc.), a wireless-enabled device (e.g., a smart thermostat, a Wi-Fi enabled camera, a smart TV), or another type of device that communicates in a wireless network.

Wireless communication devices 102A, 102B, 102C may be implemented without Wi-Fi components; for example, other types of standard or non-standard wireless communication may be used for motion detection. In some cases, wireless communication devices 102A, 102B, 102C can be, or they may be part of, a dedicated motion detection system. For example, the dedicated motion detection system can include a hub device and one or more beacon devices (as remote sensor devices), and wireless communication devices 102A, 102B, 102C can be either a hub device or a beacon device in the motion detection system.

As shown in FIG. 1, wireless communication device 102C includes modem 112, processor 114, memory 116, and power unit 118; any of wireless communication devices 102A, 102B, 102C in wireless communication system 100 may include the same, additional, or different components, and the components may be configured to operate as shown in FIG. 1 or in another manner. In some implementations, modem 112, processor 114, memory 116, and power unit 118 of a wireless communication device are housed together in a common housing or other assembly. In some implementations, one or more of the components of a wireless communication device can be housed separately, for example, in a separate housing or other assembly.

Modem 112 can communicate (receive, transmit, or both) wireless signals. For example, modem 112 may be configured to communicate radio frequency (RF) signals formatted according to a wireless communication standard (e.g., Wi-Fi or Bluetooth). Modem 112 may be implemented as the example wireless network modem 112 shown in FIG. 1, or may be implemented in another manner, for example, with other types of components or subsystems. In some implementations, modem 112 includes a radio subsystem and a baseband subsystem. In some cases, the baseband subsystem and radio subsystem can be implemented on a common chip or chipset, or they may be implemented in a card or another type of assembled device. The baseband subsystem can be coupled to the radio subsystem, for example, by leads, pins, wires, or other types of connections.

In some cases, a radio subsystem in modem 112 can include one or more antennas and radio frequency circuitry. The radio frequency circuitry can include, for example, circuitry that filters, amplifies, or otherwise conditions analog signals, circuitry that up-converts baseband signals to RF signals, circuitry that down-converts RF signals to baseband signals, etc. Such circuitry may include, for example, filters, amplifiers, mixers, a local oscillator, etc. The radio subsystem can be configured to communicate radio frequency wireless signals on the wireless communication channels. As an example, the radio subsystem may include a radio chip, an RF front end, and one or more antennas. A radio subsystem may include additional or different components. In some implementations, the radio subsystem can be or include the radio electronics (e.g., RF front end, radio chip, or analogous components) from a conventional modem, for example, from a Wi-Fi modem, pico base station modem, etc. In some implementations, the antenna includes multiple antennas.

In some cases, a baseband subsystem in modem 112 can include, for example, digital electronics configured to process digital baseband data. As an example, the baseband subsystem may include a baseband chip. A baseband subsystem may include additional or different components. In some cases, the baseband subsystem may include a digital signal processor (DSP) device or another type of processor device. In some cases, the baseband system includes digital processing logic to operate the radio subsystem, to communicate wireless network traffic through the radio subsystem, to detect motion based on motion detection signals received through the radio subsystem or to perform other types of processes. For instance, the baseband subsystem may include one or more chips, chipsets, or other types of devices that are configured to encode signals and deliver the encoded signals to the radio subsystem for transmission, or to identify and analyze data encoded in signals from the radio subsystem (e.g., by decoding the signals according to a wireless communication standard, by processing the signals according to a motion detection process, or otherwise).

In some instances, the radio subsystem in modem 112 receives baseband signals from the baseband subsystem, up-converts the baseband signals to radio frequency (RF) signals, and wirelessly transmits the radio frequency signals (e.g., through an antenna). In some instances, the radio subsystem in modem 112 wirelessly receives radio frequency signals (e.g., through an antenna), down-converts the radio frequency signals to baseband signals, and sends the baseband signals to the baseband subsystem. The signals exchanged between the radio subsystem, and the baseband subsystem may be digital or analog signals. In some examples, the baseband subsystem includes conversion circuitry (e.g., a digital-to-analog converter, an analog-to-digital converter) and exchanges analog signals with the radio subsystem. In some examples, the radio subsystem includes conversion circuitry (e.g., a digital-to-analog converter, an analog-to-digital converter) and exchanges digital signals with the baseband subsystem.

In some cases, the baseband subsystem of modem 112 can communicate wireless network traffic (e.g., data packets) in the wireless communication network through the radio subsystem on one or more network traffic channels. The baseband subsystem of modem 112 may also transmit or receive (or both) signals (e.g., motion probe signals or motion detection signals) through the radio subsystem on a dedicated wireless communication channel. In some instances, the baseband subsystem generates motion probe signals for transmission, for example, to probe a space for motion. In some instances, the baseband subsystem processes received motion detection signals (signals based on motion probe signals transmitted through the space), for example, to detect motion of an object in a space.

Processor 114 can execute instructions, for example, to generate output data based on data inputs. The instructions can include programs, codes, scripts, or other types of data stored in memory. Additionally, or alternatively, the instructions can be encoded as pre-programmed or re-programmable logic circuits, logic gates, or other types of hardware or firmware components. Processor 114 may be or include a general-purpose microprocessor, as a specialized co-processor or another type of data processing apparatus. In some cases, processor 114 performs high level operation of the wireless communication device 102C. For example, processor 114 may be configured to execute or interpret software, scripts, programs, functions, executables, or other instructions stored in memory 116. In some implementations, processor 114 may be included in modem 112.

Memory 116 can include computer-readable storage media, for example, a volatile memory device, a non-volatile memory device, or both. Memory 116 can include one or more read-only memory devices, random-access memory devices, buffer memory devices, or a combination of these and other types of memory devices. In some instances, one or more components of the memory can be integrated or otherwise associated with another component of wireless communication device 102C. Memory 116 may store instructions that are executable by processor 114. For example, the instructions may include instructions for time-aligning signals using an interference buffer and a motion detection buffer, such as through one or more of the operations of the example processes as described in any of FIG. 11, FIG. 12A, FIG. 12B, FIG. 13A, FIG. 13B, FIG. 14A, FIG. 14B, FIG. 15A, and FIG. 15B.

Power unit 118 provides power to the other components of wireless communication device 102C. For example, the other components may operate based on electrical power provided by power unit 118 through a voltage bus or other connection. In some implementations, power unit 118 includes a battery or a battery system, for example, a rechargeable battery. In some implementations, power unit 118 includes an adapter (e.g., an AC adapter) that receives an external power signal (from an external source) and coverts the external power signal to an internal power signal conditioned for a component of wireless communication device 102C. Power unit 118 may include other components or operate in another manner.

In the example shown in FIG. 1, wireless communication devices 102A, 102B transmit wireless signals (e.g., according to a wireless network standard, a motion detection protocol, or otherwise). For instance, wireless communication devices 102A, 102B may broadcast wireless motion probe signals (e.g., reference signals, beacon signals, status signals, etc.), or they may send wireless signals addressed to other devices (e.g., a user equipment, a client device, a server, etc.), and the other devices (not shown) as well as wireless communication device 102C may receive the wireless signals transmitted by wireless communication devices 102A, 102B. In some cases, the wireless signals transmitted by wireless communication devices 102A, 102B are repeated periodically, for example, according to a wireless communication standard or otherwise.

In the example shown, wireless communication device 102C processes the wireless signals from wireless communication devices 102A, 102B to detect motion of an object in a space accessed by the wireless signals, to determine a location of the detected motion, or both. For example, wireless communication device 102C may perform one or more operations of the example processes described below with respect to any of FIG. 11, FIG. 12A, FIG. 12B, FIG. 13A, FIG. 13B, FIG. 14A, FIG. 14B, FIG. 15A, and FIG. 15B, or another type of process for detecting motion or determining a location of detected motion. The space accessed by the wireless signals can be an indoor or outdoor space, which may include, for example, one or more fully or partially enclosed areas, an open area without enclosure, etc. The space can be or can include an interior of a room, multiple rooms, a building, or the like. In some cases, the wireless communication system 100 can be modified, for instance, such that wireless communication device 102C can transmit wireless signals and wireless communication devices 102A, 102B can processes the wireless signals from wireless communication device 102C to detect motion or determine a location of detected motion.

The wireless signals used for motion detection can include, for example, a beacon signal (e.g., Bluetooth Beacons, Wi-Fi Beacons, other wireless beacon signals), another standard signal generated for other purposes according to a wireless network standard, or non-standard signals (e.g., random signals, reference signals, etc.) generated for motion detection or other purposes. In examples, motion detection may be carried out by analyzing one or more training fields carried by the wireless signals or by analyzing other data carried by the signal. In some examples data will be added for the express purpose of motion detection or the data used will nominally be for another purpose and reused or repurposed for motion detection. In some examples, the wireless signals propagate through an object (e.g., a wall) before or after interacting with a moving object, which may allow the moving object's movement to be detected without an optical line-of-sight between the moving object and the transmission or receiving hardware. Based on the received signals, wireless communication device 102C may generate motion detection data. In some instances, wireless communication device 102C may communicate the motion detection data to another device or system, such as a security system, which may include a control center for monitoring movement within a space, such as a room, building, outdoor area, etc.

In some implementations, wireless communication devices 102A, 102B can be modified to transmit motion probe signals (which may include, e.g., a reference signal, beacon signal, or another signal used to probe a space for motion) on a separate wireless communication channel (e.g., a frequency channel or coded channel) from wireless network traffic signals. For example, the modulation applied to the payload of a motion probe signal and the type of data or data structure in the payload may be known by wireless communication device 102C, which may reduce the amount of processing that wireless communication device 102C performs for motion sensing. The header may include additional information such as, for example, an indication of whether motion was detected by another device in communication system 100, an indication of the modulation type, an identification of the device transmitting the signal, etc.

In the example shown in FIG. 1, wireless communication system 100 is a wireless mesh network, with wireless communication links between each of wireless communication devices 102. In the example shown, the wireless communication link between wireless communication device 102C and wireless communication device 102A can be used to probe motion detection field 110A, the wireless communication link between wireless communication device 102C and wireless communication device 102B can be used to probe motion detection field 110B, and the wireless communication link between wireless communication device 102A and wireless communication device 102B can be used to probe motion detection field 110C. In some instances, each wireless communication device 102 detects motion in motion detection fields 110 accessed by that device by processing received signals that are based on wireless signals transmitted by wireless communication devices 102 through motion detection fields 110. For example, when person 106 shown in FIG. 1 moves in motion detection field 110A and motion detection field 110C, wireless communication devices 102 may detect the motion based on signals they received that are based on wireless signals transmitted through respective motion detection fields 110. For instance, wireless communication device 102A can detect motion of person 106 in motion detection fields 110A, 110C, wireless communication device 102B can detect motion of person 106 in motion detection field 110C, and wireless communication device 102C can detect motion of person 106 in motion detection field 110A.

In some instances, motion detection fields 110 can include, for example, air, solid materials, liquids, or another medium through which wireless electromagnetic signals may propagate. In the example shown in FIG. 1, motion detection field 110A provides a wireless communication channel between wireless communication device 102A and wireless communication device 102C, motion detection field 110B provides a wireless communication channel between wireless communication device 102B and wireless communication device 102C, and motion detection field 110C provides a wireless communication channel between wireless communication device 102A and wireless communication device 102B. In some aspects of operation, wireless signals transmitted on a wireless communication channel (separate from or shared with the wireless communication channel for network traffic) are used to detect movement of an object in a space. The objects can be any type of static or moveable object and can be living or inanimate. For example, the object can be a human (e.g., person 106 shown in FIG. 1), an animal, an inorganic object, or another device, apparatus, or assembly), an object that defines all or part of the boundary of a space (e.g., a wall, door, window, etc.), or another type of object. In some implementations, motion information from the wireless communication devices may be analyzed to determine a location of the detected motion. For example, as described further below, one of wireless communication devices 102 (or another device communicably coupled to wireless communications devices 102) may determine that the detected motion is nearby a particular wireless communication device.

Figure 2A:
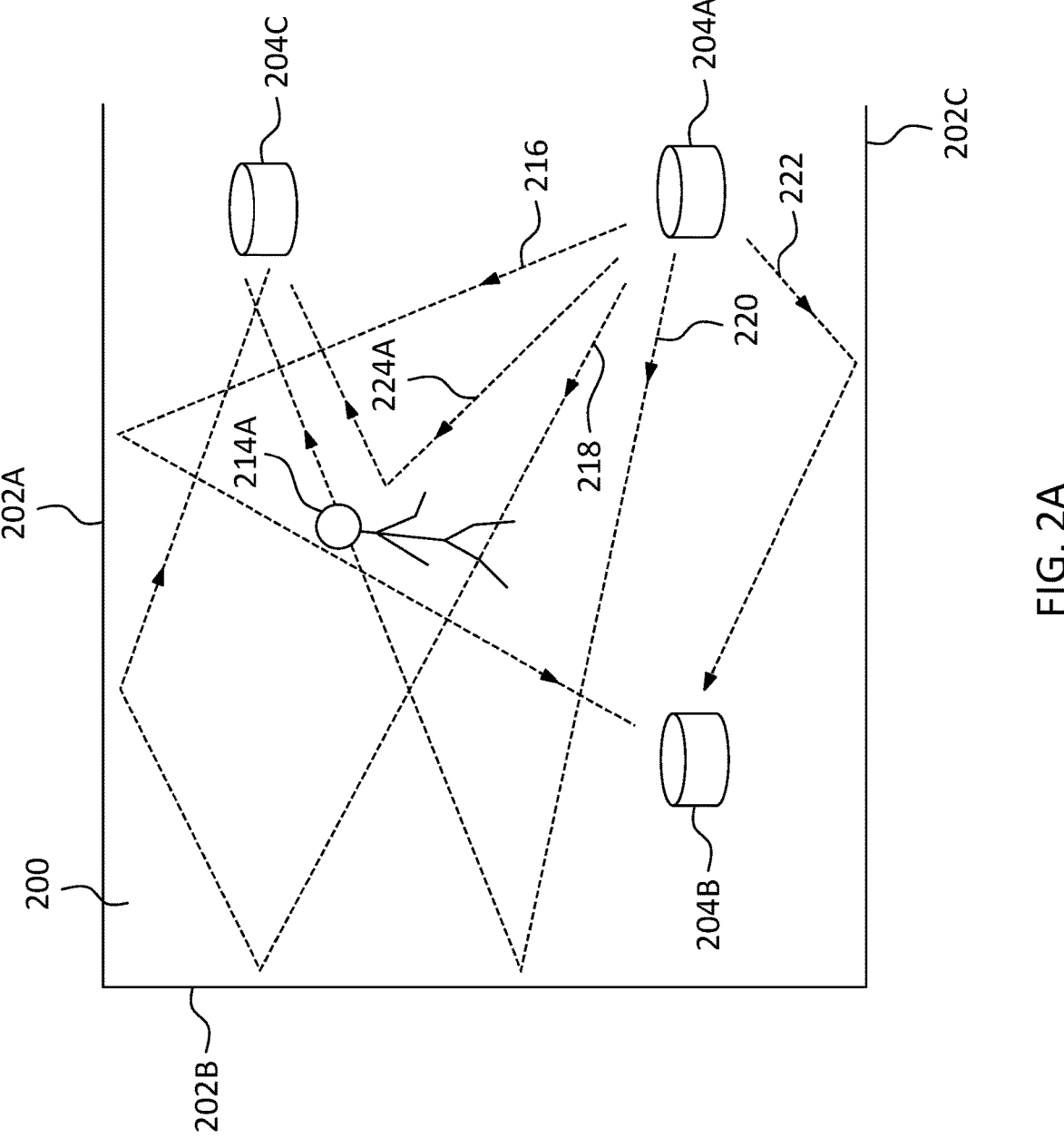
FIG. 2A and FIG. 2B are diagrams showing example wireless signals communicated between wireless communication devices.
Figure 2B:
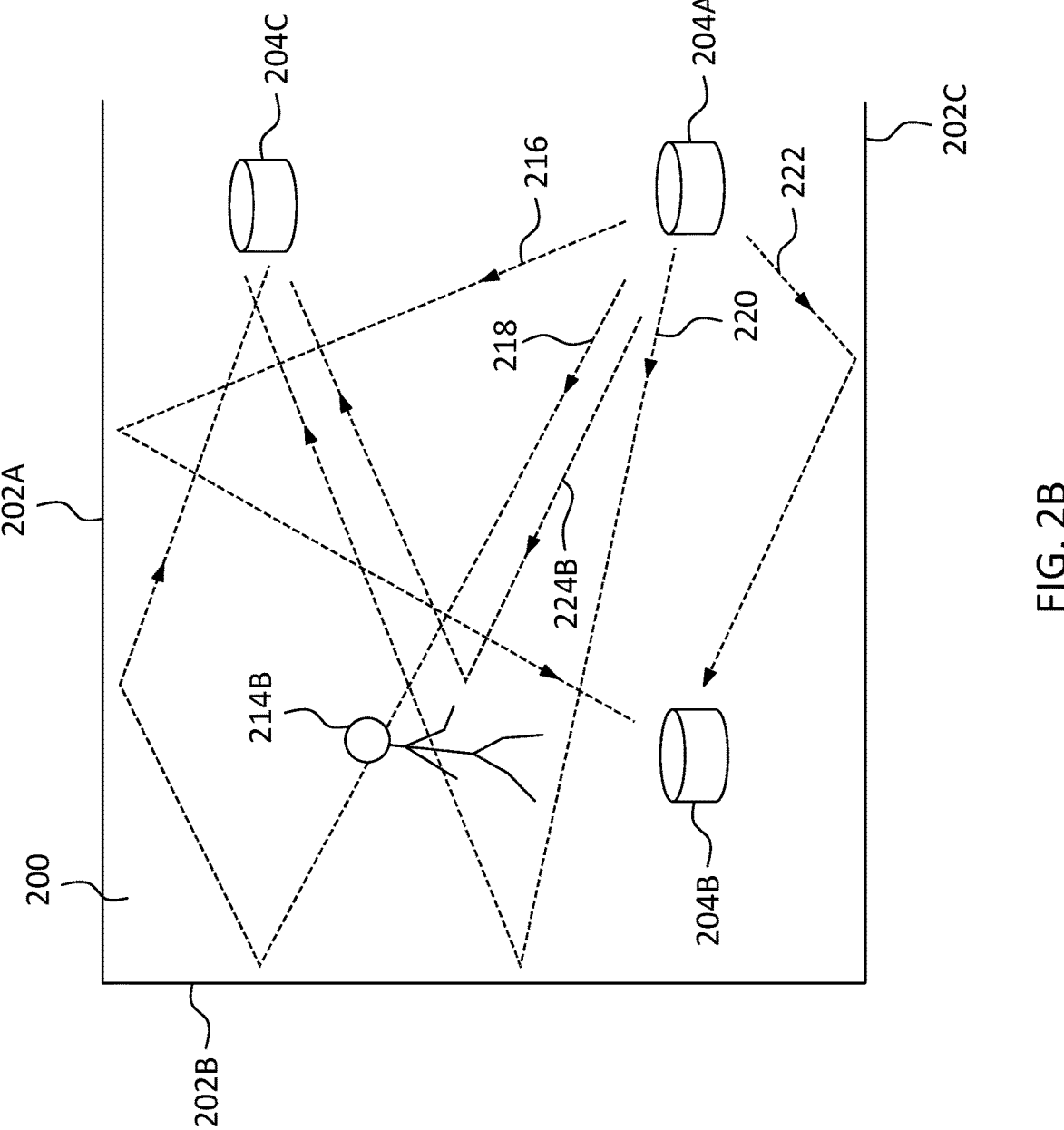

FIG. 2A and FIG. 2B are diagrams showing example wireless signals communicated between wireless communication devices 204A, 204B, 204C. Wireless communication devices 204A, 204B, 204C can be, for example, wireless communication devices 102A, 102B, 102C shown in FIG. 1, or other types of wireless communication devices. Wireless communication devices 204A, 204B, 204C transmit wireless signals through space 200. Space 200 can be completely or partially enclosed or open at one or more boundaries. Space 200 can be or can include an interior of a room, multiple rooms, a building, an indoor area, outdoor area, or the like. First wall 202A, second wall 202B, and third wall 202C at least partially enclose space 200 in the example shown.

In the example shown in FIG. 2A and FIG. 2B, wireless communication device 204A is operable to transmit wireless signals repeatedly (e.g., periodically, intermittently, at scheduled, unscheduled, or random intervals, etc.). Wireless communication devices 204B, 204C are operable to receive signals based on those transmitted by wireless communication device 204A. Wireless communication devices 204B, 204C each have a modem (e.g., modem 112 shown in FIG. 1) that is configured to process received signals to detect motion of an object in space 200.

As shown, an object is in first position 214A in FIG. 2A, and the object has moved to second position 214B in FIG. 2B. In FIG. 2A and FIG. 2B, the moving object in space 200 is represented as a human, but the moving object can be another type of object. For example, the moving object can be an animal, an inorganic object (e.g., a system, device, apparatus, or assembly), an object that defines all or part of the boundary of space 200 (e.g., a wall, door, window, etc.), or another type of object.

As shown in FIG. 2A and FIG. 2B, multiple example paths of the wireless signals transmitted from wireless communication device 204A are illustrated by dashed lines. Along first signal path 216, the wireless signal is transmitted from wireless communication device 204A and reflected off first wall 202A toward the wireless communication device 204B. Along second signal path 218, the wireless signal is transmitted from the wireless communication device 204A and reflected off second wall 202B and first wall 202A toward wireless communication device 204C. Along third signal path 220, the wireless signal is transmitted from the wireless communication device 204A and reflected off second wall 202B toward wireless communication device 204C. Along fourth signal path 222, the wireless signal is transmitted from the wireless communication device 204A and reflected off third wall 202C toward the wireless communication device 204B.

In FIG. 2A, along fifth signal path 224A, the wireless signal is transmitted from wireless communication device 204A and reflected off the object at first position 214A toward wireless communication device 204C. Between FIG. 2A and FIG. 2B, a surface of the object moves from first position 214A to second position 214B in space 200 (e.g., some distance away from first position 214A). In FIG. 2B, along sixth signal path 224B, the wireless signal is transmitted from wireless communication device 204A and reflected off the object at second position 214B toward wireless communication device 204C. Sixth signal path 224B depicted in FIG. 2B is longer than fifth signal path 224A depicted in FIG. 2A due to the movement of the object from first position 214A to second position 214B. In some examples, a signal path can be added, removed, or otherwise modified due to movement of an object in a space.

The example wireless signals shown in FIG. 2A and FIG. 2B may experience attenuation, frequency shifts, phase shifts, or other effects through their respective paths and may have portions that propagate in another direction, for example, through the first, second and third walls 202A, 202B, and 202C. In some examples, the wireless signals are radio frequency (RF) signals. The wireless signals may include other types of signals.

In the example shown in FIG. 2A and FIG. 2B, wireless communication device 204A can repeatedly transmit a wireless signal. In particular, FIG. 2A shows the wireless signal being transmitted from wireless communication device 204A at a first time, and FIG. 2B shows the same wireless signal being transmitted from wireless communication device 204A at a second, later time. The transmitted signal can be transmitted continuously, periodically, at random or intermittent times or the like, or a combination thereof. The transmitted signal can have a number of frequency components in a frequency bandwidth. The transmitted signal can be transmitted from wireless communication device 204A in an omnidirectional manner, in a directional manner or otherwise. In the example shown, the wireless signals traverse multiple respective paths in space 200, and the signal along each path may become attenuated due to path losses, scattering, reflection, or the like and may have a phase or frequency offset.

As shown in FIG. 2A and FIG. 2B, the signals from first to sixth paths 216, 218, 220, 222, 224A, and 224B combine at wireless communication device 204C and wireless communication device 204B to form received signals. Because of the effects of the multiple paths in space 200 on the transmitted signal, space 200 may be represented as a transfer function (e.g., a filter) in which the transmitted signal is input and the received signal is output. When an object moves in space 200, the attenuation or phase offset affected upon a signal in a signal path can change, and hence, the transfer function of space 200 can change. Assuming the same wireless signal is transmitted from wireless communication device 204A, if the transfer function of space 200 changes, the output of that transfer function—the received signal—will also change. A change in the received signal can be used to detect movement of an object.

Mathematically, a transmitted signal f(t) transmitted from the first wireless communication device 204A may be described according to Equation (1):

$$f(t) = \sum_{n=-\infty}^{\infty} c_n e^{j\omega_n t} \tag{1}$$

Where $\omega_n$ represents the frequency of nth frequency component of the transmitted signal, $c_n$ represents the complex coefficient of the nth frequency component, and t represents time. With the transmitted signal f(t) being transmitted from the first wireless communication device 204A, an output signal $r_k(t)$ from a path k may be described according to Equation (2):

$$r_k(t) = \sum_{n=-\infty}^{\infty} \alpha_{n,k} c_n e^{j(\omega_n t + \phi_{n,k})} \tag{2}$$

Where $\alpha_{n,k}$ represents an attenuation factor (or channel response; e.g., due to scattering, reflection, and path losses) for the nth frequency component along path k, and $\phi_{n,k}$ represents the phase of the signal for nth frequency component along path k. Then, the received signal R at a wireless communication device can be described as the summation of all output signals $r_k(t)$ from all paths to the wireless communication device, which is shown in Equation (3):

$$R = \sum_k r_k(t) \tag{3}$$

Substituting Equation (2) into Equation (3) renders the following Equation (4):

$$R = \sum_k \sum_{n=-\infty}^{\infty} (\alpha_{n,k} e^{j\phi_{n,k}}) c_n e^{j\omega_n t} \tag{4}$$

The received signal R at a wireless communication device can then be analyzed. The received signal R at a wireless communication device can be transformed to the frequency domain, for example, using a Fast Fourier Transform (FFT) or another type of algorithm. The transformed signal can represent the received signal R as a series of n complex values, one for each of the respective frequency components (at the n frequencies $\omega_n$). For a frequency component at frequency $\omega_n$, a complex value $H_n$ may be represented as follows in Equation (5):

$$H_n = \sum_k c_n \alpha_{n,k} e^{j\phi_{n,k}} \tag{5}$$

The complex value $H_n$ for a given frequency component on indicates a relative magnitude and phase offset of the received signal at that frequency component $\omega_n$. When an object moves in the space, the complex value $H_n$ changes due to the channel response $\alpha_{n,k}$ of the space changing. Accordingly, a change detected in the channel response can be indicative of movement of an object within the communication channel. In some instances, noise, interference, or other phenomena can influence the channel response detected by the receiver, and the motion detection system can reduce or isolate such influences to improve the accuracy and quality of motion detection capabilities. In some implementations, the overall channel response can be represented as follows in Equation (6):

$$h_{ch} = \sum_k \sum_{n=-\infty}^{\infty} \alpha_{n,k} \tag{6}$$

In some instances, the channel response $h_{ch}$ for a space can be determined, for example, based on the mathematical theory of estimation. For instance, a reference signal $R_{ef}$ can be modified with candidate channel responses ($h_{ch}$), and then a maximum likelihood approach can be used to select the candidate channel which gives best match to the received signal ($R_{cvd}$). In some cases, an estimated received signal ($\hat{R}_{cvd}$) is obtained from the convolution of the reference signal ($R_{ef}$) with the candidate channel responses ($h_{ch}$), and then the channel coefficients of the channel response ($h_{ch}$) are varied to minimize the squared error of the estimated received signal ($\hat{R}_{cvd}$). This can be mathematically illustrated as follows in Equation (7):

$$R_{cvd} = R_{ef} \otimes h_{ch} = \sum_{k=-m}^{m} R_{ef}(n-k) h_{ch}(k) \tag{7}$$

with the optimization criterion $$\min_{h_{ch}} \sum (\hat{R}_{cvd} - R_{cvd})^2$$

The minimizing, or optimizing, process can utilize an adaptive filtering technique, such as Least Mean Squares (LMS), Recursive Least Squares (RLS), Batch Least Squares (BLS), etc. The channel response can be a Finite Impulse Response (FIR) filter, Infinite Impulse Response (IIR) filter, or the like. As shown in the equation above, the received signal can be considered as a convolution of the reference signal and the channel response. The convolution operation means that the channel coefficients possess a degree of correlation with each of the delayed replicas of the reference signal. The convolution operation as shown in the equation above, therefore shows that the received signal appears at different delay points, each delayed replica being weighted by the channel coefficient.

Figures 3A, 3B:
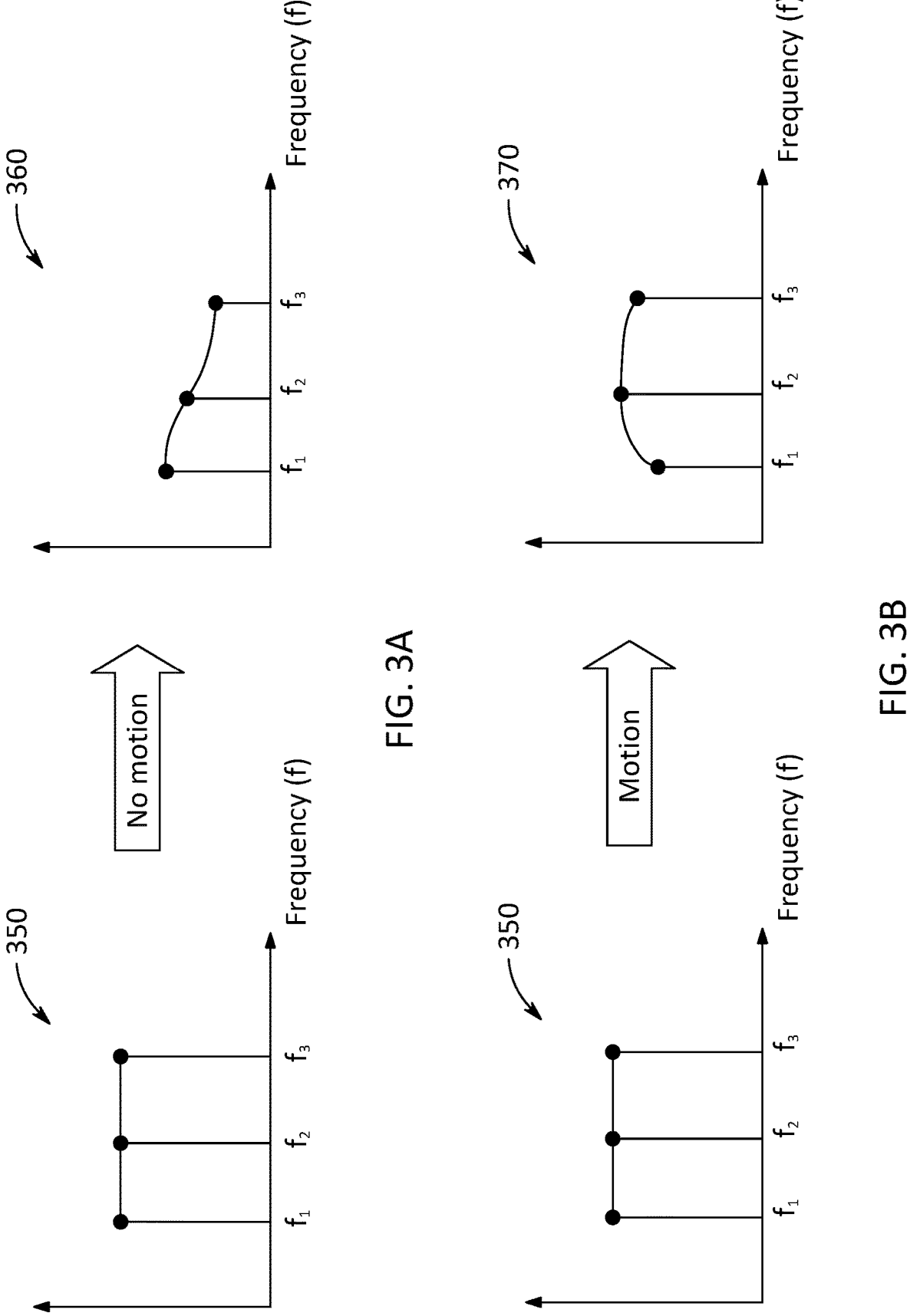
FIG. 3A and FIG. 3B are plots showing examples of channel responses computed from the wireless signals communicated between wireless communication devices in FIG. 2A and FIG. 2B.

FIG. 3A and FIG. 3B are plots showing examples of channel responses 360, 370 computed from the wireless signals communicated between wireless communication devices 204A, 204B, 204C in FIG. 2A and FIG. 2B. FIG. 3A and FIG. 3B also show frequency domain representation 350 of an initial wireless signal transmitted by wireless communication device 204A. In the examples shown, channel response 360 in FIG. 3A represents the signals received by wireless communication device 204B when there is no motion in space 200, and channel response 370 in FIG. 3B represents the signals received by wireless communication device 204B in FIG. 2B after the object has moved in space 200.

In the example shown in FIG. 3A and FIG. 3B, for illustration purposes, wireless communication device 204A transmits a signal that has a flat frequency profile (the magnitude of each frequency component $f_1$, $f_2$, and $f_3$ is the same), as shown in frequency domain representation 350. Because of the interaction of the signal with space 200 (and the objects therein), the signals received at wireless communication device 204B that are based on the signal sent from wireless communication device 204A look different from the transmitted signal. In this example, where the transmitted signal has a flat frequency profile, the received signal represents the channel response of space 200. As shown in FIG. 3A and FIG. 3B, channel responses 360, 370 are different from frequency domain representation 350 of the transmitted signal. When motion occurs in space 200, a variation in the channel response will also occur. For example, as shown in FIG. 3B, channel response 370 that is associated with motion of object in space 200 varies from channel response 360 that is associated with no motion in space 200.

Furthermore, as an object moves within space 200, the channel response may vary from channel response 370. In some cases, space 200 can be divided into distinct regions and the channel responses associated with each region may share one or more characteristics (e.g., shape), as described below. Thus, motion of an object within different distinct regions can be distinguished, and the location of detected motion can be determined based on an analysis of channel responses.

Figure 4A:
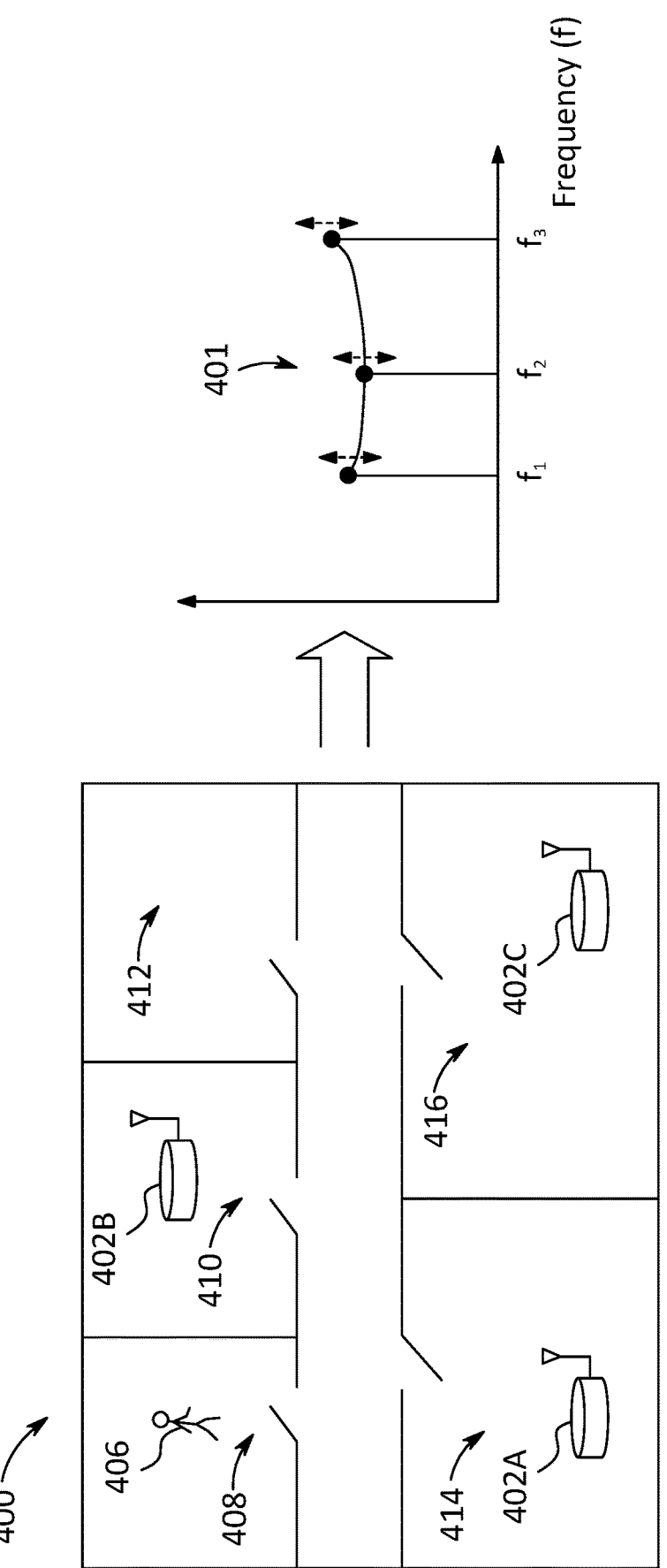
FIG. 4A and FIG. 4B are diagrams showing example channel responses associated with motion of an object in distinct regions of a space.
Figure 4B:
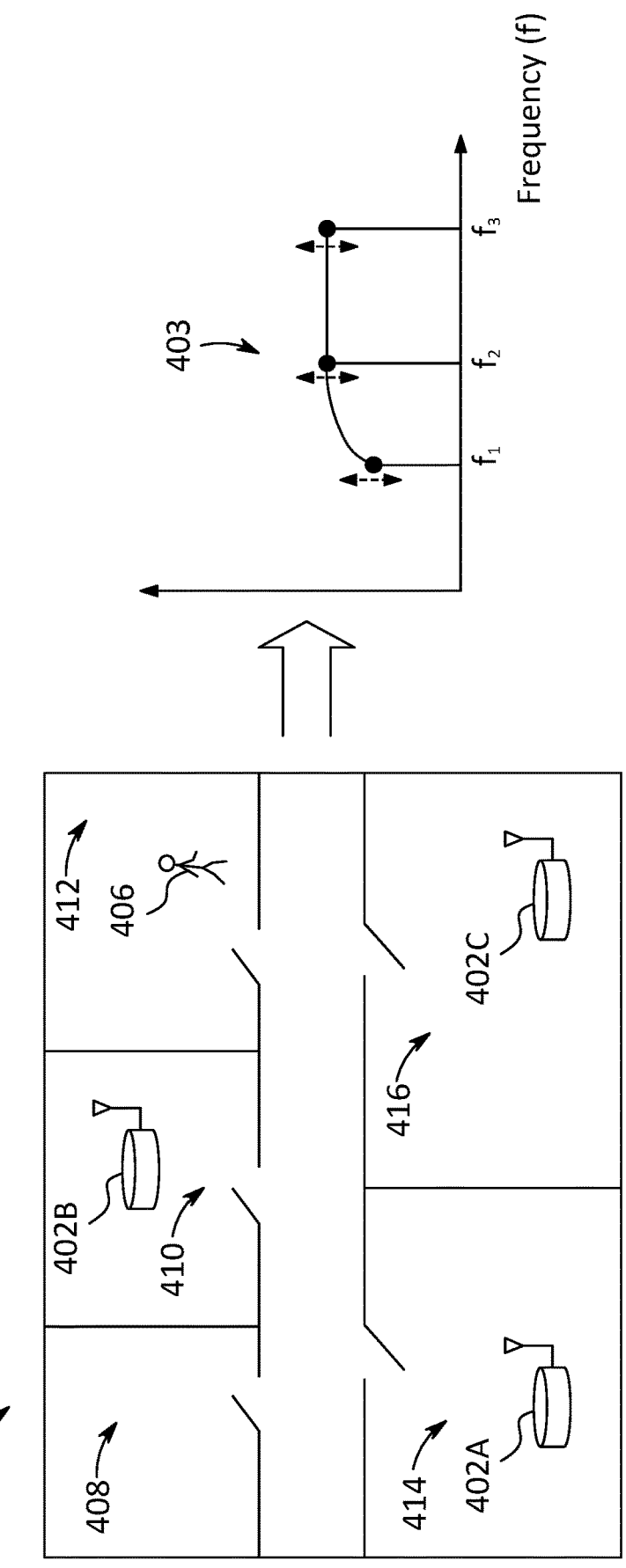

FIG. 4A and FIG. 4B are diagrams showing example channel responses 401, 403 associated with motion of object 406 in distinct regions 408, 412 of space 400. In the examples shown, space 400 is a building, and space 400 is divided into a plurality of distinct regions—first region 408, second region 410, third region 412, fourth region 414, and fifth region 416. Space 400 may include additional or fewer regions, in some instances. As shown in FIG. 4A and FIG. 4B, the regions within space 400 may be defined by walls between rooms. In addition, the regions may be defined by ceilings between floors of a building. For example, space 400 may include additional floors with additional rooms. In addition, in some instances, the plurality of regions of a space can be or include a number of floors in a multistory building, a number of rooms in the building, or a number of rooms on a particular floor of the building. In the example shown in FIG. 4A, an object located in first region 408 is represented as person 106, but the moving object can be another type of object, such as an animal or an inorganic object.

In the example shown, wireless communication device 402A is located in fourth region 414 of space 400, wireless communication device 402B is located in second region 410 of space 400, and wireless communication device 402C is located in fifth region 416 of space 400. Wireless communication devices 402 can operate in the same or similar manner as wireless communication devices 102 of FIG. 1. For instance, wireless communication devices 402 may be configured to transmit and receive wireless signals and detect whether motion has occurred in space 400 based on the received signals. As an example, wireless communication devices 402 may periodically or repeatedly transmit motion probe signals through space 400, and receive signals based on the motion probe signals. Wireless communication devices 402 can analyze the received signals to detect whether an object has moved in space 400, such as, for example, by analyzing channel responses associated with space 400 based on the received signals. In addition, in some implementations, wireless communication devices 402 can analyze the received signals to identify a location of detected motion within space 400. For example, wireless communication devices 402 can analyze characteristics of the channel response to determine whether the channel responses share the same or similar characteristics to channel responses known to be associated with first to fifth regions 408, 410, 412, 414, 416 of space 400.

In the examples shown, one (or more) of wireless communication devices 402 repeatedly transmits a motion probe signal (e.g., a reference signal) through space 400. The motion probe signals may have a flat frequency profile in some instances, wherein the magnitude of each frequency component $f_1$, $f_2$, and $f_3$. For example, the motion probe signals may have a frequency response similar to frequency domain representation 350 shown in FIG. 3A and FIG. 3B. The motion probe signals may have a different frequency profile in some instances. Because of the interaction of the reference signal with space 400 (and the objects therein), the signals received at another wireless communication device 402 that are based on the motion probe signal transmitted from the other wireless communication device 402 are different from the transmitted reference signal.

Based on the received signals, wireless communication devices 402 can determine a channel response for space 400. When motion occurs in distinct regions within the space, distinct characteristics may be seen in the channel responses. For example, while the channel responses may differ slightly for motion within the same region of space 400, the channel responses associated with motion in distinct regions may generally share the same shape or other characteristics. For instance, channel response 401 of FIG. 4A represents an example channel response associated with motion of object 406 in first region 408 of space 400, while channel response 403 of FIG. 4B represents an example channel response associated with motion of object 406 in third region 412 of space 400. Channel responses 401, 403 are associated with signals received by the same wireless communication device 402 in space 400.

Figures 4C, 4D:
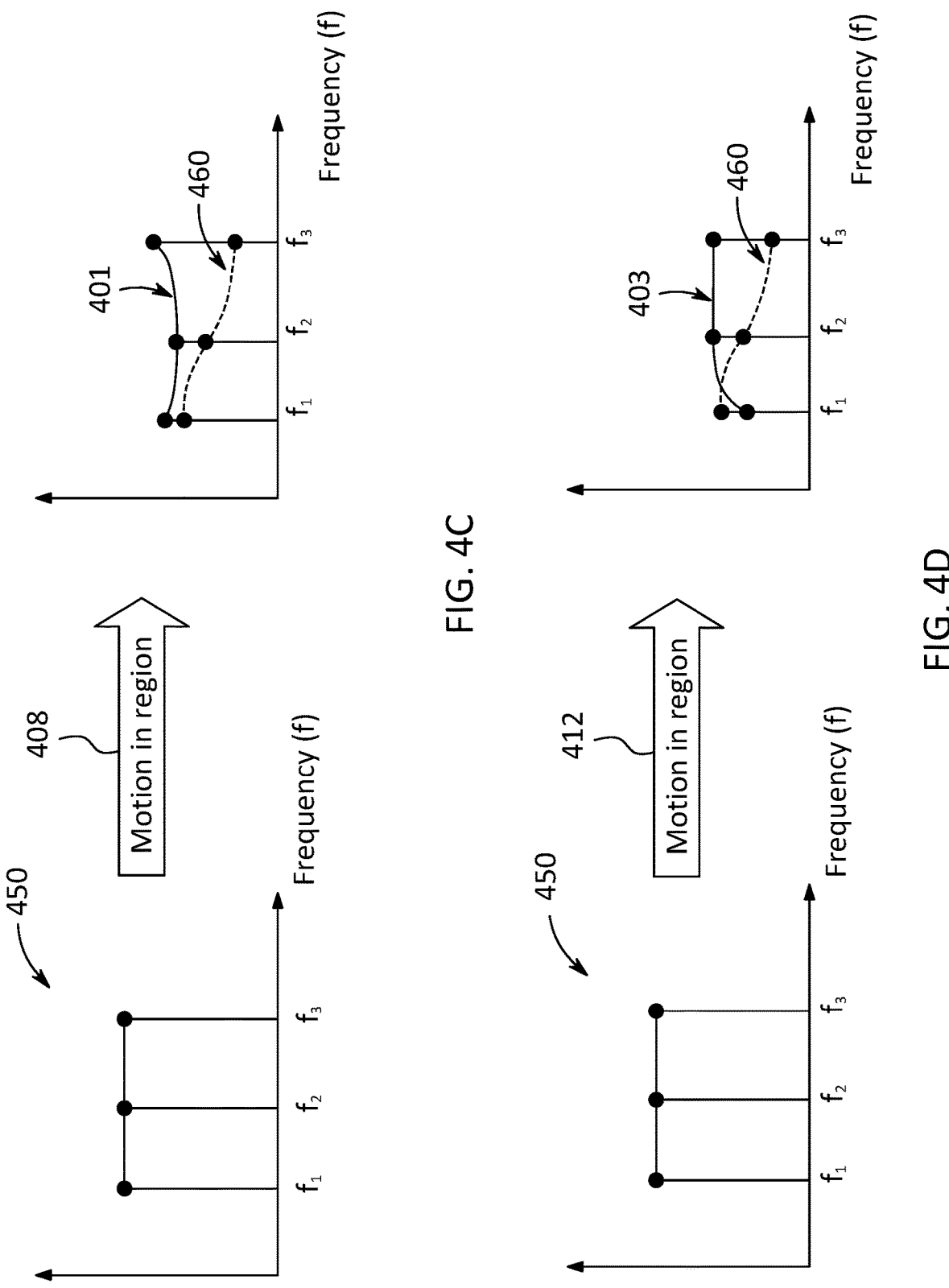
FIG. 4C and FIG. 4D are plots showing the example channel responses of FIG. 4A and FIG. 4B overlaid on an example channel response associated with no motion occurring in the space.

FIG. 4C and FIG. 4D are plots showing channel responses 401, 403 of FIG. 4A and FIG. 4B overlaid on channel response 460 associated with no motion occurring in space 400. FIG. 4C and FIG. 4D also show frequency domain representation 450 of an initial wireless signal transmitted by one or more of wireless communication devices 402A, 402B, 402C. When motion occurs in space 400, a variation in the channel response will occur relative to channel response 460 associated with no motion, and thus, motion of an object in space 400 can be detected by analyzing variations in the channel responses. In addition, a relative location of the detected motion within space 400 can be identified. For example, the shape of channel responses associated with motion can be compared with reference information (e.g., using a trained AI model) to categorize the motion as having occurred within a distinct region of space 400.

When there is no motion in space 400 (e.g., when object 406 is not present), wireless communication device 402 may compute channel response 460 associated with no motion. Slight variations may occur in the channel response due to a number of factors; however, multiple channel responses 460 associated with different periods of time may share one or more characteristics. In the example shown, channel response 460 associated with no motion has a decreasing frequency profile (the magnitude of each frequency component $f_1$, $f_2$, and $f_3$ is less than the previous). The profile of channel response 460 may differ in some instances (e.g., based on different room layouts or placement of wireless communication devices 402).

When motion occurs in space 400, a variation in the channel response will occur. For instance, in the examples shown in FIG. 4C and FIG. 4D, channel response 401 associated with motion of object 406 in first region 408 differs from channel response 460 associated with no motion and channel response 403 associated with motion of object 406 in third region 412 differs from channel response 460 associated with no motion. Channel response 401 has a concave-parabolic frequency profile (the magnitude of the middle frequency component $f_2$ is less than the outer frequency components $f_1$ and $f_3$), while channel response 403 has a convex-asymptotic frequency profile (the magnitude of the middle frequency component $f_2$ is greater than the outer frequency components $f_1$ and $f_3$). The profiles of channel responses 401, 403 may differ in some instances (e.g., based on different room layouts or placement of the wireless communication devices 402).

Analyzing channel responses may be considered similar to analyzing a digital filter. In other words, a channel response has been formed through the reflections of objects in a space as well as reflections created by a moving or static human. When a reflector (e.g., a human) moves, it changes the channel response. This may translate to a change in equivalent taps of a digital filter, which can be thought of as having poles and zeros (poles amplify the frequency components of a channel response and appear as peaks or high points in the response, while zeros attenuate the frequency components of a channel response and appear as troughs, low points, or nulls in the response). A changing digital filter can be characterized by the locations of its peaks and troughs, and a channel response may be characterized similarly by its peaks and troughs. For example, in some implementations, analyzing nulls and peaks in the frequency components of a channel response (e.g., by marking their location on the frequency axis and their magnitude), motion can be detected.

In some implementations, a time series aggregation can be used to detect motion. A time series aggregation may be performed by observing the features of a channel response over a moving window and aggregating the windowed result by using statistical measures (e.g., mean, variance, principal components, etc.). During instances of motion, the characteristic digital-filter features would be displaced in location and flip-flop between some values due to the continuous change in the scattering scene. That is, an equivalent digital filter exhibits a range of values for its peaks and nulls (due to the motion). By looking this range of values, unique profiles (in examples profiles may also be referred to as signatures) may be identified for distinct regions within a space.

In some implementations, an artificial intelligence (AI) model may be used to process data. AI models may be of a variety of types, for example linear regression models, logistic regression models, linear discriminant analysis models, decision tree models, naïve bayes models, K-nearest neighbors models, learning vector quantization models, support vector machines, bagging and random forest models, and deep neural networks. In general, all AI models aim to learn a function which provides the most precise correlation between input values and output values and are trained using historic sets of inputs and outputs that are known to be correlated. In examples, artificial intelligence may also be referred to as machine learning.

In some implementations, the profiles of the channel responses associated with motion in distinct regions of space 400 can be learned. For example, machine learning may be used to categorize channel response characteristics with motion of an object within distinct regions of a space. In some cases, a user associated with wireless communication devices 402 (e.g., an owner or other occupier of space 400) can assist with the learning process. For instance, referring to the examples shown in FIG. 4A and FIG. 4B, the user can move in each of first to fifth regions 408, 410, 412, 414, 416 during a learning phase and may indicate (e.g., through a user interface on a mobile computing device) that he/she is moving in one of the particular regions in space 400. For example, while the user is moving through first region 408 (e.g., as shown in FIG. 4A) the user may indicate on a mobile computing device that he/she is in first region 408 (and may name the region as "bedroom", "living room", "kitchen", or another type of room of a building, as appropriate). Channel responses may be obtained as the user moves through the region, and the channel responses may be "tagged" with the user's indicated location (region). The user may repeat the same process for the other regions of space 400. The term "tagged" as used herein may refer to marking and identifying channel responses with the user's indicated location or any other information.

The tagged channel responses can then be processed (e.g., by machine learning software) to identify unique characteristics of the channel responses associated with motion in the distinct regions. Once identified, the identified unique characteristics may be used to determine a location of detected motion for newly computed channel responses. For example, an AI model may be trained using the tagged channel responses, and once trained, newly computed channel responses can be input to the AI model, and the AI model can output a location of the detected motion. For example, in some cases, mean, range, and absolute values are input to an AI model. In some instances, magnitude and phase of the complex channel response itself may be input as well. These values allow the AI model to design arbitrary front-end filters to pick up the features that are most relevant to making accurate predictions with respect to motion in distinct regions of a space. In some implementations, the AI model is trained by performing a stochastic gradient descent. For instance, channel response variations that are most active during a certain zone may be monitored during the training, and the specific channel variations may be weighted heavily (by training and adapting the weights in the first layer to correlate with those shapes, trends, etc.). The weighted channel variations may be used to create a metric that activates when a user is present in a certain region.

For extracted features like channel response nulls and peaks, a time-series (of the nulls/peaks) may be created using an aggregation within a moving window, taking a snapshot of few features in the past and present, and using that aggregated value as input to the network. Thus, the network, while adapting its weights, will be trying to aggregate values in a certain region to cluster them, which can be done by creating a logistic classifier based decision surfaces. The decision surfaces divide different clusters and subsequent layers can form categories based on a single cluster or a combination of clusters.

In some implementations, an AI model includes two or more layers of inference. The first layer acts as a logistic classifier which can divide different concentration of values into separate clusters, while the second layer combines some of these clusters together to create a category for a distinct region. Additional, subsequent layers can help in extending the distinct regions over more than two categories of clusters. For example, a fully-connected AI model may include an input layer corresponding to the number of features tracked, a middle layer corresponding to the number of effective clusters (through iterating between choices), and a final layer corresponding to different regions. Where complete channel response information is input to the AI model, the first layer may act as a shape filter that can correlate certain shapes. Thus, the first layer may lock to a certain shape, the second layer may generate a measure of variation happening in those shapes, and third and subsequent layers may create a combination of those variations and map them to different regions within the space. The output of different layers may then be combined through a fusing layer.

B. Wi-Fi Sensing System Example Methods and Apparatus

Section B describes systems and methods that are useful for a Wi-Fi sensing system configured to send sensing transmissions and make sensing measurements.

Figure 5:
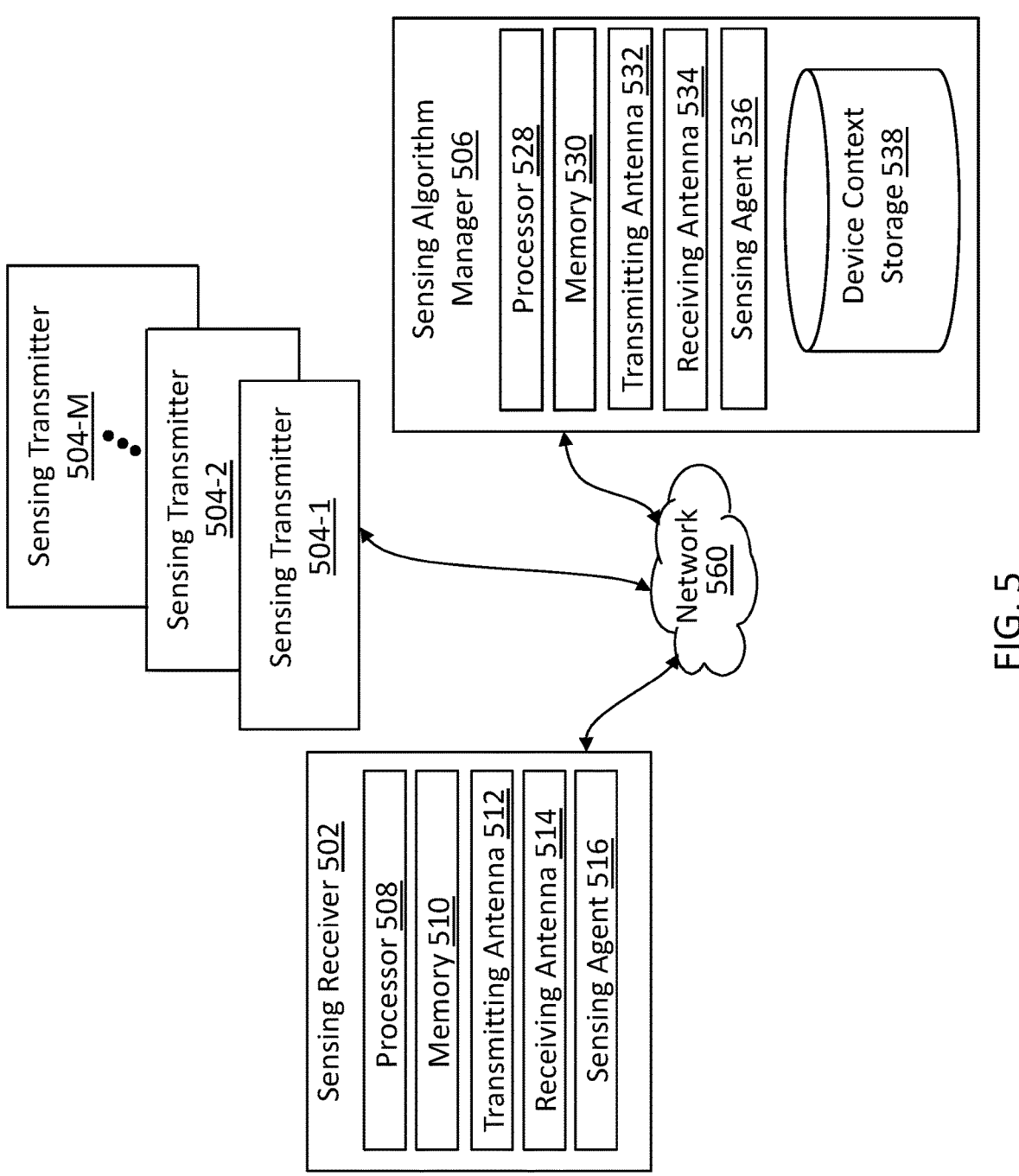
FIG. 5 depicts an implementation of some of an architecture of an implementation of a system for Wi-Fi sensing, according to some embodiments.

FIG. 5 depicts an implementation of some of an architecture of an implementation of system 500 for Wi-Fi sensing, according to some embodiments.

System 500 (alternatively referred to as Wi-Fi sensing system 500) may include sensing receiver 502, plurality of sensing transmitter 504-(1-M), sensing algorithm manager 506, and network 560 enabling communication between the system components for information exchange. System 500 may be an example or instance of wireless communication system 100 and network 560 may be an example or instance of wireless network or cellular network, details of which are provided with reference to FIG. 1 and its accompanying description.

According to an embodiment, sensing receiver 502 may be configured to receive a sensing transmission (for example, from each of plurality of sensing transmitters 504-(1-M)) and perform one or more measurements (for example, channel state information (CSI)) useful for Wi-Fi sensing. These measurements may be known as sensing measurements. The sensing measurements may be processed to achieve a sensing result of system 500, such as detecting motions or gestures. In an embodiment, sensing receiver 502 may be an access point. In some embodiments, sensing receiver 502 may take a role of sensing initiator.

According to an implementation, sensing receiver 502 may be implemented by a device, such as wireless communication device 102 shown in FIG. 1. In some implementations, sensing receiver 502 may be implemented by a device, such as wireless communication device 204 shown in FIG. 2A and FIG. 2B. Further, sensing receiver 502 may be implemented by a device, such as wireless communication device 402 shown in FIG. 4A and FIG. 4B. In an implementation, sensing receiver 502 may coordinate and control communication among plurality of sensing transmitters 504-(1-M). According to an implementation, sensing receiver 502 may be enabled to control a measurement campaign to ensure that required sensing transmissions are made at a required time and to ensure an accurate determination of sensing measurement. In some embodiments, sensing receiver 502 may process sensing measurements to achieve the sensing result of system 500. In some embodiments, sensing receiver 502 may be configured to transmit sensing measurements to sensing algorithm manager 506, and sensing algorithm manager 506 may be configured to process the sensing measurements to achieve the sensing result of system 500.

Referring again to FIG. 5, in some embodiments, each of plurality of sensing transmitters 504-(1-M) may form a part of a basic service set (BSS) and may be configured to send a sensing transmission to sensing receiver 502 based on which, one or more sensing measurements (for example, CSI) may be performed for Wi-Fi sensing. In an embodiment, each of plurality of sensing transmitters 504-(1-M) may be a station. According to an implementation, each of plurality of sensing transmitters 504-(1-M) may be implemented by a device, such as wireless communication device 102 shown in FIG. 1. In some implementations, each of plurality of sensing transmitters 504-(1-M) may be implemented by a device, such as wireless communication device 204 shown in FIG. 2A and FIG. 2B. Further, each of plurality of sensing transmitters 504-(1-M) may be implemented by a device, such as wireless communication device 402 shown in FIG. 4A and FIG. 4B. In some implementations, communication between sensing receiver 502 and each of plurality of sensing transmitters 504-(1-M) may happen via station management entity (SME) and media access control (MAC) layer management entity (MLME) protocols.

In some embodiments, sensing algorithm manager 506 may be configured to receive sensing measurements from sensing receiver 502 and process the sensing measurements. In an example, sensing algorithm manager 506 may process and analyze the sensing measurements to identify one or more features of interest. According to some implementations, sensing algorithm manager 506 may include/execute a sensing algorithm. In an embodiment, sensing algorithm manager 506 may be a station. In some embodiments, sensing algorithm manager 506 may be an access point. According to an implementation, sensing algorithm manager 506 may be implemented by a device, such as wireless communication device 102 shown in FIG. 1. In some implementations, sensing algorithm manager 506 may be implemented by a device, such as wireless communication device 204 shown in FIG. 2A and FIG. 2B. Further, sensing algorithm manager 506 may be implemented by a device, such as wireless communication device 402 shown in FIG. 4A and FIG. 4B. In some embodiments, sensing algorithm manager 506 may be any computing device, such as a desktop computer, a laptop, a tablet computer, a mobile device, a personal digital assistant (PDA) or any other computing device. In embodiments, sensing algorithm manager 506 may take a role of sensing initiator where a sensing algorithm determines a measurement campaign and the sensing measurements required to fulfill the measurement campaign. Sensing algorithm manager 506 may communicate the sensing measurements required to fulfill the measurement campaign to sensing receiver 502 to coordinate and control communication among plurality of sensing transmitters 504-(1-M). According to some implementations, sensing algorithm manager 506 may include sensing receiver 502.

Referring to FIG. 5, in more detail, sensing receiver 502 may include processor 508 and memory 510. For example, processor 508 and memory 510 of sensing receiver 502 may be processor 114 and memory 116, respectively, as shown in FIG. 1. In an embodiment, sensing receiver 502 may further include transmitting antenna(s) 512, receiving antenna(s) 514, and sensing agent 516. In some embodiments, an antenna may be used to both transmit and receive signals in a half-duplex format. When the antenna is transmitting, it may be referred to as transmitting antenna 512, and when the antenna is receiving, it may be referred to as receiving antenna 514. It is understood by a person of normal skill in the art that the same antenna may be transmitting antenna 512 in some instances and receiving antenna 514 in other instances. In the case of an antenna array, one or more antenna elements may be used to transmit or receive a signal, for example, in a beamforming environment. In some examples, a group of antenna elements used to transmit a composite signal may be referred to as transmitting antenna 512, and a group of antenna elements used to receive a composite signal may be referred to as receiving antenna 514. In some examples, each antenna is equipped with its own transmission and receive paths, which may be alternately switched to connect to the antenna depending on whether the antenna is operating as transmitting antenna 512 or receiving antenna 514.

In an implementation, sensing agent 516 may be responsible for receiving sensing transmissions and associated transmission parameters, calculating sensing measurements, and processing sensing measurements to fulfill a sensing result. In some implementations, receiving sensing transmissions and associated transmission parameters, and calculating sensing measurements may be carried out by an algorithm running in the MAC layer of sensing receiver 502 and processing sensing measurements in to fulfill a sensing result may be carried out by an algorithm running in the application layer of sensing receiver 502. In examples, the algorithm running in the application layer of sensing receiver 502 is known as Wi-Fi sensing agent, sensing application, or sensing algorithm. In some implementations, the algorithm running in the MAC layer of sensing receiver 502 and the algorithm running in the application layer of sensing receiver 502 may run separately on processor 508. In an implementation, sensing agent 516 may pass physical layer parameters (e.g., such as CSI) from the MAC layer of sensing receiver 502 to the application layer of sensing receiver 502 and may use the physical layer parameters to detect one or more features of interest. In an example, the application layer may operate on the physical layer parameters and form services or features, which may be presented to an end-user. According to an implementation, communication between the MAC layer of sensing receiver 502 and other layers or components may take place based on communication interfaces, such as MLME interface and a data interface. According to some implementations, sensing agent 516 may include/execute a sensing algorithm. In an implementation, sensing agent 516 may process and analyze sensing measurements using the sensing algorithm, and identify one or more features of interest. Further, sensing agent 516 may be configured to determine a number and timing of sensing transmissions and sensing measurements for the purpose of Wi-Fi sensing. In some implementations, sensing agent 516 may be configured to transmit sensing measurements to sensing algorithm manager 506 for further processing.

In an implementation, sensing agent 516 may be configured to cause at least one transmitting antenna of transmitting antenna(s) 512 to transmit messages to plurality of sensing transmitters 504-(1-M). Further, sensing agent 516 may be configured to receive, via at least one receiving antenna of receiving antennas(s) 514, messages from plurality of sensing transmitters 504-(1-M). In an example, sensing agent 516 may be configured to make sensing measurements based on one or more sensing transmissions received from plurality of sensing transmitters 504-(1-M). According to an implementation, sensing agent 516 may be configured to process and analyze the sensing measurements to identify one or more features of interest.

Referring again to FIG. 5, sensing algorithm manager 506 may include processor 528 and memory 530. For example, processor 528 and memory 530 of sensing algorithm manager 506 may be processor 114 and memory 116, respectively, as shown in FIG. 1. In an embodiment, sensing algorithm manager 506 may further include transmitting antenna(s) 532, receiving antenna(s) 534, and sensing agent 536. In an implementation, sensing agent 536 may be a block that passes physical layer parameters from the MAC of sensing algorithm manager 506 to application layer programs. Sensing agent 536 may be configured to cause at least one transmitting antenna of transmitting antenna(s) 532 and at least one receiving antenna of receiving antennas(s) 534 to exchange messages with sensing receiver 502. According to some implementations, sensing agent 536 may be responsible for receiving sensing measurements from sensing receiver 502, and processing the sensing measurements to obtain a sensing result. Sensing agent 536 may include/execute a sensing algorithm. In an implementation, sensing agent 536 may process and analyze sensing measurements using the sensing algorithm, and obtain the sensing result.

In some embodiments, an antenna may be used to both transmit and receive in a half-duplex format. When the antenna is transmitting, it may be referred to as transmitting antenna 532, and when the antenna is receiving, it may be referred to as receiving antenna 534. It is understood by a person of normal skill in the art that the same antenna may be transmitting antenna 532 in some instances and receiving antenna 534 in other instances. In the case of an antenna array, one or more antenna elements may be used to transmit or receive a signal, for example, in a beamforming environment. In some examples, a group of antenna elements used to transmit a composite signal may be referred to as transmitting antenna 532, and a group of antenna elements used to receive a composite signal may be referred to as receiving antenna 534. In some examples, each antenna is equipped with its own transmission and receive paths, which may be alternately switched to connect to the antenna depending on whether the antenna is operating as transmitting antenna 532 or receiving antenna 534.

Referring back to FIG. 5, according to one or more implementations, sensing receiver 502 may initiate a measurement campaign. In the measurement campaign, exchange of transmissions between sensing receiver 502 and plurality of sensing transmitters 504-(1-M) may occur. In an example, control of these transmissions may be with the MAC (Medium Access Control) layer of the IEEE 802.11 stack. According to an implementation, sensing receiver 502 may secure a TXOP which may be allocated to one or more sensing transmissions by selected sensing transmitters. In an example, the selected sensing transmitters may include plurality of sensing transmitters 504-(1-M). In some examples, the selected sensing transmitters may include a subset of plurality of sensing transmitters 504-(1-M). According to an example, the subset of plurality of sensing transmitters 504-(1-M) may include one or more sensing transmitters. For ease of explanation and understanding, the description hereinafter is provided with reference to the selected sensing transmitters including the subset of plurality of sensing transmitters 504-(1-M) (i.e., one or more sensing transmitters), however the description is equally applicable to the case of plurality of sensing transmitters 504-(1-M). According to an implementation, sensing receiver 502 may allocate channel resources (or RUs) within a TXOP to the selected sensing transmitters. In an example, sensing receiver 502 may allocate the channel resources to the selected sensing transmitters by allocating time and bandwidth within the TXOP to the selected sensing transmitters.

According to an implementation, sensing receiver 502 may initiate a measurement campaign. In an implementation, sensing agent 516 may generate a sensing trigger message configured to trigger a response from each of one or more sensing transmitters 504-(1-M). In an example, the response may be one or more sensing transmissions.

According to an example, the sensing trigger message may be any type of UL-OFDMA sensing trigger message which may instruct one or more sensing transmitters 504-(1-M) to make the response using UL-OFDMA. Examples of sensing trigger message include an UL-OFDMA sensing trigger message and an UL-OFDMA compound sensing trigger message. In an implementation, the sensing trigger message may include a requested transmission configuration and/or steering matrix configuration for each of one or more sensing transmitters 504-(1-M) that the sensing trigger message is triggering. In an example, the requested transmission configuration and/or steering matrix configuration may be identical for each of one or more sensing transmitters 504-(1-M). In some examples, the requested transmission configuration and/or steering matrix configuration may be different for each of one or more sensing transmitters 504-(1-M). In an example, the requested transmission configuration and/or steering matrix configuration may differ according to the requirements of the sensing transmissions being triggered.

In an implementation, the sensing trigger message may include an indication for one or more sensing transmitters 504-(1-M) that the response may include one (or a single) transmission. In an example, the one transmission may include a sensing response message. In some implementations, the sensing trigger message may include an indication for one or more sensing transmitters 504-(1-M) that the response may include two transmissions. The two transmissions may include a sensing response announcement and a sensing response NDP. In an example, the sensing response announcement may be followed by the sensing response NDP after approximately one short interframe space (SIFS). In an example, the duration of SIFS is 10 μs. Accordingly, the sensing trigger message may instruct each of the one or more sensing transmitters to respond with either the sensing response message or the sensing response announcement followed by the sensing response NDP. In some implementations, the sensing trigger message may include a request that the one or more sensing transmitters respond with time-synchronized sensing transmissions.

According to an implementation, the sensing trigger message may include a resource allocation field and a requested transmission configuration field. In an example, the sensing trigger message may inform one or more sensing transmitters 504-(1-M) of their allocation of RUs within the uplink bandwidth for use in the TXOP using the resource allocation field. In some examples, the sensing trigger message may include parameters which may instruct the one or more sensing transmitters on further configuration items for resulting sensing transmissions using the requested transmission configuration field. In an implementation, sensing agent 516 may generate the sensing trigger message with a specification of a steering matrix configuration included. In an example, compound sensing trigger message may include the steering matrix configuration within the requested transmission configuration field.

According to an implementation, the sensing trigger message may include an indication for each of one or more sensing transmitters 504-(1-M) that the response may include one transmission if the requested transmission configuration and/or steering matrix configuration is compatible with accurate demodulation of data in a sensing transmission. In an example, the one transmission may include a sensing response message. In some implementations, the compound sensing trigger message may include an indication for each of the one or more sensing transmitters that the response may include two transmissions if the requested transmission configuration and/or steering matrix configuration is incompatible with accurate demodulation of data in a sensing transmission. In an example, the two transmissions may include a sensing response announcement and a sensing response NDP, where the sensing response announcement is followed by the sensing response NDP. In another example, a sensing response NDP may be sent without a corresponding sensing response announcement.

According to an implementation, sensing agent 516 may transmit the sensing trigger message to one or more sensing transmitters 504-(1-M). In an implementation, sensing agent 516 may transmit the sensing trigger message to one or more sensing transmitters 504-(1-M) via transmitting antenna 512.

Referring back to FIG. 5, one or more sensing transmitters 504-(1-M) may receive the sensing trigger message. In response to receiving the sensing trigger message, each of one or more sensing transmitters 504-(1-M) may generate one or more sensing transmissions. In an example, the one or more sensing transmissions may be either a sensing response message or a sensing response announcement followed by a sensing response NDP. In an implementation, each of the one or more sensing transmitters may generate the one or more sensing transmissions using the requested transmission configuration and/or steering matrix configuration defined by the compound sensing trigger message.

According to an implementation, after receiving the sensing trigger message, each of the one or more sensing transmitters may analyze the requested transmission configuration and/or steering matrix configuration to determine if the requested transmission configuration and/or steering matrix configuration is compatible with accurate demodulation of data prepared for transmission. In scenarios where a sensing transmitter determines that a requested transmission configuration and/or steering matrix configuration is compatible with the accurate demodulation of data prepared for transmission, the sensing transmitter may generate a sensing response message having a delivered transmission configuration and/or steering matrix configuration corresponding to the requested transmission configuration and/or steering matrix configuration, respectively. In some scenarios where a sensing transmitter determines that a requested transmission configuration and/or steering matrix configuration is incompatible with the accurate demodulation of data prepared for transmission, the sensing transmitter may generate a sensing response NDP. In such scenarios, a sensing response announcement may be created using a delivered transmission configuration and/or steering matrix configuration. According to some scenarios, the sensing response announcement may be optional and may not be created.

According to an implementation, each of one or more sensing transmitters 504-(1-M) may send the one or more sensing transmissions to sensing receiver 502 as a response to the compound sensing trigger message. According to an implementation, each of one or more sensing transmitters 504-(1-M) may send its designated message (i.e., the one or more sensing transmissions) one SIFS after receiving the compound sensing trigger message.

In an example, the one or more sensing transmissions may be either a sensing response message or a sensing response announcement followed by a sensing response NDP. In an example implementation, the sensing response announcement may include an indication that the sensing response NDP will be transmitted after approximately one SIFS. Accordingly, the sensing response NDP may be sent approximately one SIFS after sending the sensing response announcement. Therefore, when a requested transmission configuration and/or steering matrix configuration for a sensing transmission is not compatible with the accurate demodulation of data which means that data which may be transferred as part of a sensing transmission may not be received by sensing receiver 502, then two sensing transmissions may be sent to sensing receiver 502. First being a sensing response announcement, which is transmitted with transmission parameters that ensures successful data transfer. Second being a sensing response NDP, which is transmitted with transmission parameters required for the sensing transmission. In some examples, the sensing response announcement is not created (i.e., is optional and omitted only a single sensing response NDP may be sent to sensing receiver 502.

According to the implementation, all sensing transmitters may respond to the sensing trigger message with a sensing response announcement and a sensing response NDP. In some implementations, all sensing transmitters may respond to the sensing trigger message with a sensing response message. In some implementations, some sensing transmitters may respond to the sensing trigger message with a sensing response message, and some sensing transmitters may respond to the sensing trigger message with a sensing response announcement following one SIFS later by a sensing response NDP. In an example, first sensing transmitter 504-1 may respond with a sensing response announcement following one SIFS later by a sensing response NDP, and second sensing transmitter 504-2 may respond with a sensing response message.

According to an implementation, in scenarios where a sensing transmitter responds with a sensing response announcement then the sensing transmitter may reconfigure its transmission parameters and spatial mapper to correspond to the requested transmission configuration and the steering matrix configuration and generate a sensing response NDP in the same RU allocation described in sensing trigger message and used to send the sensing response announcement. In an example, the sensing transmitter may send a sensing response NDP after a period of one SIFS from sending the sensing response announcement, or after a period of one SIFS from the reception of the compound sensing trigger message if the sensing response announcement has been omitted.

According to some embodiments, sensing algorithm manager 506 may include device context storage 538. In an implementation, device context storage 538 may store one or more device contexts for ongoing sensing sessions. In an example, a device context for a sensing session may include an association of sensing transmitter identifiers, sensing receiver identifiers, and sensing imprints for the sensing session. An example of a sensing transmitter identifier may include a MAC ID, an association ID, or any distinct identifier used by the Wi-Fi sensing system. Similarly, an example of a sensing receiver may include a MAC ID, an association ID (AID), or any distinct identifier used by system 500.

According to an example, there may be one device context record for every sensing transmitter/sensing receiver pair that are involved in a sensing session. In an example, each device context record may include information that may be used to precisely identify a device context. In an example, parameters of a device context may be stored in a device context record. Information related to the one or more device contexts records stored in device context storage 538 may be periodically or dynamically updated as required. In an implementation, device context storage 538 may include any type or form of storage, such as a database or a file system or coupled to memory 510. Although it has been described that device context storage 538 is implemented within sensing algorithm manager 506, in some embodiments, device context storage 538 may be implemented within sensing receiver 502, sensing transmitter 504-1, or a separate device.

An example of a device context record is shown in Table 1, provided below.

TABLE 1

| Example of a device context record for a sensing session between a sensing transmitter and a sensing receiver | |
| --- | --- |
| Device Context ID | 16 bit value |
| Sensing Receiver Information | |
| Sensing Receiver MAC address | 48 bit value |
| Sensing Receiver HLI Fingerprint | |
| Sensing Receiver IP Address | 32 bit or 128 bit value |
| Sensing Receiver Hostname | Text Field |
| Sensing Transmitter Information | |
| Sensing Transmitter MAC address | 48 bit value |
| Sensing Transmitter AID | 16 bit value |
| Sensing Transmitter HLI Fingerprint | |
| Sensing Transmitter IP Address | 32 bit or 128 bit value |
| Sensing Transmitter Hostname | Text Field |
| Sensing Imprint | |
| Delivered Transmission Configuration A | As defined in Table 2 to Table 7 |
| Sensing Imprint A | |
| Delivered Transmission Configuration B | |
| Sensing Imprint B | |
| . . . | |
| Delivered Transmission Configuration N | |
| Sensing Imprint N | |

TABLE 2

| Example data structure for sensing imprints at sensing receiver 502 | | | |
| --- | --- | --- | --- |
| Sensing transmitter 504-1 | Delivered Transmission Configuration (1, A) | Imprint Creation Time (1, A) | Sensing Imprint (1, A) |
| | Delivered Transmission Configuration (1, B) | Imprint Creation Time (1, B) | Sensing Imprint (1, B) |
| | Delivered Transmission Configuration (1, C) | Imprint Creation Time (1, C) | Sensing Imprint (1, C) |
| | . . . | . . . | . . . |
| | Delivered Transmission Configuration (1, N) | Imprint Creation Time (1, N) | Sensing Imprint (1, N) |

In an example, an imprint creation time for a sensing imprint may refer to a time at which the sensing imprint is recorded/determined and stored. For example, the imprint creation time may be a value of a system clock or a counter which may be used to determine a validity expiration of the sensing imprint.

Exemplary transmission configuration elements (for example, requested transmission configuration or delivered transmission configuration) for a sensing transmission are provided in Table 3.

TABLE 3

| Transmission Configuration Element Details | | | |
|---|---|---|---|
| Name | Type | Valid Range | Description |
| SensingFrequencyBand | A set of frequency band values or identifiers | As defined in TABLE 4: SensingBandwidth details Table 4 (SensingFrequency Band details) | Specifies the band in which sensing receiver is to take the sensing measurement |
| SensingBandwidth | A set of bandwidth values or identifiers | As defined in Table 5 (SensingBandwidth details) | Specifies the bandwidth in which sensing device is to take the sensing measurement. Note that this is included to allow a bandwidth to be specified if the channel identifier is not sufficient on its own (e.g., the 2.4-GHz band). If the channel identifier also defines the bandwidth then this may be set to 0 |
| SensingChannel | Integer | 1 . . . 511 | Channel identifier |
| SensingTrainingField | A set of training field values | As defined in TABLETable 6 (SensingTrainingField details) | Identifies the training field which is to be used for the sensing measurement |
| SensingSpatialConf-Index | Integer | 0 . . . 15 | Index into a table of steering matrix configurations, such as may be preconfigured for sensing transmitter via a sensing configuration message and optionally acknowledged by a sensing configuration response message. 0 may be reserved to indicate no configuration requirement (e.g., the sensing transmitter may use a default spatial matrix configuration) and 15 may be reserved to indicate for sensing transmitter to apply the steering matrix configuration specified by the SensingSpatialConf-Index |
| SensingSpatialConfSteeringMatrix | A set of spatial steering vector values, for example, a phase and gain value, or a real (I) and imaginary (Q) value, each representing a steering matrix configuration | As defined in Table 7 (SensingSpatialCon SteeringMatrix details) | A series of steering vectors values (i.e., spatial matrix configurations) which are applied to each of the implemented antennas on sensing transmitter prior to the sending of a sensing transmission |

TABLE 4

SensingBandwidth details

| Value | Meaning |
|---|---|
| 0 | Defined by channel identifier |
| 1 | 20 MHz |
| 2 | 40 MHz |
| 3 | 80 MHz |
| 4 | 80 + 80 MHz |
| 5 | 160 MHz |
| 6 . . . 15 | Reserved |

TABLE 5

SensingFrequencyBand details

| Value | Meaning |
|---|---|
| 0 | Reserved |
| 1 | 2.4 GHz |
| 2 | 5 GHz |

TABLE 5-continued

SensingFrequencyBand details

| Value | Meaning |
|---|---|
| 3 | 6 GHz |
| 4 | 60 GHz |
| 5 . . . 15 | Reserved |

TABLE 6

SensingTrainingField details

| Value | Meaning |
|---|---|
| 0 | Reserved |
| 1 | L-LTF |
| 2 | HT-LTF |
| 3 | VHT-LTF |
| 4 | HE-LTF |
| 5 . . . 15 | Reserved |

TABLE 7

SensingSpatialConfSteeringMatrix details

| Name | Type | Valid Range | Description |
|---|---|---|---|
| TransmissionAntenna-Count | Integer | 1 . . . 8 | Number of transmission antennas on the sensing transmitter used for sensing transmissions. Defines the number of SensingAntennaNSteeringVectorRe and SensingAntennaNSteeringVectorIm pairs that follow in the element. At least one antenna must be specified |
| SensingAntenna0-SteeringVectorRe | Half-precision float (16 bits) | | Real part of the steering vector for antenna 0 |
| SensingAntenna0-SteeringVectorIm | Half-precision float (16 bits) | | Imaginary part of the steering vector for antenna 0 |
| . . . | . . . | | . . . |
| SensingAntenna7-SteeringVectorRe | Half-precision float (16 bits) | | Real part of the steering vector for antenna 7 |
| SensingAntenna7-SteeringVectorIm | Half-precision float (16 bits) | | Imaginary part of the steering vector for antenna 7 |

Table 3 describes transmission configuration elements (for example, requested transmission configuration or delivered transmission configuration) for a sensing transmission. In an example, Table 3 describes the delivered transmission configuration for each sensing imprint. In an implementation, there may be as many delivered transmission configuration/sensing imprint pairs as there are delivered transmission configurations that have been used in the sensing session between sensing transmitter/sensing receiver pair.

In an example, these data are encoded into an element for inclusion in sensing messages between sensing receiver 502 and plurality of sensing transmitters 504-(1-M) or vice versa. In a measurement campaign involving multiple sensing transmitters, these parameters may be defined for all sensing transmitters (i.e., per sensing transmitter). When transmitted from a sensing receiver to a sensing transmitter then these parameters may configure a sensing transmitter sensing transmission, and when transmitted from the sensing transmitter to the sensing receiver then these parameters may report the configuration used by the sensing transmitter for the sensing transmission.

According to some implementations, the steering matrix configuration element details are described in Table 8.

TABLE 8

Steering Matrix Configuration Element details

| Name | Type | Valid Range | Description |
|---|---|---|---|
| LookupEntriesCount | Integer | 1 . . . 14 | Number of entries in the lookup table specified by this element. Defines the number of EntryM . . . sets of data that follow in the element. At least one entry must be specified. |
| TransmissionAntenna-Count | Integer | 1 . . . 8 | Number of transmission antennas on the sensing transmitters used for sensing transmissions. Defines the number of SensingAntennaNSteeringVectorRe and SensingAntennaNSteeringVectorIm pairs that follow in the element. At least one antenna must be specified. |
| Entry1SensingAntenna0-SteeringVectorRe | Half-precision float (16 bits) | | Real part of the steering vector for antenna 0 in lookup table entry 1 |
| Entry1SensingAntenna0-SteeringVectorIm | Half-precision float (16 bits) | | Imaginary part of the steering vector for antenna 0 in lookup table entry 1 |
| . . . | . . . | | . . . |
| Entry1SensingAntenna7-SteeringVectorRe | Half-precision float (16 bits) | | Real part of the steering vector for antenna 7 in lookup table entry 1 |
| Entry1SensingAntenna7-SteeringVectorIm | Half-precision float (16 bits) | | Imaginary part of the steering vector for antenna 7 in lookup table entry 1 |
| . . . | . . . | | . . . |
| Entry14SensingAntenna0-SteeringVectorRe | Half-precision float (16 bits) | | Real part of the steering vector for antenna 0 in lookup table entry 14 |
| Entry14SensingAntenna0-SteeringVectorIm | Half-precision float (16 bits) | | Imaginary part of the steering vector for antenna 0 in lookup table entry 14 |
| . . . | . . . | | . . . |
| Entry14SensingAntenna7-SteeringVectorRe | Half-precision float (16 bits) | | Real part of the steering vector for antenna 7 in lookup table entry 14 |
| Entry14SensingAntenna7-SteeringVectorIm | Half-precision float (16 bits) | | Imaginary part of the steering vector for antenna 7 in lookup table entry 14 |

In an example, the data provided in Table 7 may be encoded into an element for inclusion in the messages between sensing receiver 502 and plurality of sensing transmitters 504-(1-M). In a measurement campaign involving multiple sensing transmitters, these parameters may be defined for all devices. When transmitted from sensing receiver 502 to plurality of sensing transmitters 504-(1-M) then the steering matrix configurations populate a lookup table (which can later be accessed via an index).

Referring again to Table 1, Table 1 describes fields in the device context record and the manner in which information in the device context record fields may be updated. In an example, the fields that may be present in the device context record includes a device context ID field, a sensing receiver information field, a sensing receiver higher layer identification (HLI) fingerprint field, a sensing transmitter information field, a sensing transmitter HLI fingerprint field, and a sensing imprint field. The sensing receiver information field may include a sensing receiver MAC address subfield. The sensing receiver HLI fingerprint field may include a sensing receiver IP address subfield and a sensing receiver hostname subfield. The sensing transmitter information field may include a sensing transmitter MAC address subfield and a sensing transmitter association ID (AID) subfield. The sensing transmitter HLI fingerprint field may include a sensing transmitter IP address subfield and a sensing transmitter hostname subfield. Other examples of fields in the device context record that are not discussed here are contemplated herein. In an implementation, every sensing session between sensing transmitter 504-1 and sensing receiver 502 may be given a unique identifier. The identifier may be used as the device context ID. A device context ID may be unique within each Wi-Fi sensing system. In an example, when a sensing session is established, a device context ID may be assigned to the sensing session. Further, when the sensing session ends, the assigned device context ID may be released and reused for a different sensing session. The MAC address, HLI fingerprint, and sensing imprint are described in more detail below.

MAC Address

According to an implementation, every Wi-Fi enabled device has a factory provisioned MAC address which is a stable, globally unique device identifier that uniquely identifies a device in a LAN environment. The MAC address that is globally unique may be referred to as a universal MAC address. The creation of universal MAC addresses is controlled by the IEEE-Registration Authority (RA). In an example, the term "device" may refer to a sensing transmitter or a sensing receiver. According to an implementation, sensing measurements which are derived from a capable MAC processing layer are referenced to the MAC address of a sensing receiver and the MAC address of a sensing transmitter by way of the device context record for that sensing session.

In an example, a sensing transmitter may connect to any network using the universal MAC address. In an example, the sensing transmitter may connect to a Wi-Fi network by scanning for available networks. The sensing transmitter may tune to any channel it desires to scan, and transmit a probe request message. The probe request message may trigger a probe response including required information for the sensing transmitter to determine the availability of the network that the sensing transmitter desires to connect with. In an example, the transmitted probe request message may include a MAC address of the sensing transmitter. According to an example, a universal MAC address may be used in the transmitted probe request message without MAC privacy enhancements. As a result, when the sensing transmitter performs a sensing transmission, the universal MAC address is transmitted without any protection, thus allowing the possibility of capturing and recording the universal MAC address. To overcome this issue, the sensing transmitter may be required to generate a random MAC address. The randomly generated MAC address may be referred to as a local MAC address. Since the local MAC address is randomly generated, the local MAC address may not be stable.

According to an implementation, when a sensing receiver is an access point, a MAC address of the sensing receiver (also referred to as the sensing receiver MAC address) may usually not change (i.e., it may be stable). Further, when a sensing transmitter is a station, a MAC address of the sensing transmitter (also referred to as the sensing transmitter MAC address) may change (i.e., it may be unstable). In an example, when the MAC address of the sensing transmitter is a part of device context changes, the sensing transmitter MAC address field is updated with a new sensing transmitter MAC address.

Figure 6:
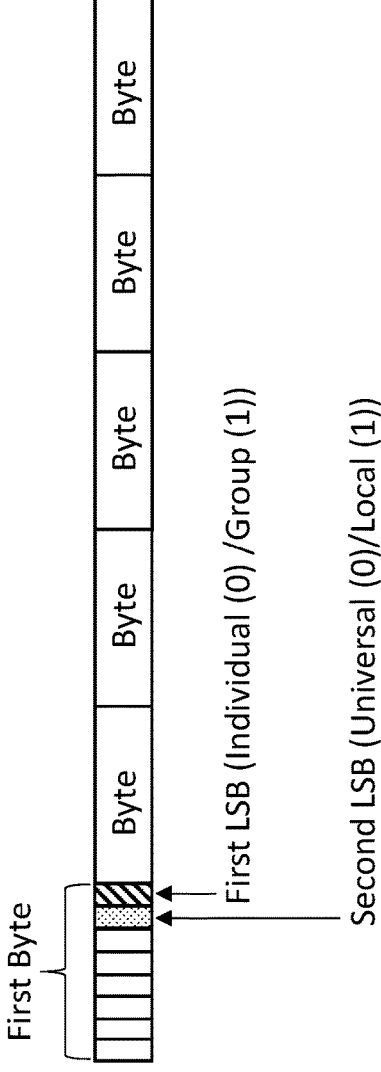
FIG. 6 depicts a representation of a structure of a media access control (MAC) address, according to some embodiments.

Representation 600 of a structure of a MAC address is illustrated in FIG. 6. A first least significant bit (LSB) and a second LSB of a first byte of the MAC address are shown in FIG. 6. The first LSB and the second LSB of the first byte of the MAC address may provide an indication of what kind of address is being represented. In an example, the first LSB of the first byte is an individual/group (I/G) address bit (interchangeably referred to as M-bit). When the M-bit is set to zero (0), it indicates that the MAC address is an individual MAC address, and when the M-bit is set to one (1), it indicates that the MAC address represents a group of MAC addresses which identifies one or more stations connected to the network. In an example, the second LSB of the first byte is a universal/local (U/L) address bit (interchangeably referred to as X-bit). When the X-bit is set to zero (0), it indicates that the MAC address is a universal MAC address, and when the X-bit is set to one (1), it indicates that the MAC address is a local MAC address. In an example, when a station generates a local MAC address as specified in IEEE 802.11md, section 12.2.10, 46 bits of the MAC address are randomized, the X-bit is set to one (1), and the M-bit is set to zero (0).

Further, when a sensing transmitter is associated to a network, an AID may be assigned to the sensing transmitter. In an example, if a sensing transmitter moves between Wi-Fi sensing systems then a reassociation process may occur based on which a new AID may be assigned to the sensing transmitter. The AID may be unique within a network such that the sensing transmitter may be assigned a specific AID at any time. After the sensing transmitter leaves the network, or becomes inactive for a period of time, the AID is released and may be assigned to another sensing transmitter. In some scenarios, association and subsequently reassociation of a sensing transmitter to a network may result in assignment of different AIDs to the same sensing transmitter (i.e., there is no constant mapping between the sensing transmitter and assigned AIDs). In an example, a MAC address of a sensing transmitter may be used to determine the identity of the sensing transmitter during association of the sensing transmitter to a network such that if a sensing transmitter that has previously associated to the network and been assigned an AID rejoins the network then the sensing receiver may, wherever possible, assign the previous AID to the sensing transmitter. In the case that the MAC address of the sensing transmitter changes, then the sensing receiver may not determine that the sensing transmitter has previously associated to the network and the same AID may not be reallocated to the sensing transmitter. In an example, if a sensing transmitter is outside the BSS of a sensing receiver, then the AID of the sensing transmitter may not be known to the sensing receiver.

According to an implementation, an AID may be created by sensing receiver 502 and sent to sensing transmitter 504-1 as part of an exchange of a series of 802.11 management frames to sensing transmitter 504-1 for authentication and association purposes. For ease of explanation and understanding, the description is provided with reference to sensing transmitter 504-1, however the description is equally applicable to remaining sensing transmitters 504-(2-M).

HLI Fingerprint

According to an implementation, higher layer identification (HLI) may be device information which is derived or managed at layers in the networking stack higher than the MAC layer. In examples, HLI may be used for identification of devices that are a part of a device context such that a sensing measurement made on a sensing transmission between the devices may be associated with a sensing session identified by the device context. In an example, if a MAC address of a device is not a universal MAC address, then information from the MAC layer and from layers above the MAC layer may be collected and used to create an HLI fingerprint.

According to an implementation, a Wi-Fi sensing network may implement a DHCP server and a DNS server capable of supporting a network registration process. To facilitate the association of upper network layer information with the MAC address of the device, a network registration process is carried out when a device is added to the Wi-Fi sensing network. In an example, multicast DNS (mDNS) may be implemented whereby each individual device replaces the functionality of the DNS server in a distributed manner. Various steps involved in the network registration process are described below.

Step 1: A unique hostname is allocated to the device. In an example, the hostname may be allocated by a system administrator of a Wi-Fi sensing system (for example, system 500). In some examples, the hostname may be automatically allocated to the device during factory provisioning of the device. The hostname may represent information about the device such as its location or an identifier in the Wi-Fi sensing system.

Step 2: The device may be configured to acquire its IP parameters from the Wi-Fi sensing system. In an example, the device may be configured to use DHCP to acquire its IP parameters.

Step 3: When the device connects to the Wi-Fi sensing system, the device may proceed to start a DHCP negotiation with the DHCP server on the Wi-Fi sensing system. If the device has not been connected to any Wi-Fi sensing system or any previous Wi-Fi sensing network, it may not have previously been allocated an IP address and thus the record of previous IP addresses may be empty. In an example, the DHCP negotiation with the DHCP server may begin with a "DHCPDISCOVER" message which is populated with the configured hostname of the device and the previous IP address of the device. The purpose of the DHCP negotiation may be to allocate a unique IP address on the Wi-Fi sensing system to the device represented by the MAC address included in the DHCP negotiation. In an example, the MAC address may be a universal MAC address or a local MAC address. Further, in an example, the MAC address may have changed from any earlier negotiation involving the device. According to an example, where the MAC address is a local MAC address and has recently changed, the DHCP negotiation may be reinitialized to allocate an IP address to the new MAC address. The hostname of the device may be checked against the database of previously administered hostname-IP address pairs. (See step 5). In an example, the DHCP negotiation may continue and result in allocation of an IP address. The DHCP server may first offer the requested IP address (DHCPOFFER), and then the DHCP negotiation may conclude with the request and acknowledgement of the requested IP address (DHCPACK). In an example, where there is no requested IP address, then the DHCP server may allocate an IP address from its available pool of IP addresses.

Step 4: On a successful allocation of IP parameters, the DHCP server may pass the MAC address, IP address, and hostname of the device to the DNS server and the data is added to a local DNS database. In an example, the MAC address, IP address, and hostname of the device may be added to the local DNS database according to a standard technique. Further, the hostname may be associated with the IP address. According to an example, the hostname may be represented by a domain name in the local DNS database. In an example, the domain name may be a fully qualified domain name (FQDN), such as "SENS_TX1.example.org".

In some examples, the domain name may be a link-local domain name, such as "SENS_TX1.local". Also, association between the MAC address and the IP address may be associated and cached in an address resolution protocol (ARP) table. In an example, ARP processing may be used by an IP software on devices within the Wi-Fi sensing system to share and circulate the information regarding the MAC address and the IP address. In an example, a sensing receiver or any other device that may need to know the association between the MAC address and IP address that has been established may communicate at an IP layer with a new sensing transmitter thereby facilitating the ARP table to include the new sensing transmitter. In an example, where IPv6 is used then neighbor discovery protocol (NDP), inverse neighbor discovery (IND), and Internet control message protocol v6 (ICMPv6) may replace the ARP table but with the same result of association of the MAC address and IP address (in this case, a IPv6 address).

Step 5: In an example, when the DHCP server receives the hostname and requested IP address (where both the hostname and the requested IP address are non-blank values), the DNS server may check the hostname and IP address pair against the database of previously administered hostname-IP address pairs. According to an example, the database may be a local DNS database. When the hostname and IP address pair is found in the database, the DHCP server may proceed to offer the requested IP address. In a scenario, where the hostname is not stored in the database, it may be assumed that the device has not been found by the Wi-Fi sensing system and the requested IP address may be known from an association with another Wi-Fi sensing network. In an example, the DHCP server may offer the requested address if the address is available, or it may offer a different IP address which is available. In both cases, the local DNS database may be updated with the allocated IP address as described in step 4. In some examples, a sensing receiver or any other device on the Wi-Fi sensing system may be programmed to detect and decode broadcast DHCP messages including "DHCPDISCOVER", "DHCPOFFER", "DHCPREQUEST" and "DHCPACK" messages. As described above, the "DHCPDISCOVER", "DHCPOFFER", "DHCPREQUEST" and "DHCPACK" messages may include information regarding the MAC address, the IP address, and the hostname. In an example, when the DHCP negotiation is complete based on detection of a DHCPACK, the sensing receiver, or any other device may conclude that the MAC address, the IP address, and the hostname describe the same device and may add these data to a database. In an example, the database may be local to the sensing receiver or any other device. In some examples, the database may be made available as a network resource for query by a sensing algorithm.

Figure 7:
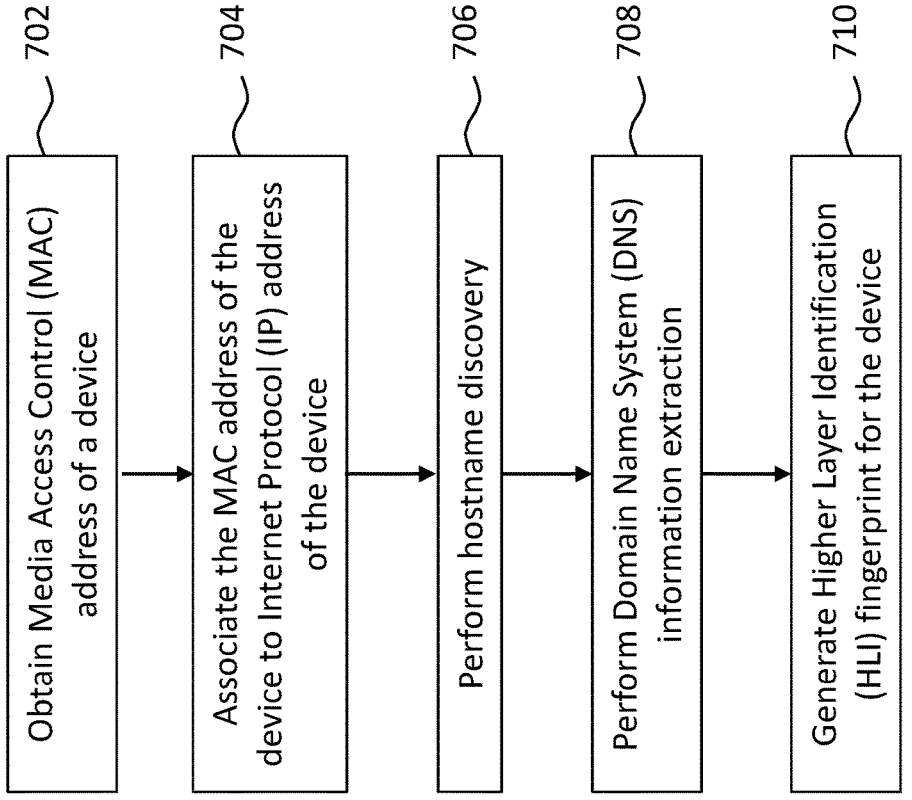
FIG. 7 depicts an example of a higher layer identification (HLI) fingerprint generation process, according to some embodiments.

An example of HLI fingerprint generation process 700 for a device is illustrated in FIG. 7.

At block 702, a current MAC address of the device for which the HLI fingerprint is to be generated may be obtained.

At block 704, the MAC address of the device may be associated to an IP address of the device. In an implementation, a domain name system (DNS) (for example, a DNS specific to system 500) may be used to associate the MAC address of the device to the IP address of the device. In an example, the IP address may be an IPV4 address or an IPV6 address.

At block 706, a hostname of the device may be discovered, and the hostname of the device may be associated with the MAC address and the IP address of the device. In an implementation, a hostname may be used as an identifier in an HLI fingerprint. A hostname is defined by Internet engineering task force (IETF) standard RFC1034 as a human-readable name for a device. RFC1034 further defines the DNS which maps a hostname to a layer-3 (network layer) address. As networks typically adopt zero configuration services such as dynamic host configuration protocol (DHCP) for dynamic layer-3 address assignment, the hostname may be a consistent identifier for devices which may have a changing layer-3 address. In an implementation, a reverse lookup query may be performed to discover the hostname of the device. In an example, the reverse lookup query is a query to a top-level domain "in-addr.arpa", as defined in IETF standard RFC1035. In an implementation, to perform a reverse lookup query for an IPV4 address of "w.x.y.z", a DNS query requesting pointer (PTR) records for "z.y.x.w.in-addr.arpa" may be sent to a local DNS server. If available, the local DNS server may return a PTR record indicating the ".local" hostname of the device. For example, if the IP address of a device is "192.168.1.100", then a PTR query to the local DNS server for "100.1.168.192.in-addr.arpa" may return the hostname of the device. For IPV6, the top-level domain "ip6.arpa" may be queried. For example, if the IPV6 address of a device is "2001:0db8:1234:0000:0000:0000:0000:5678" (as commonly represented in hex), then a query requesting PTR records for "8.7.6.5.0.0.0.0.0.0.0.0.0.0.0.0.0.0.0.0.4.3.2.1.8.b.d.0.1.0.0.2.ip6.arpa" to the local DNS server may return the hostname of the device.

At block 708, DNS information extraction may be performed. In an example, when a DHCP server receives the hostname and the requested IP address of the device, the DHCP server may check the hostname-IP address pair against a database of previously administered hostname-IP address pairs. According to an example, the database may be a local DNS database. When the hostname-IP address pair is found in the database, the DHCP server may proceed to offer the requested IP address.

At step 710, an HLI fingerprint may be generated for the device based on information from steps 702 to 708.

In some examples, each sensing transmitter may maintain its own MAC address, IP address, and hostname information, and may implement a mDNS service. As defined by the mDNS protocol, a sensing receiver or any other device may send a broadcast request to all devices on the Wi-Fi sensing system. Further, targeted devices may respond with the IP address associated with the requested hostname, or vice-versa in case of a reverse lookup.

Sensing Imprint

A representation of a propagation channel between a sensing transmitter and a sensing receiver is captured by a measure of Channel State Information (CSI). The sensing transmitter and the sensing receiver are usually fixed or semi-fixed or are required to be fixed or semi-fixed (i.e., stationary or moving infrequently). In an aspect, the sensing receiver and the sensing transmitter may be in a steady-state and objects between the sensing receiver and the sensing transmitter may be in a semi-static state. For example, objects such as furniture or fixtures in a room may be moved rarely and thus are in a semi-static state. Accordingly, the propagation channel between the sensing transmitter and the sensing receiver may be in a semi-static state or a steady-state (i.e., the propagation channel may be absent of any motion or movement). A steady-state representation of the propagation channel (interchangeably referred to as steady-state propagation channel) between the sensing transmitter and the sensing receiver may be determined. The steady-state representation of the propagation channel may be referred to as a sensing imprint.

In an implementation, sensing transmitter may send one or more sensing transmissions to a sensing receiver. The sensing receiver may process the one or more sensing transmissions to determine a sensing imprint. In an example, the sensing imprint may be a steady-state or baseline representation of time domain impulse response of a propagation channel between the sensing transmitter and the sensing receiver. The manner in which the sensing imprint is determined is described hereinafter.

Figure 8:
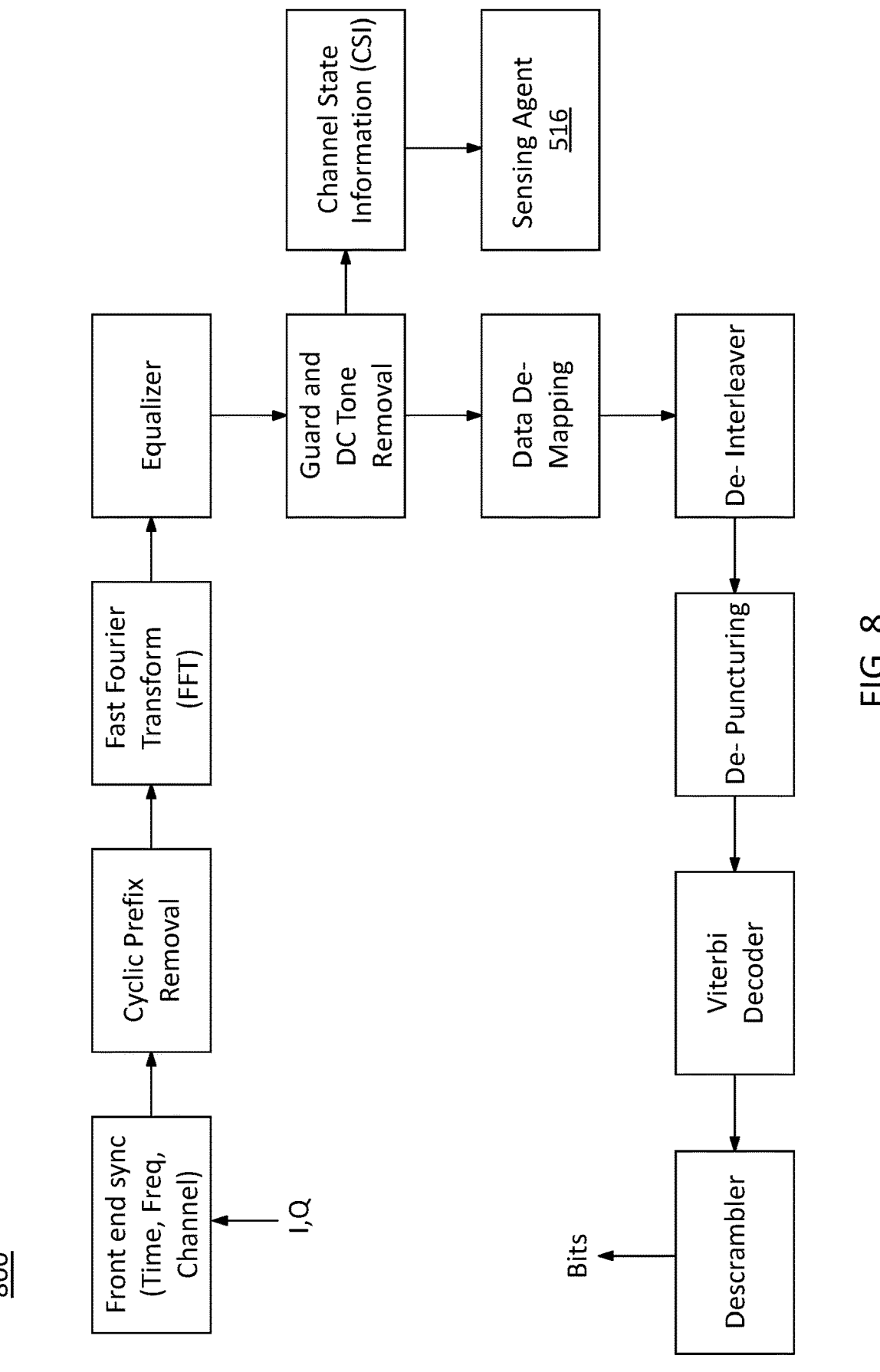
FIG. 8 illustrates a representation of a receiver chain of a sensing receiver, according to some embodiments.

According to an implementation, a baseband receiver of sensing receiver 502 may be configured to calculate CSI based on a sensing transmission received from sensing transmitter 504-1. In some implementations, sensing receiver 502 may calculate a contribution to the CSI by a receiver chain. In an example, the receiver chain of sensing receiver 502 may include analog elements and digital elements. For example, the receiver chain may include the analog and digital components through which a received signal may travel from a reference point to a point at which the received signal may be read by sensing agent 516 of sensing receiver 502. A representation 800 of the receiver chain of sensing receiver 502 is illustrated in FIG. 8. As described in FIG. 8, In-phase (I) and Quadra phase (Q) modulated symbols arrive at a frond end of the receiver where synchronization is performed including frequency and timing recovery. Further, time domain guard period (cyclic prefix) is removed, and the receiver performs a Fast Fourier Transform (FFT) on the received signal (for example, the I and Q modulated symbols). Guard tones and DC tones are then removed. CSI is then generated prior to data de-mapping, de-interleaving (using a de-interleaver), de-puncturing, decoding (using a Viterbi decoder) and finally descrambling (using a descrambler). As a result of descrambling, data bits are generated. The generated CSI is provided to sensing agent 516.

According to an implementation, upon receiving the CSI, sensing receiver 502 may determine the sensing imprint of the propagation channel in the format of full time domain channel representation information (TD-CRI). Sensing receiver 502 may perform an Inverse Fast Fourier Transform (IFFT) on the CSI to determine full TD-CRI and so the sensing imprint. This results in a time domain representation of the CSI. The sensing imprint may include complex values for each time domain tone. In an example, the sensing imprint may include as many full TD-CRI values as CSI values. The number of CSI values may scale with the propagation channel bandwidth. In an implementation, the number of CSI values and therefore the number of full TD-CRI values in the sensing imprint may be represented by Equation (8) provided below:

$$Size_{sensing\ input} = \left[ \left( \frac{Channel\ BW}{20\ MHz} \right) \times 52\ complex\ values \right] \quad (8)$$

In an implementation, sensing receiver 502 may store the sensing imprint in device context storage 538. In an example, sensing receiver 502 may store the sensing imprint as a baseline at a point of time of the propagation channel. An example of sensing imprint data structure created and stored by sensing receiver 502 is provided in Table 2.

In an example, a sensing imprint may need to be recalculated or updated if there is a change in the semi-static nature of one or more propagation channels between sensing receiver 502 and sensing transmitter 504-1. For example, if one or both of sensing receiver 502 and sensing transmitter 504-1 are moved, or if a semi-static object (for example, a piece of furniture) between sensing receiver 502 and sensing transmitter 504-1 is moved, there may be a change in the semi-static nature of the propagation channel. In some examples, the sensing imprint may also need to be updated in instances where sensing receiver 502 detects an object has moved into the sensing space affecting the propagation channel and has remained present and stationary for a period of time. In an implementation, the baseband receiver may send a notification to sensing receiver 502 that the sensing imprint that relates to the one or more propagation channels needs to be updated.

In some implementations, an automatic gain control (AGC) within the baseband receiver (for example, block "Front end sync" in FIG. 8) may precondition the I and Q samples prior to digitization. The AGC is a dynamic process, and its gain may change over time depending on conditions in the propagation channel. In some examples, a measure of a change of AGC gain or a signal from the AGC indicating that its gain has changed significantly may notify sensing receiver 502 that the sensing imprint that relates to the one or more propagation channels needs to be updated.

According to an implementation, a sensing imprint between sensing receiver 502 and sensing transmitter 504-1 may provide an identification of a device context. In an example, the sensing imprint between sensing receiver 502 and sensing transmitter 504-1 and the MAC addresses of sensing receiver 502 and sensing transmitter 504-1 may be associated through the device context. Accordingly, if one of two devices associated with a device context changes its MAC address, a sensing algorithm may know which device context the unknown device is part of by identifying the device context based on the sensing imprint between the devices. If the sensing imprint between the devices matches the sensing imprint of a known device context, then the sensing algorithm may replace the previous MAC address of the device with new MAC address of the device for thar device context. Further, the sensing algorithm may update the device context record accordingly.

In some examples, a sensing transmitter may send one or more sensing transmissions to a sensing receiver with different delivered transmission configurations and the sensing receiver may store a sensing imprint of the propagation channel associated with each transmission configuration in the device context. When determining the device context of a sensing transmission where the MAC address of the sensing transmitter is unknown, the sensing receiver may compare the sensing imprint of the transmission with stored sensing imprints which have the same delivered transmission configurations only.

Figures 9A, 9B:
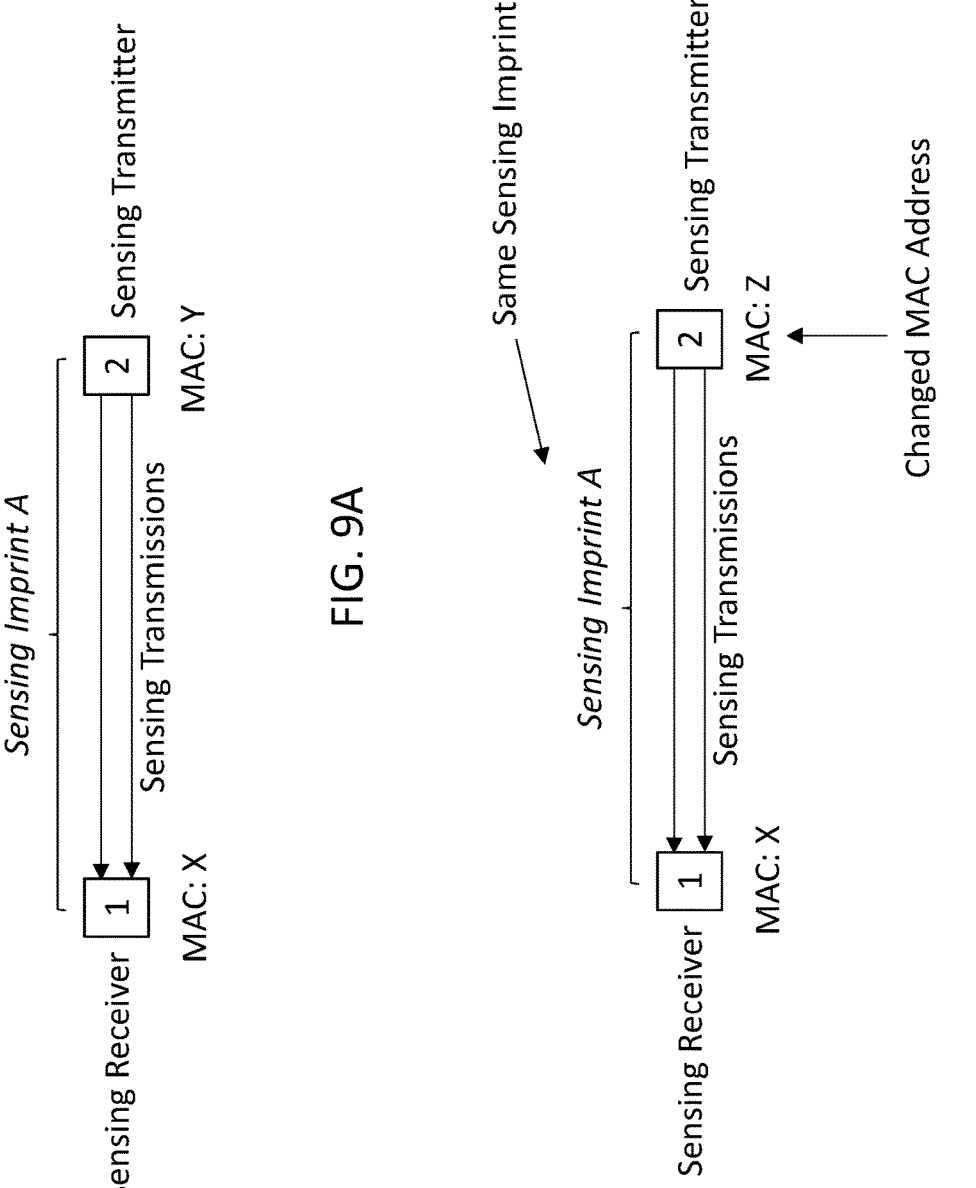
FIG. 9A and FIG. 9B illustrate an example of usage of a sensing imprint to detect a changed MAC address, according to some embodiments.

Example 900 of usage of a sensing imprint to detect a changed MAC address is illustrated in FIG. 9A and FIG. 9B. In an example, FIG. 9A and FIG. 9B describe the use of the sensing imprint to identify end devices in a Wi-Fi sensing system independent of changing or non-unique MAC addresses. As shown in FIG. 9A, a sensing transmitter having a MAC address "Y" transmits sensing transmissions to a sensing receiver having a MAC address "X". In response to receiving the sensing transmissions, the sensing receiver generates a sensing imprint namely "sensing imprint A" based on the sensing transmissions. Further, it is shown in FIG. 9B that the sensing imprint A is unchanged, however, the MAC address of the sensing transmitter has changed from "Y" to "Z". In an example, the Wi-Fi sensing system may be able to identify the sensing transmitter despite the changed MAC address due to the unchanged sensing imprint A.

In an implementation, the sensing imprint of the propagation channel between two devices may change if the nature of the propagation channel changes in a persistent way. For example, if an object is placed in a propagation channel for which an existing sensing imprint exists, this may alter the CSI of the propagation channel, and a new steady-state is created. For example, the propagation channel between an access point and a connected TV has a sensing imprint. A couch is placed between the access point and the connected TV which changes the nature of the propagation channel between the access point and the connected TV, such that the previous sensing imprint is no longer an accurate representation of that propagation channel, and a new sensing imprint needs to be established. The new sensing imprint once established may replace the previous sensing imprint in the device context record.

Figures 10A, 10B:
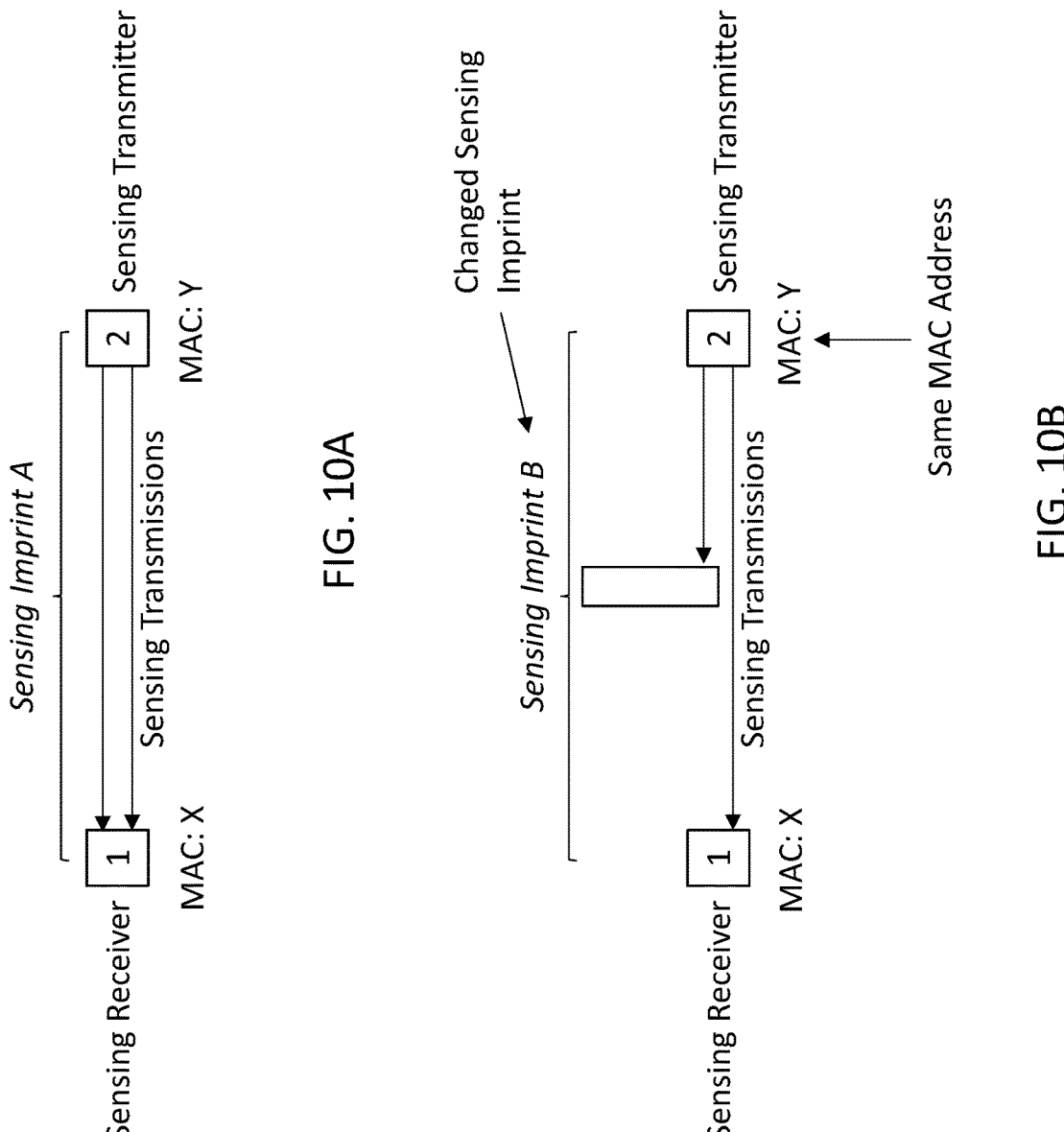
FIG. 10A and FIG. 10B illustrate an example of detection of a changed sensing imprint with same MAC address, according to some embodiments.

Example 1000 of detection of a changed sensing imprint with same MAC address is illustrated in FIG. 10A and FIG. 10B. As shown in FIG. 10A, a sensing transmitter having a MAC address "Y" transmits sensing transmissions to a sensing receiver having a MAC address "X". In response to receiving the sensing transmissions, the sensing receiver generates a sensing imprint namely "sensing imprint A" based on the sensing transmissions. Further, it is shown in FIG. 10B that the MAC address of the sensing transmitter is unchanged, however, the sensing imprint of the sensing transmitter has changed from "A" to "B". In an implementation, the identification of the sensing transmitter associated with each sensing imprint may be based on any of the other fields in the device context for that sensing session. For example, the identification of the sensing transmitter may be based on AID or hostname.

According to one or more implementations, communications in network 560 may be governed by one or more of the 802.11 family of standards developed by IEEE. Some example IEEE standards may include IEEE 802.11-2020, IEEE 802.11ax-2021, IEEE 802.11me, IEEE 802.11az and IEEE 802.11be. IEEE 802.11-2020 and IEEE 802.11ax-2021 are fully-ratified standards whilst IEEE 802.11 me reflects an ongoing maintenance update to the IEEE 802.11-2020 standard and IEEE 802.11be defines the next generation of standard. IEEE 802.11az is an extension of the IEEE 802.11-2020 and IEEE 802.11ax-2021 standards which adds new functionality. In some implementations, communications may be governed by other standards (other or additional IEEE standards or other types of standards). In some embodiments, parts of network 560 which are not required by system 500 to be governed by one or more of the 802.11 family of standards may be implemented by an instance of any type of network, including wireless network or cellular network.

C. Identifying Devices within Transmissions within a Sensing Network

The present disclosure generally relates to systems and methods for Wi-Fi sensing. In particular, the present disclosure relates to systems and methods for identifying devices within transmissions within a sensing network.

Referring again to FIG. 5, according to one or more implementations, for the purpose of Wi-Fi sensing, sensing receiver 502 may initiate a measurement campaign (or a Wi-Fi sensing session). In the measurement campaign, exchange of transmissions between sensing receiver 502 and plurality of sensing transmitters 504-(1-M) may occur. In an example, control of these transmissions may be with the MAC layer of the IEEE 802.11 stack.

According to an example implementation, sensing receiver 502 may initiate the measurement campaign via one or more sensing trigger messages. In an implementation, sensing agent 516 may be configured to generate a sensing trigger message to trigger a response from sensing transmitter 504-1. The response may be a sensing transmission. In an example, the sensing trigger message may include a requested transmission configuration. Other examples of information/data included in the sensing trigger message that are not discussed here are contemplated herein. According to an implementation, sensing agent 516 may transmit the sensing trigger message to sensing transmitter 504-1. In an implementation, sensing agent 516 may transmit the sensing trigger message to sensing transmitter 504-1 via transmitting antenna 512.

According to an implementation, sensing transmitter 504-1 may receive the sensing trigger message from sensing receiver 502. In response to receiving the sensing trigger message, sensing transmitter 504-1 may generate a sensing transmission. In an implementation, sensing transmitter 504-1 may generate the sensing transmission using the requested transmission configuration defined by the sensing trigger message. Subsequently, sensing transmitter 504-1 may transmit the sensing transmission to sensing receiver 502 in response to the sensing trigger message and in accordance with the requested transmission configuration. In an example, the sensing transmission may include a delivered transmission configuration corresponding to the requested transmission configuration.

According to an implementation, sensing receiver 502 may receive the sensing transmission from sensing transmitter 504-1 transmitted in response to the sensing trigger message. Sensing receiver 502 may be configured to receive the sensing transmission from sensing transmitter 504-1 via receiving antenna 514. According to an implementation, sensing agent 516 may be configured to generate a sensing measurement based on the sensing transmission. According to an implementation, sensing receiver 502 may transmit the sensing measurement to sensing algorithm manager 506. In an example implementation, sensing receiver 502 may transmit the sensing measurement to sensing algorithm manager 506 via transmitting antenna 512.

In an implementation, sensing algorithm manager 506 may obtain or receive the sensing measurement generated based on the sensing transmission transmitted by sensing transmitter 504-1 and received by sensing receiver 502. In an example implementation, sensing algorithm manager 506 may receive the sensing measurement from sensing receiver 502 via receiving antenna 534.

According to an implementation, sensing agent 536 may determine a device context of a sensing pair associated with the sensing transmission for a Wi-Fi sensing session. The sensing pair may include sensing transmitter 504-1 and sensing receiver 502. In an example, the device context may include information identifying sensing transmitter 504-1 and sensing receiver 502 of the sensing pair. In an implementation, sensing agent 536 may establish the device context according to at least one of a universal MAC address associated with sensing transmitter 504-1, a higher layer identification (HLI) fingerprint associated with sensing transmitter 504-1, and a sensing imprint associated with the sensing measurement.

In an implementation, sensing agent 536 may determine whether the MAC address of sensing transmitter 504-1 is an individual MAC address. Further, sensing algorithm manager 506 may determine whether the MAC address of sensing transmitter 504-1 is a universal MAC address or a local MAC address. In an example implementation, sensing agent 536 may make the determination based on a first least significant bit (LSB) and a second LSB of a first byte of the MAC address of sensing transmitter 504-1. In an example, if both the first LSB and the second LSB of the first byte are zero (0), then sensing agent 536 may determine that the MAC address of sensing transmitter 504-1 is an individual and universal MAC address. If the first LSB and the second LSB of the first byte are zero (0) and one (1) of the MAC address of sensing transmitter 504-1, respectively, then sensing agent 536 may determine that the MAC address of sensing transmitter 504-1 is an individual and local MAC address.

According to an implementation, if sensing agent 536 determines that the MAC address of sensing transmitter 504-1 is a universal MAC address, then sensing agent 536 may proceed to determine whether the MAC address of sensing transmitter 504-1 has been previously identified. If the MAC address of sensing transmitter 504-1 has been previously identified, then sensing transmitter 504-1 may be already known to sensing algorithm manager 506. Accordingly, the device context between sensing receiver 502 and sensing transmitter 504-1 may be precisely determined.

In an example implementation, sensing agent 536 may determine whether the universal MAC address is associated with a device context record. In an example, sensing agent 536 may search for a device context record corresponding to the universal MAC address in device context storage 538. If a device context record corresponding to the universal MAC address is found in device context storage 538, then sensing agent 536 may determine that the universal MAC address is associated with a device context record. Further, if a device context record corresponding to the universal MAC address is not found in device context storage 538, then sensing agent 536 may determine that the universal MAC address is not associated with a device context record. In an implementation, responsive to the determination that the universal MAC address is associated with the device context record, sensing agent 536 may determine the device context according to the device context record.

According to an implementation, responsive to the determination that the MAC address is the local MAC address or the MAC address is a universal MAC address not associated with a device context record, sensing agent 536 may determine the device context based on one of a HLI fingerprint associated with sensing transmitter 504-1 and a sensing imprint associated with the sensing measurement. In an example, the HLI fingerprint may be prioritized over the sensing imprint as the HLI fingerprint is determined solely based on sensing transmitter 504-1 and sensing receiver 502 and is independent of the propagation channel between sensing transmitter 504-1 and sensing receiver 502.

In an implementation, sensing agent 536 may identify a HLI fingerprint associated with sensing transmitter 504-1. In an example implementation, sensing agent 536 may identify the HLI fingerprint based on identifying a hostname and/or an IP address associated with sensing transmitter 504-1. Further, sensing agent 536 may determine whether the HLI fingerprint is associated with a device context record. In an example, sensing agent 536 may search for a device context record corresponding to the HLI fingerprint in device context storage 538. If a device context record corresponding to the HLI fingerprint is found in device context storage 538, then sensing agent 536 may determine that the HLI fingerprint is associated with a device context record. Further, if a device context record corresponding to the HLI fingerprint is not found in device context storage 538, then sensing agent 536 may determine that the HLI fingerprint is not associated with a device context record.

According to an implementation, responsive to the determination that the HLI fingerprint is associated with the device context record, sensing agent 536 may determine the device context from the device context record corresponding to the HLI fingerprint. In some implementations, responsive to the determination that the HLI fingerprint is not associated with a device context record, sensing agent 536 may establish a new device context as the device context. In an implementation, sensing agent 536 may store the device context as the new device context in device context storage 536.

According to an implementation, sensing agent 536 may determine the IP address associated with the MAC address of sensing transmitter 504-1. In an example, sensing agent 536 may determine the IP address by referring to a pre-defined address resolution protocol (ARP) table. In some implementations, sensing agent 536 may determine a host-name of sensing transmitter 504-1 associated with the IP address of sensing transmitter 504-1. In an example, sensing agent 536 may determine the hostname by referring to a domain name system (DNS) server. According to an example, the DNS server may be on the same device as sensing agent 536 or it may be on a remote device. In some examples, sensing agent 536 may use a reverse DNS query to determine the hostname associated with the IP address of sensing transmitter 504-1.

In an implementation, upon determining the IP address associated with the MAC address of sensing transmitter 504-1 and/or determining the hostname associated with the IP address of sensing transmitter 504-1, sensing agent 536 may query device context storage 538 to identify a device context record corresponding to the hostname and/or IP address of sensing transmitter 504-1. Sensing agent 536 may then determine the device context from the identified device context record.

According to some implementations, responsive to a determination that the MAC address is a local MAC address or a determination that the MAC address is a universal MAC address and not associated with a device context record, sensing agent 536 may determine a sensing imprint associated with the sensing measurement. In some implementations, responsive to a determination that the HLI fingerprint is not associated with a device context record, sensing agent 536 may determine the sensing imprint associated with the sensing measurement. Further, sensing agent 536 may determine whether the sensing imprint is associated with a device context record. In an example, sensing agent 536 may search for a device context record corresponding to the sensing imprint in device context storage 538. If a device context record corresponding to the sensing imprint is found in device context storage 538, then sensing agent 536 may determine that the sensing imprint is associated with a device context record. Further, if a device context record corresponding to the sensing imprint is not found in device context storage 538, then sensing agent 536 may determine that the sensing imprint is not associated with a device context record.

According to an implementation, responsive to a determination that the sensing imprint is associated with a device context record, sensing agent 536 may determine the device context from the device context record corresponding to the sensing imprint. Further, responsive to a determination that the sensing imprint is not associated with a device context record, sensing sensing agent 536 may consider sensing transmitter 504-1 to be new and unknown.

In an implementation, sensing agent 536 may calculate a sensing imprint from the sensing measurement made on the sensing transmission. Further, sensing agent 536 may compare the sensing imprint with sensing imprints stored in device context storage 538. In an example, where a delivered transmission configuration for the sensing transmission is known, sensing agent 536 may limit the comparison to only stored sensing imprints that have matching delivered transmission configurations. If the sensing imprint matches a stored sensing imprint, then sensing agent 536 may determine that sensing transmitter 504-1 that made the sensing transmission is the same device as the sensing transmitter associated with the device context record in which the sensing imprint matched. In an example, if the sensing imprint matches with the stored sensing imprint, sensing agent 536 may replace the MAC address of the sensing transmitter in the device context record with the MAC address associated with sensing transmitter 504-1 that transmitted the sensing transmission.

According to an implementation, upon a determination of the device context according to at least one of the universal MAC address associated with sensing transmitter 504-1, the HLI fingerprint associated with sensing transmitter 504-1, and the sensing imprint associated with the sensing measurement, sensing agent 536 may update a device context record corresponding to the device context with at least one of the universal MAC address associated with sensing transmitter 504-1, the HLI fingerprint associated with sensing transmitter 504-1, and the sensing imprint associated with the sensing measurement. Further, sensing agent 536 may associate the sensing measurement with the device context. In an implementation, sensing agent 536 may execute a sensing algorithm according to the sensing measurement and the device context to generate a sensing result, such as detecting motions or gestures.

According to an implementation, upon a determination that there is no device context according to at least one of the universal MAC address associated with sensing transmitter 504-1, the HLI fingerprint associated with sensing transmitter 504-1, and the sensing imprint associated with the sensing measurement, sensing agent 536 may create a new device context record and populate with a device context consisting of at least one of the universal MAC address associated with sensing transmitter 504-1, the HLI fingerprint associated with sensing transmitter 504-1, and the sensing imprint associated with the sensing measurement. Further, sensing agent 536 may associate the sensing measurement with the new device context. In an implementation, sensing agent 536 may execute a sensing algorithm according to the sensing measurement and the new device context to generate a sensing result, such as detecting motions or gestures.

According to aspects of the present disclosure, if the sensing measurement is matched and associated with a stored device context record, then sensing agent 536 may optionally update the device context record with any new information. In an example, if any of the information corresponding to the fields in the device context record is changed or new, then sensing agent 536 may store the changed or new information in the device context record. For example, if the sensing measurement was matched to the device context record using the HLI fingerprint and the sensing transmission was made using the delivered transmission configuration for which there is no stored sensing imprint in the device context record, then sensing agent 536 may store the sensing imprint and the delivered transmission configuration in the device context record. Further, if the sensing measurement was matched to the device context record using the sensing imprint, and the either of the MAC address of sensing transmitter 504-1 or the AID of the sensing transmitter 504-1 has changed, then sensing agent 536 may store the updated MAC address of the sensing transmitter 504-1 or the AID of the sensing transmitter 504-1 in the device context record. Accordingly, aspects of the present disclosure facilitate in identification of the device context between sensing receiver 502 and sensing transmitter 504-1 without a requirement of a stable MAC address and/or AID.

FIG. 11 depicts flowchart 1100 for executing a sensing algorithm according to a sensing measurement and a device context to generate a sensing result, according to some embodiments.

In a brief overview of an implementation of flowchart 1100, at step 1102, a sensing measurement based on a sensing transmission transmitted by sensing transmitter 504-1 and received by sensing receiver 502 is obtained. At step 1104, a device context of a sensing pair associated with the sensing transmission is determined, the sensing pair including sensing transmitter 504-1 and sensing receiver 502. At step 1106, the sensing measurement is associated with the device context. At step 1108, a sensing algorithm is executed according to the sensing measurement and the device context to generate a sensing result.

Step 1102 includes obtaining a sensing measurement based on a sensing transmission transmitted by sensing transmitter 504-1 and received by sensing receiver 502. In an implementation, sensing algorithm manager 506 may be configured to obtain the sensing measurement based on the sensing transmission transmitted by sensing transmitter 504-1 and received by sensing receiver 502. According to an implementation, sensing algorithm manager 506 may include receiving antenna 534 configured to receive the sensing measurement from sensing receiver 502. In some implementations, sensing algorithm manager 506 may include sensing receiver 502.

Step 1104 includes determining a device context of a sensing pair associated with the sensing transmission, the sensing pair including sensing transmitter 504-1 and sensing receiver 502. In an implementation, sensing algorithm manager 506 may be configured to determine the device context of the sensing pair associated with the sensing transmission. In an example, the device context includes information identifying sensing transmitter 504-1 and sensing receiver 502 of the sensing pair. In an implementation, sensing algorithm manager 506 may identify the device context based on identifying a media access control (MAC) address associated with the sensing measurement as a universal MAC address or a local MAC address. According to an implementation, sensing algorithm manager 506 may identify a universal MAC address associated with sensing transmitter 504-1 and determine the device context from a device context record corresponding to the universal MAC address. In some implementations, sensing algorithm manager 506 may identify a higher layer identification (HLI) fingerprint associated with sensing transmitter 504-1 and determine the device context from a device context record corresponding to the HLI fingerprint. In an example, identifying the HLI fingerprint includes identifying a hostname and an IP address associated with sensing transmitter 504-1. In an implementation, sensing algorithm manager 506 may associate the HLI fingerprint with the MAC address associated with sensing transmitter 504-1. In some implementations, sensing algorithm manager 506 may determine a sensing imprint associated with the sensing measurement and determine the device context from a device context record corresponding to the sensing imprint.

Step 1106 includes associating the sensing measurement with the device context. In an implementation, sensing algorithm manager 506 may be configured to associate the sensing measurement with the device context.

Step 1108 includes executing a sensing algorithm according to the sensing measurement and the device context to generate a sensing result. In an implementation, sensing algorithm manager 506 may be configured to execute the sensing algorithm according to the sensing measurement and the device context to generate the sensing result.

FIG. 12A and FIG. 12B depict flowchart 1200 for updating a device context record corresponding to a device context, according to some embodiments.

In a brief overview of an implementation of flowchart 1200, at step 1202, a sensing measurement based on a sensing transmission transmitted by sensing transmitter 504-1 and received by sensing receiver 502 is obtained. At step 1204, a device context of a sensing pair associated with the sensing transmission is determined, the sensing pair including sensing transmitter 504-1 and sensing receiver 502. The device context is determined based on establishing the device context according to at least one of a universal media access control (MAC) address associated with sensing transmitter 504-1, a higher layer identification (HLI) fingerprint associated with sensing transmitter 504-1, and a sensing imprint associated with the sensing measurement. At step 1206, the sensing measurement is associated with the device context. At step 1208, a sensing algorithm is executed according to the sensing measurement and the device context to generate a sensing result. At step 1210, a device context record corresponding to the device context is updated with at least one of the universal MAC address associated with sensing transmitter 504-1, the HLI fingerprint associated with sensing transmitter 504-1, and the sensing imprint associated with the sensing measurement.

Step 1202 includes obtaining a sensing measurement based on a sensing transmission transmitted by sensing transmitter 504-1 and received by sensing receiver 502. According to an implementation, sensing algorithm manager 506 may be configured to obtain the sensing measurement based on the sensing transmission transmitted by sensing transmitter 504-1 and received by sensing receiver 502. According to an implementation, sensing algorithm manager 506 may include receiving antenna 534 configured to receive the sensing measurement from sensing receiver 502. In some implementations, sensing algorithm manager 506 may include sensing receiver 502.

Step 1204 includes determining a device context of a sensing pair associated with the sensing transmission, the sensing pair including sensing transmitter 504-1 and sensing receiver 502. In an example, the device context includes information identifying sensing transmitter 504-1 and sensing receiver 502 of the sensing pair. The device context is determined based on establishing the device context according to at least one of a universal MAC address associated with sensing transmitter 504-1, a HLI fingerprint associated with sensing transmitter 504-1, and a sensing imprint associated with the sensing measurement. According to an implementation, sensing algorithm manager 506 may be configured to determining the device context of the sensing pair associated with the sensing transmission. In an implementation, sensing algorithm manager 506 may determine the device context based on establishing the device context according to at least one of the universal MAC address associated with sensing transmitter 504-1, the HLI fingerprint associated with sensing transmitter 504-1, and the sensing imprint associated with the sensing measurement.

Step 1206 includes associating the sensing measurement with the device context. According to an implementation, sensing algorithm manager 506 may be configured to associate the sensing measurement with the device context.

Step 1208 includes executing a sensing algorithm according to the sensing measurement and the device context to generate a sensing result. According to an implementation, sensing algorithm manager 506 may be configured to execute the sensing algorithm according to the sensing measurement and the device context to generate the sensing result.

Step 1210 includes updating a device context record corresponding to the device context with at least one of the universal MAC address associated with sensing transmitter 504-1, the HLI fingerprint associated with sensing transmitter 504-1, and the sensing imprint associated with the sensing measurement. According to an implementation, sensing algorithm manager 506 may be configured to update the device context record corresponding to the device context with at least one of the universal MAC address associated with sensing transmitter 504-1, the HLI fingerprint associated with sensing transmitter 504-1, and the sensing imprint associated with the sensing measurement.

Figure 13B:
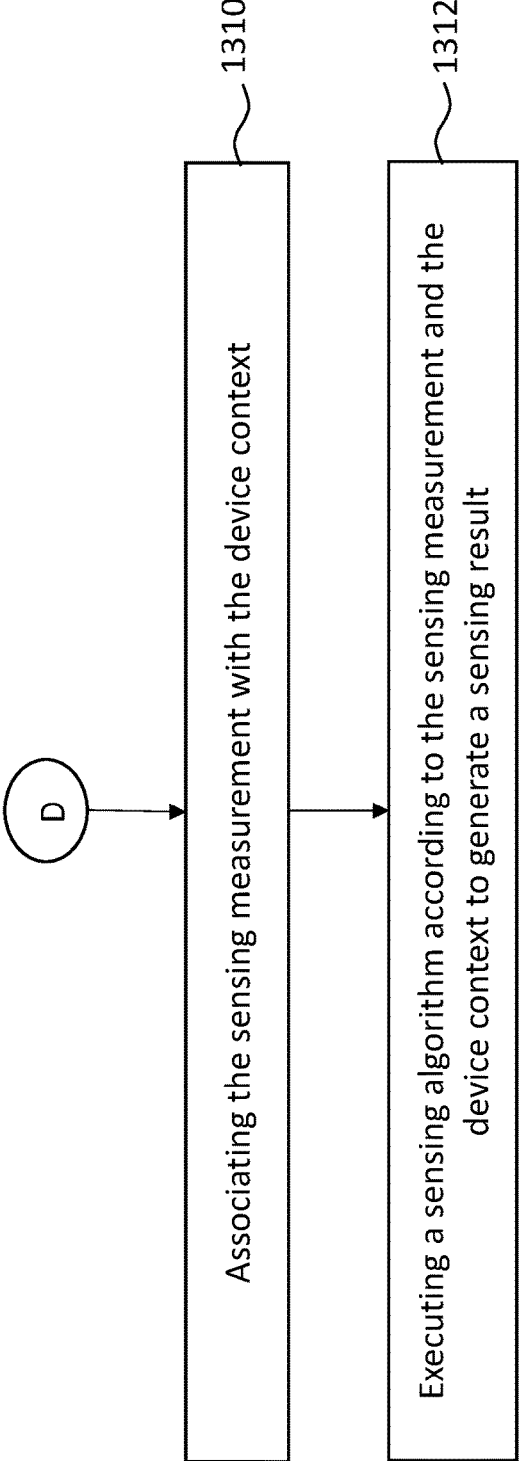

FIG. 13A and FIG. 13B depict another flowchart 1300 for executing a sensing algorithm according to a sensing measurement and a device context to generate a sensing result, according to some embodiments.

In a brief overview of an implementation of flowchart 1300, at step 1302, a sensing measurement based on a sensing transmission transmitted by sensing transmitter 504-1 and received by sensing receiver 502 is obtained. At step 1304, a media access control (MAC) address associated with the sensing measurement is identified as a universal MAC address. At step 1306, in response to identifying the MAC address as the universal MAC address, it is determined whether the universal MAC address is associated with a device context record. At step 1308, in response to the determination that the universal MAC address is associated with the device context record, a device context of a sensing pair associated with the sensing transmission is determined according to the device context record. The sensing pair includes sensing transmitter 504-1 and sensing receiver 502. At step 1310, the sensing measurement is associated with the device context. At step 1312, a sensing algorithm is executed according to the sensing measurement and the device context to generate a sensing result.

Step 1302 includes obtaining a sensing measurement based on a sensing transmission transmitted by sensing transmitter 504-1 and received by sensing receiver 502. According to an implementation, sensing algorithm manager 506 may be configured to obtain the sensing measurement based on the sensing transmission transmitted by sensing transmitter 504-1 and received by sensing receiver 502. According to an implementation, sensing algorithm manager 506 may include receiving antenna 534 configured to receive the sensing measurement from sensing receiver 502. In some implementations, sensing algorithm manager 506 may include sensing receiver 502.

Step 1304 includes identifying MAC address associated with the sensing measurement as a universal MAC address. According to an implementation, sensing algorithm manager

506 may be configured to identify the MAC address associated with the sensing measurement as the universal MAC address.

Step 1306 includes determining, responsive to identifying the MAC address as a universal MAC address, whether the MAC address is associated with a device context record. According to an implementation, sensing algorithm manager 506 may be configured to determine, responsive to identifying the MAC address as a universal MAC address, whether the MAC address is associated with the device context record Step 1308 includes determining, responsive to the determination that the MAC address is a universal MAC address and is associated with the device context record, a device context of a sensing pair associated with the sensing transmission according to the device context record. The sensing pair includes sensing transmitter 504-1 and sensing receiver 502. In an example, the device context includes information identifying sensing transmitter 504-1 and sensing receiver 502 of the sensing pair. According to an implementation, sensing algorithm manager 506 may be configured to determine, responsive to the determination that the MAC address is associated with the device context record, the device context of the sensing pair associated with the sensing transmission according to the device context record.

Step 1310 includes associating the sensing measurement with the device context. According to an implementation, sensing algorithm manager 506 may be configured to associate the sensing measurement with the device context.

Step 1312 includes executing a sensing algorithm according to the sensing measurement and the device context to generate a sensing result. According to an implementation, sensing algorithm manager 506 may be configured to execute the sensing algorithm according to the sensing measurement and the device context to generate the sensing result.

FIG. 14A and FIG. 14B depict flowchart 1400 for determining a device context of a sensing pair associated with a sensing transmission according to a device context record, according to some embodiments.

In a brief overview of an implementation of flowchart 1400, at step 1402, a sensing measurement based on a sensing transmission transmitted by sensing transmitter 504-1 and received by sensing receiver 502 is obtained. At step 1404, a media access control (MAC) address associated with the sensing measurement is identified as a local MAC address. At step 1406, in response to identifying the MAC address as a local MAC address, a higher layer identification (HLI) fingerprint associated with sensing transmitter 504-1 is determined. At step 1408, it is determined whether the HLI fingerprint is associated with a device context record. At step 1410, in response to a determination that the HLI fingerprint is not associated with a device context record, a sensing imprint associated with the sensing measurement is determined. At step 1412, it is determined whether the sensing imprint is associated with a device context record. At step 1414, in response to a determination that the sensing imprint is associated with a device context record, a device context is determined according to the device context record.

Step 1402 includes obtaining a sensing measurement based on a sensing transmission transmitted by sensing transmitter 504-1 and received by sensing receiver 502. According to an implementation, sensing algorithm manager 506 may be configured to obtain the sensing measurement based on the sensing transmission transmitted by sensing transmitter 504-1 and received by sensing receiver 502. According to an implementation, sensing algorithm manager

506 may include receiving antenna 534 configured to receive the sensing measurement from sensing receiver 502. In some implementations, sensing algorithm manager 506 may include sensing receiver 502.

Step 1404 includes identifying a MAC address associated with the sensing measurement as a local MAC address. According to an implementation, sensing algorithm manager 506 may be configured to identify the MAC address associated with the sensing measurement as a local MAC address.

Step 1406 includes determining, responsive to identifying the MAC address as a local MAC address, a HLI fingerprint associated with sensing transmitter 504-1. According to an implementation, sensing algorithm manager 506 may be configured to determine, responsive to identifying the MAC address as a local MAC address, the HLI fingerprint associated with sensing transmitter 504-1.

Step 1408 includes determining whether the HLI fingerprint is associated with a device context record. According to an implementation, sensing algorithm manager 506 may be configured to determine whether the HLI fingerprint is associated with the device context record.

Step 1410 includes determining, responsive to a determination that the HLI fingerprint is not associated with a device context record, a sensing imprint associated with the sensing measurement. According to an implementation, sensing algorithm manager 506 may be configured to determine, responsive to the determination that the HLI fingerprint is not associated with the device context record, the sensing imprint associated with the sensing measurement. In some implementations, responsive to the determination that the HLI fingerprint is not associated with the device context record, sensing algorithm manager 506 may establish a new device context as the device context.

Step 1412 includes determining whether the sensing imprint is associated with a device context record. According to an implementation, sensing algorithm manager 506 may be configured to determine whether the sensing imprint is associated with the device context record.

Step 1414 includes determining, responsive to a determination that the sensing imprint is associated with a device context record, a device context according to the device context record. In an example, the device context includes information identifying the sensing pair including sensing transmitter 504-1 and sensing receiver 502. According to an implementation, sensing algorithm manager 506 may be configured to determine, responsive to the determination that the sensing imprint is associated with the device context record, the device context according to the device context record.

FIG. 15A and FIG. 15B depict flowchart 1500 for establishing a new device context as a device context, according to some embodiments.

In a brief overview of an implementation of flowchart 1500, at step 1502, a sensing measurement based on a sensing transmission transmitted by sensing transmitter 504-1 and received by sensing receiver 502 is obtained. At step 1504, a media access control (MAC) address associated with the sensing measurement is identified as a local MAC address. At step 1506, in response to identifying the MAC address as a local MAC address, it is determined whether the MAC address is associated with a device context record. At step 1508, in response to a determination that the MAC address is not associated with a device context record, a higher layer identification (HLI) fingerprint associated with sensing transmitter 504-1 is determined. At step 1510, it is determined whether the HLI fingerprint is associated with a device context record. At step 1512, in response to a determination that the HLI fingerprint is not associated with a device context record, a sensing imprint associated with the sensing measurement is determined. At step 1514, it is determined whether the sensing imprint is associated with a device context record. At step 1516, in response to a determination that the sensing imprint is not associated with a device context record, a new device context as the device context.

Step 1502 includes obtaining a sensing measurement based on a sensing transmission transmitted by sensing transmitter 504-1 and received by sensing receiver 502. According to an implementation, sensing algorithm manager 506 may be configured to obtain the sensing measurement based on the sensing transmission transmitted by sensing transmitter 504-1 and received by sensing receiver 502. According to an implementation, sensing algorithm manager 506 may include receiving antenna 534 configured to receive the sensing measurement from sensing receiver 502. In some implementations, sensing algorithm manager 506 may include sensing receiver 502.

Step 1504 includes identifying a MAC address associated with the sensing measurement as a local MAC address. According to an implementation, sensing algorithm manager 506 may be configured to identify the MAC address associated with the sensing measurement as a local MAC address.

Step 1506 includes determining, responsive to identifying the MAC address as a local MAC address, whether the MAC address is associated with a device context record. According to an implementation, sensing algorithm manager 506 may be configured to determine, responsive to identifying the MAC address as a local MAC address, whether the universal MAC address is associated with the device context record.

Step 1508 includes determining, responsive to a determination that the MAC address is not associated with a device context record, a HLI fingerprint associated with sensing transmitter 504-1. According to an implementation, sensing algorithm manager 506 may be configured to determine, responsive to the determination that the MAC address is not associated with the device context record, the HLI fingerprint associated with sensing transmitter 504-1

Step 1510 includes determining whether the HLI fingerprint is associated with a device context record. According to an implementation, sensing algorithm manager 506 may be configured to determine whether the HLI fingerprint is associated with the device context record.

Step 1512 includes determining, responsive to a determination that the HLI fingerprint is not associated with a device context record, a sensing imprint associated with the sensing measurement. According to an implementation, sensing algorithm manager 506 may be configured to determine, responsive to the determination that the HLI fingerprint is not associated with the device context record, the sensing imprint associated with the sensing measurement. In some implementations, responsive to the determination that the HLI fingerprint is not associated with the device context record, sensing algorithm manager 506 may establish a new device context as the device context.

Step 1514 includes determining whether the sensing imprint is associated with a device context record. According to an implementation, sensing algorithm manager 506 may be configured to determine whether the sensing imprint is associated with the device context record.

Step 1516 includes establishing, responsive to a determination that the sensing imprint is not associated with a device context record, a new device context as the device context. According to an implementation, sensing algorithm manager 506 may be configured to establish, responsive to the determination that the sensing imprint is not associated with the device context record, the new device context as the device context.

Additional embodiments of the present disclosure include:

Embodiment 1 is a method for Wi-Fi sensing carried out by a sensing algorithm manager including at least one processor configured to execute instructions, the method comprising: obtaining, by the at least one processor, a sensing measurement based on a sensing transmission transmitted by a sensing transmitter and received by a sensing receiver; determining, by the sensing algorithm manager, a device context of a sensing pair associated with the sensing transmission, the sensing pair including the sensing transmitter and the sensing receiver; associating the sensing measurement with the device context; and executing, by the at least one processor, a sensing algorithm according to the sensing measurement and the device context to generate a sensing result.

Embodiment 2 is the method of embodiment 1, wherein the sensing algorithm manager further includes the sensing receiver.

Embodiment 3 is the method of embodiments 1 or 2, wherein the sensing algorithm manager includes a receiving antenna configured to receive the sensing measurement from the sensing receiver.

Embodiment 4 is the method of any of embodiments 1-3, wherein determining the device context includes: identifying a universal MAC address associated with the sensing transmitter, and determining the device context from a device context record corresponding to the universal MAC address.

Embodiment 5 is the method of any of embodiments 1-4, wherein determining the device context includes: identifying a higher layer identification fingerprint associated with the sensing transmitter, and determining the device context from a device context record corresponding to the higher layer identification fingerprint.

Embodiment 6 is the method of any of embodiments 1-5, wherein identifying the higher layer identification fingerprint includes identifying a hostname and an IP address associated with the sensing transmitter.

Embodiment 7 is the method of any of embodiments 1-6, further comprising associating the higher layer identification fingerprint with a MAC address associated with the sensing transmitter.

Embodiment 8 is the method of any of embodiments 1-7, wherein determining the device context includes: determining a sensing imprint associated with the sensing measurement, and determining the device context from a device context record corresponding to the sensing imprint.

Embodiment 9 is the method of any of embodiments 1-8, wherein determining the device context includes: establishing the device context according to at least one of: a universal MAC address associated with the sensing transmitter, a higher layer identification fingerprint associated with the sensing transmitter, and a sensing imprint associated with the sensing measurement, and storing the device context as a new device context record.

Embodiment 10 is the method of any of embodiments 1-9, further comprising updating a device context record corresponding to the device context with at least one of: a universal MAC address associated with the sensing transmitter, a higher layer identification fingerprint associated with the sensing transmitter, and a sensing imprint associated with the sensing measurement.

Embodiment 11 is the method of any of embodiments 1-10, wherein the device context includes information identifying the sensing transmitter and the sensing receiver of the sensing pair.

Embodiment 12 is the method of any of embodiments 1-11, wherein determining the device context includes: identifying a MAC address associated with the sensing transmitter as a universal MAC address or a local MAC address.

Embodiment 13 is the method of any of embodiments 1-12, wherein determining the device context further includes: determining, responsive to identifying the MAC address as a universal MAC address, whether the MAC address is associated with a device context record.

Embodiment 14 is the method of any of embodiments 1-13, wherein determining the device context further includes: determining, responsive to a determination that the MAC address is associated with the device context record, the device context according to the device context record.

Embodiment 15 is the method of any of embodiments 1-14, wherein determining the device context further includes: determining, responsive to a determination that the MAC address is a local MAC address or a determination that the MAC address is a universal MAC address and is not associated with a device context record, a higher layer identification fingerprint associated with the sensing transmitter; determining whether the higher layer identification fingerprint is associated with a device context record; and determining, responsive to the determination that the higher layer identification fingerprint is associated with the device context record, the device context according to the device context record.

Embodiment 16 is the method of any of embodiments 1-15, wherein determining the device context further includes: determining, responsive to a determination that the MAC address is a local MAC address or a determination that the MAC address is a universal MAC address and is not associated with a device context record, a higher layer identification fingerprint associated with the sensing transmitter; determining whether the higher layer identification fingerprint is associated with a device context record; and establishing, responsive to a determination that the higher layer identification fingerprint is not associated with a device context record, a new device context as the device context.

Embodiment 17 is the method of any of embodiments 1-16, wherein determining the device context further includes: determining, responsive to a determination that the MAC address is a local MAC address or a determination that the MAC address is a universal MAC address and is not associated with a device context record, a sensing imprint associated with the sensing measurement; determining whether the sensing imprint is associated with a device context record; and determining, responsive to a determination that the sensing imprint is associated with a device context record, the device context according to the device context record.

Embodiment 18 is the method of any of embodiments 1-17, wherein determining the device context further includes: determining, responsive to a determination that the MAC address is a local MAC address or a determination that the MAC address is a universal MAC address and is not associated with a device context record, a sensing imprint associated with the sensing measurement; determining whether the sensing imprint is associated with a device context record; and establishing, responsive to a determination that the sensing imprint is not associated with a device context record, a new device context as the device context.

Embodiment 19 is the method of any of embodiments 1-18, wherein determining the device context further includes: determining, responsive to a determination that the MAC address is a local MAC address or a determination that the MAC address is a universal MAC address and is not associated with a device context record, a higher layer identification fingerprint associated with the sensing transmitter; determining whether the higher layer identification fingerprint is associated with a device context record; determining, responsive to a determination that the higher layer identification fingerprint is not associated with a device context record, a sensing imprint associated with the sensing measurement; and determining whether the sensing imprint is associated with a device context record.

Embodiment 20 is the method of any of embodiments 1-19, wherein determining the device context further includes: determining, responsive to a determination that the sensing imprint is associated with a device context record, the device context according to the device context record.

Embodiment 21 is the method of any of embodiments 1-20, wherein determining the device context further includes: establishing, responsive to a determination that the sensing imprint is not associated with a device context record, a new device context as the device context.

Embodiment 22 is a system for Wi-Fi sensing comprising: a sensing algorithm manager including at least one processor configured to execute instructions for: obtaining a sensing measurement based on a sensing transmission transmitted by a sensing transmitter and received by a sensing receiver; determining, by the sensing algorithm manager, a device context of a sensing pair associated with the sensing transmission, the sensing pair including the sensing transmitter and the sensing receiver; associating the sensing measurement with the device context; and executing a sensing algorithm according to the sensing measurement and the device context to generate a sensing result.

Embodiment 23 is the system of embodiment 22, wherein the sensing algorithm manager further includes the sensing receiver.

Embodiment 24 is the system of embodiments 22 or 23, wherein the sensing algorithm manager includes a receiving antenna configured to receive the sensing measurement from the sensing receiver.

Embodiment 25 is the system of any of embodiments 22-24, wherein determining the device context includes: identifying a universal MAC address associated with the sensing transmitter, and determining the device context from a device context record corresponding to the universal MAC address.

Embodiment 26 is the system of any of embodiments 22-25, wherein determining the device context includes: identifying a higher layer identification fingerprint associated with the sensing transmitter, and determining the device context from a device context record corresponding to the higher layer identification fingerprint.

Embodiment 27 is the system of any of embodiments 22-26, wherein identifying the higher layer identification fingerprint includes identifying a hostname and an IP address associated with the sensing transmitter.

Embodiment 28 is the system of any of embodiments 22-27, wherein the at least one processor is further configured with instructions for associating the higher layer identification fingerprint with a MAC address associated with the sensing transmitter.

Embodiment 29 is the system of any of embodiments 22-28, wherein determining the device context includes: determining a sensing imprint associated with the sensing measurement, and determining the device context from a device context record corresponding to the sensing imprint.

Embodiment 30 is the system of any of embodiments 22-29, wherein determining the device context includes: establishing the device context according to at least one of: a universal MAC address associated with the sensing transmitter, a higher layer identification fingerprint associated with the sensing transmitter, and a sensing imprint associated with the sensing measurement, and storing the device context as a new device context record.

Embodiment 31 is the system of any of embodiments 22-30, wherein the at least one processor is further configured with instructions for updating a device context record corresponding to the device context with at least one of: a universal MAC address associated with the sensing transmitter, a higher layer identification fingerprint associated with the sensing transmitter, and a sensing imprint associated with the sensing measurement.

Embodiment 32 is the system of any of embodiments 22-31, wherein the device context includes information identifying the sensing transmitter and the sensing receiver of the sensing pair.

Embodiment 33 is the system of any of embodiments 22-32, wherein determining the device context includes: identifying a MAC address associated with the sensing transmitter as a universal MAC address or a local MAC address.

Embodiment 34 is the system of any of embodiments 22-33, wherein determining the device context further includes: determining, responsive to identifying the MAC address as a universal MAC address, whether the MAC address is associated with a device context record.

Embodiment 35 is the system of any of embodiments 22-34, wherein determining the device context further includes: determining, responsive to a determination that the MAC address is associated with the device context record, the device context according to the device context record.

Embodiment 36 is the system of any of embodiments 22-35, wherein determining the device context further includes: determining, responsive to a determination that the MAC address is a local MAC address or a determination that the MAC address is a universal MAC address and is not associated with a device context record, a higher layer identification fingerprint associated with the sensing transmitter; determining whether the higher layer identification fingerprint is associated with a device context record; and determining, responsive to the determination that the higher layer identification fingerprint is associated with the device context record, the device context according to the device context record.

Embodiment 37 is the system of any of embodiments 22-36, wherein determining the device context further includes: determining, responsive to a determination that the MAC address is a local MAC address or a determination that the MAC address is a universal MAC address and is not associated with a device context record, a higher layer identification fingerprint associated with the sensing transmitter; determining whether the higher layer identification fingerprint is associated with a device context record; and establishing, responsive to a determination that the higher layer identification fingerprint is not associated with a device context record, a new device context as the device context.

Embodiment 38 is the system of any of embodiments 22-37, wherein determining the device context further includes: determining, responsive to a determination that the MAC address is a local MAC address or a determination that the MAC address is a universal MAC address and is not associated with a device context record, a sensing imprint associated with the sensing measurement; determining whether the sensing imprint is associated with a device context record; and determining, responsive to a determination that the sensing imprint is associated with a device context record, the device context according to the device context record.

Embodiment 39 is the system of any of embodiments 22-38, wherein determining the device context further includes: determining, responsive to a determination that the MAC address is a local MAC address or a determination that the MAC address is a universal MAC address and is not associated with a device context record, a sensing imprint associated with the sensing measurement; determining whether the sensing imprint is associated with a device context record; and establishing, responsive to a determination that the sensing imprint is not associated with a device context record, a new device context as the device context.

Embodiment 40 is the system of any of embodiments 22-39, wherein determining the device context further includes: determining, responsive to a determination that the MAC address is a local MAC address or a determination that the MAC address is a universal MAC address and is not associated with a device context record, a higher layer identification fingerprint associated with the sensing transmitter; determining whether the higher layer identification fingerprint is associated with a device context record; determining, responsive to a determination that the higher layer identification fingerprint is not associated with a device context record, a sensing imprint associated with the sensing measurement; and determining whether the sensing imprint is associated with a device context record.

Embodiment 41 is the system of any of embodiments 22-40, wherein determining the device context further includes: determining, responsive to a determination that the sensing imprint is associated with a device context record, the device context according to the device context record.

Embodiment 42 is the system of any of embodiments 22-41, wherein determining the device context further includes: establishing, responsive to a determination that the sensing imprint is not associated with a device context record, a new device context as the device context.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

What is claimed is:

1. A method for Wi-Fi sensing carried out by a sensing algorithm manager including at least one processor configured to execute instructions, the method comprising:
obtaining, by the at least one processor, a sensing measurement based on a sensing transmission transmitted by a sensing transmitter and received by a sensing receiver;
determining, by the sensing algorithm manager, a device context of a sensing pair associated with the sensing transmission, the sensing pair including the sensing transmission, the sensing pair including the sensing transmitter and the sensing receiver, wherein the device context of the sensing pair associated with the sensing transmission includes one or more of a universal MAC address associated with the sensing transmitter, a universal MAC address associated with the sensing receiver, a higher layer identification fingerprint associated with the sensing transmitter, a higher layer identification fingerprint associated with the sensing receiver, and a sensing imprint;
associating the sensing measurement with the device context; and
executing, by the at least one processor, a sensing algorithm according to the sensing measurement and the device context to generate a sensing result.

2. The method of claim 1, wherein the sensing algorithm manager includes a receiving antenna configured to receive the sensing measurement from the sensing receiver.

3. The method of claim 1, wherein determining the device context includes:
identifying a universal MAC address associated with the sensing transmitter, and
determining the device context from a device context record corresponding to the universal MAC address.

4. The method of claim 1, wherein determining the device context includes identifying the higher layer identification fingerprint which includes a hostname and an IP address associated with the sensing transmitter.

5. The method of claim 4, further comprising associating the higher layer identification fingerprint with a MAC address associated with the sensing transmitter.

6. The method of claim 1, further comprising generating a device context record corresponding to the device context with at least one of:
the universal MAC address associated with the sensing transmitter,
the universal MAC address associated with the sensing receiver,
the higher layer identification fingerprint associated with the sensing transmitter,
the higher layer identification fingerprint associated with the sensing receiver, and
the sensing imprint.

7. The method of claim 1, wherein the device context includes information identifying the sensing transmitter and the sensing receiver of the sensing pair.

8. The method of claim 1, further comprising updating a device context record corresponding to the device context with at least one of:
the universal MAC address associated with the sensing transmitter,
the universal MAC address associated with the sensing receiver,
the higher layer identification fingerprint associated with the sensing transmitter,
the higher layer identification fingerprint associated with the sensing receiver, and
the sensing imprint.

9. A system for Wi-Fi sensing comprising:
a sensing algorithm manager including at least one processor configured to execute instructions for:
obtaining a sensing measurement based on a sensing transmission transmitted by a sensing transmitter and received by a sensing receiver;
determining, by the sensing algorithm manager, a device context of a sensing pair associated with the sensing transmission, the sensing pair including the sensing transmitter and the sensing receiver, wherein the device context of the sensing pair associated with the sensing transmission includes one or more of a universal MAC address associated with the sensing transmitter, a universal MAC address associated with the sensing receiver, a higher layer identification fingerprint associated with the sensing transmitter, a higher layer identification fingerprint associated with the sensing receiver, and a sensing imprint;

associating the sensing measurement with the device context; and executing a sensing algorithm according to the sensing measurement and the device context to generate a sensing result.

10. The system of claim 9, wherein the sensing algorithm manager includes a receiving antenna configured to receive the sensing measurement from the sensing receiver.

11. The system of claim 9, wherein determining the device context includes:

identifying universal MAC address associated with the sensing transmitter, and determining the device context from a device context record corresponding to the universal MAC address.

12. The system of claim 9, wherein determining the device context includes identifying the higher layer identification fingerprint which includes a hostname and an IP address associated with the sensing transmitter.

13. The system of claim 12, wherein the at least one processor is further configured with instructions for associating the higher layer identification fingerprint with a MAC address associated with the sensing transmitter.

14. The system of claim 9, wherein the at least one processor is further configured with instructions for generating a device context record corresponding to the device context with at least one of:

the universal MAC address associated with the sensing transmitter, the universal MAC address associated with the sensing receiver, the higher layer identification fingerprint associated with the sensing transmitter, the higher layer identification fingerprint associated with the sensing transmitter, and the sensing imprint.

15. The system of claim 9, wherein the device context includes information identifying the sensing transmitter and the sensing receiver of the sensing pair.

16. The system of claim 9, wherein the at least one processor is further configured with instructions for updating a device context record corresponding to the device context with at least one of:

the universal MAC address associated with the sensing transmitter, the universal MAC address associated with the sensing receiver, the higher layer identification fingerprint associated with the sensing transmitter, the higher layer identification fingerprint associated with the sensing receiver, and the sensing imprint.

\* \* \* \* \*